(12) United States Patent
Buchmann

(10) Patent No.: US 11,940,951 B2
(45) Date of Patent: Mar. 26, 2024

(54) IDENTIFICATION AND IMPORT OF METADATA FOR EXTENSIONS TO DATABASE ARTEFACTS

(71) Applicant: SAP SE, Walldorf (DE)

(72) Inventor: Daniel Buchmann, Karlsruhe (DE)

(73) Assignee: SAP SE, Walldorf (DE)

( * ) Notice: Subject to any disclaimer, the term of this patent is extended or adjusted under 35 U.S.C. 154(b) by 160 days.

(21) Appl. No.: 17/448,514

(22) Filed: Sep. 22, 2021

(65) Prior Publication Data

US 2023/0105205 A1   Apr. 6, 2023

(51) Int. Cl.
G06F 16/14   (2019.01)
G06F 16/16   (2019.01)

(52) U.S. Cl.
CPC .......... *G06F 16/148* (2019.01); *G06F 16/164* (2019.01)

(58) Field of Classification Search
CPC .... G06F 16/148; G06F 16/164; G06F 16/213; G06F 16/27; G06F 16/284
USPC ....................................................... 707/769
See application file for complete search history.

(56) References Cited

U.S. PATENT DOCUMENTS

| | | | |
|---|---|---|---|
| 2007/0255760 A1* | 11/2007 | Itoh | G06F 16/164 |
| 2008/0005062 A1* | 1/2008 | Gupta | G06F 16/284 |
| 2010/0161648 A1 | 6/2010 | Eberlein et al. | |
| 2014/0279839 A1* | 9/2014 | Balzar | G06F 16/20 707/607 |
| 2015/0074136 A1* | 3/2015 | Falter | G06F 16/288 707/760 |
| 2020/0334272 A1 | 10/2020 | Hrastnik | |
| 2021/0389883 A1* | 12/2021 | Derryberry | G06F 3/0659 |

OTHER PUBLICATIONS

European Search Report received in copending European Application No. 22196904.1, dated Feb. 8, 2023, 9 pages.
Anomiebot: "Metadata," Jul. 13, 2012, pp. 1-12, XP05525724, Retrieved from the Internet, https:en.wikipedia.org/w/index.php?title=Metadata&oldid=0502152398, retrieved on Aug. 16, 2016.

* cited by examiner

*Primary Examiner* — Hung T Vy
(74) *Attorney, Agent, or Firm* — Klarquist Sparkman, LLP

(57) ABSTRACT

Techniques and solutions are described for storing and processing metadata. A target system sends a request to a source system to identify extensions to one or more specified database artefacts. The source system identifies one or more software objects that include metadata extensions to the one or more specified database artefacts and sends at least a portion of such metadata elements to the target system in response to the request. The source system can expose APIs, such as APIs in a standard format, to the target system to assist in requesting and retrieving metadata from the source system.

20 Claims, 44 Drawing Sheets

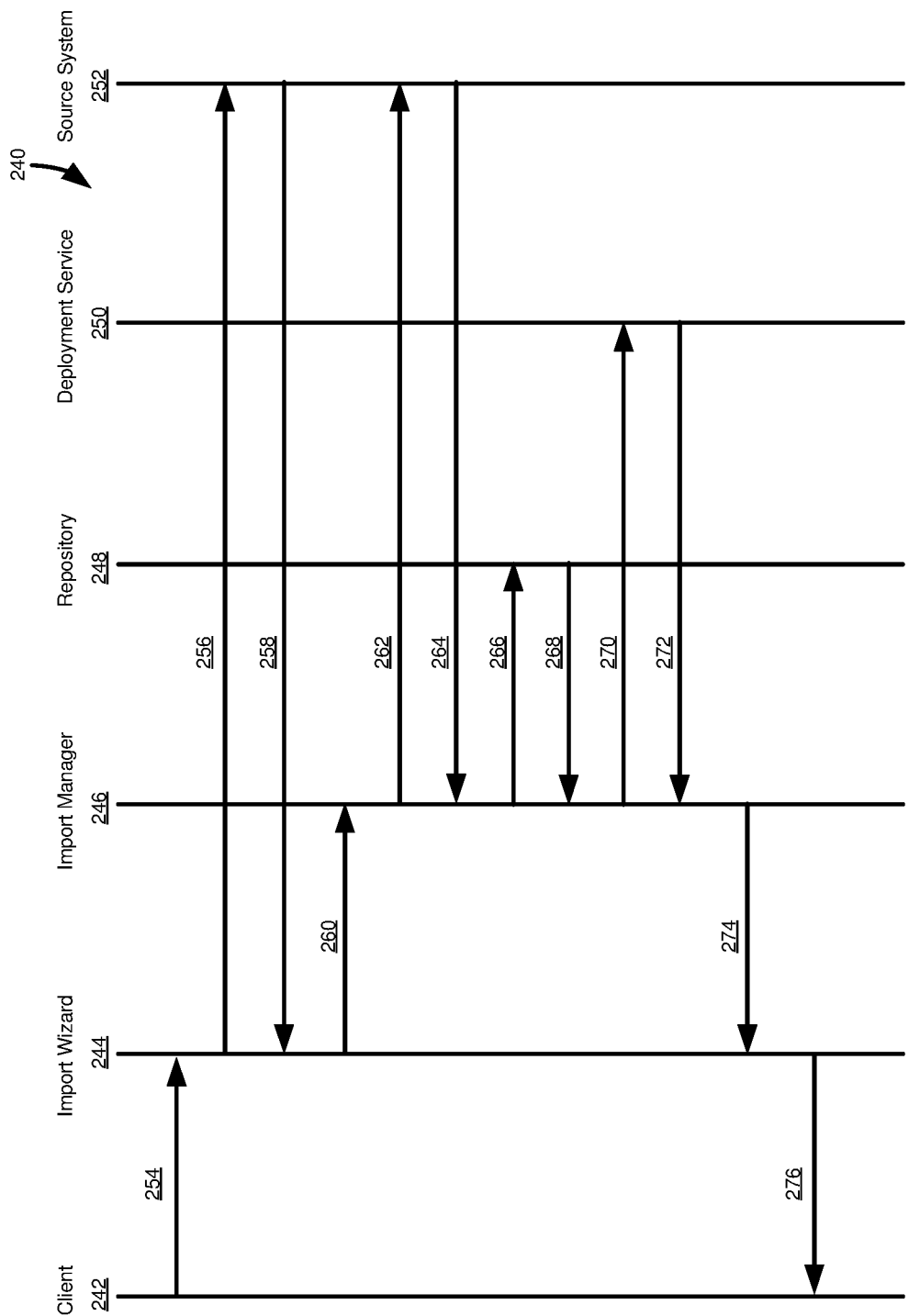

```
sqlapi: "1.0.0"
info:
  version: 1.2.3
  title: Some API
servers:
- description: Main API server
  connections:
  - odbc:
      driver: dbc2abap
      host: 96de1186-6257-4407-ae22-
            484ad9a54d2c.api.at.some.
            domain.cloud.sap
      port: 443
      servicePath: /sap/bc/sql/sql1/
                   sap/someapi/
      encrypt: true
objects:
  schemas:
  - SomeAPI:
      views:
        Product:  # "Product" API view          ← 314
          columns:
          - name: ProductExternalID
            type:
              $ref: "#/components/atomic-
                     types/NVARCHAR(40)"
            notNull: true
          - name: Name
            type:
              $ref: "#/components/atomic-
                     types/NVARCHAR(256)"
          ...

components:
  atomic-types:
    NVARCHAR(40):
      ...
    NVARCHAR(256):
      ...
```

310 ↑

```
{
  ...
  "apiResources": [ {                                    ← 322
    "ordId": "sap.s4:sql1:SomeAPI:v1",
    "title": "Request for Quotation",
    "resourceDefinitions": [ {
      "type": "edmx",
      "mediaType": "application/xml",
      "url":
         "https://SAPES4.SAPDEVCENTER.COM:443/sap/opu/odata/
          iwbep/GWSAMPLE_BASIC/$metadata"  //not the real one...   ← 324
      "apiProtocol": "sql",
    } ],
    ...                                   326      330
    "type": "sql-api",
    "targetUseCases": [ "ETL" ],
    "entityTypeMappings": [ {
      "apiResourceSelectors": [ {
        "type": "sql-api",
        "schemaName": "SomeAPI",
        "tableName": "Product",
      } ],
      "entityTypeCorrelations": [ {                ← 332
        "correlationId": "sap.s4:I_Product",
        "coverage": "full"
      } ]
    } ]
  } ], ...
}
```

320 ↑

```
        330
         ↓
"definitions": {
  "I_Product": {
    "kind": "entity",
    "elements": {                 332
      "ProductExternalID": {
314 →   "type": "abap.char",
        "length": 40
      }, ...                ← 332
    },
    "query": {
      "SELECT": {
        "from": {
          "ref": [ "MARA" ] },
        ...
```

FIG. 3

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'
@Analytics.dataCategory: #DIMENSION
@AccessControl.authorizationCheck: #CHECK
@Metadata.allowExtensions: true
@Search.searchable: true
define view I_SampleSalesOrder
 as select from         vbak
   left outer to one join vbkd on vbak.vbeln = vbkd.vbeln
                               and vbkd.posnr = '000000' association [0..*] to I_SampleSalesOrderItem as _Item
  on $projection.SalesOrder = _Item.SalesOrder
association [0..1] to I_SampleCurrency as _TransactionCurrency
  on $projection.TransactionCurrency = _TransactionCurrency.Currency
association [0..1] to I_SampleCustomer     as _SoldToParty
  on $projection.SoldToParty = _SoldToParty.Customer
{
  @Search.defaultSearchElement: true
  key cast(vbak.vbeln as vdm_sales_order_preserving_type) as SalesOrder,
  @ObjectModel.association.type: [#TO_COMPOSITION_CHILD]   //Composition
  _Item,
  vbak.vkorg                                       as SalesOrganization,
  vbak.auart                                       as SalesOrderType,
  vbak.vtweg                                       as DistributionChannel,
  @ObjectModel.foreignKey.association: '_SoldToParty'
  vbak.kunnr                                       as SoldToParty,
  _SoldToParty,
  @DefaultAggregation: #SUM
  @Semantics.amount.currencyCode: 'TransactionCurrency'
  vbak.netwr                                       as TotalNetAmount,
  @Semantics.currencyCode: true
  @ObjectModel.foreignKey.association: '_TransactionCurrency'
  vbak.waerk                                       as TransactionCurrency,
  _TransactionCurrency,
  ...
}
where vbak.vbtyp = 'C';
```

FIG. 9

```
@AbapCatalog.sqlViewName: 'ISAMPLESO'
@EndUserText.label: 'Sample Sales Order'
@ObjectModel.compositionRoot: true
@Analytics.dataCategory: #DIMENSION
@ObjectModel.representativeKey: 'SalesOrder' 1004
@AccessControl.authorizationCheck: #CHECK
@Metadata.allowExtensions: true
@Search.searchable: true
define view I_SampleSalesOrder
  as select from     vbak
    left outer to one join vbkd on  vbak.vbeln = vbkd.vbeln
                              and vbkd.posnr = '000000'
  association [0..*] to I_SampleSalesOrderItem as _Item
    on $projection.SalesOrder = _Item.SalesOrder
  association [0..1] to I_SampleCurrency as _TransactionCurrency
    on $projection.TransactionCurrency = _TransactionCurrency.Currency
  association [0..1] to I_SampleCustomer            as _SoldToParty
    on $projection.SoldToParty = _SoldToParty.Customer
{
  @Search.defaultSearchElement: true
  key cast(vbak.vbeln as vdm_sales_order_preserving_type) as SalesOrder,
  @ObjectModel.association.type: [#TO_COMPOSITION_CHILD]    //Composition
  _Item,
  vbak.vkorg                                   as SalesOrganization,
  vbak.auart                                   as SalesOrderType,
  vbak.vtweg                                   as DistributionChannel,
  @ObjectModel.foreignKey.association: '_SoldToParty'
  vbak.kunnr                                   as SoldToParty,
  _SoldToParty,
  @DefaultAggregation: #SUM
  @Semantics.amount.currencyCode: 'TransactionCurrency'
  vbak.netwr                                   as TotalNetAmount,
  @Semantics.currencyCode: true
  vbak.waerk                                   as TransactionCurrency,
  @ObjectModel.foreignKey.association: '_TransactionCurrency'
  _TransactionCurrency,
  ...
}
where vbak.vbtyp = 'C';
```

1008 →
```
@EndUserText.label: 'Auto assigned role for I_SampleSalesOrder'
@MappingRole: true
define role I_SampleSalesOrder {
  grant select on I_SampleSalesOrder
    where ( SalesOrderType ) =
      aspect pfcg_auth ( v_vbak_aat,
                         auart,
                         actvt = '03' );
}
```

1012 →
```
@Metadata.layer: #CORE
annotate view I_SampleSalesOrder
  with
{
  @UI.lineItem: [{importance: #HIGH }]
  SalesOrder;
  @UI.lineItem: [{importance: #HIGH }]
  SalesOrderType;
}
```

1016 →
```
@AbapCatalog.sqlViewAppendName: 'XINSAMPLEISO'
@EndUserText.label: 'Sales Order Extension India'
extend view I_SampleSalesOrder with X_IN_I_SampleSalesorder
{
  _SoldToParty.CustomerClassification
}
```

FIG. 10

Select Statements (1404)

| Object Type (1408) | Object Name (1410) | Object VersionID (1412) | EntityName (1420) | PrimaryData SourceName (1424) | PrimaryData SourceType (1426) | WhereCondition CollectionID (1428) | JoinCondition CollectionID (1436) | ... (1499) |
|---|---|---|---|---|---|---|---|---|
| DDLS | DDLS1 | 56  | VIEW1 | TABLE1 | TABLE |   |   | ... |
| DDLS | DDLS2 | 77  | VIEW2 | TABLE2 | TABLE |   |   | ... |
| DDLS | DDLS3 | 88  | VIEW3 | TABLE3 | TABLE |   | 1 | ... |
| DDLS | DDLS4 | 255 | VIEW4 | VIEW1  | VIEW  | 1 |   | ... |

Association Definition (1484)

| Object Type (1486) | Object Name (1487) | Object VersionID (1488) | Entity Name (1489) | Association Name (1490) | Association OriginalName (1492) | Target Entity Name (1494) | Target Entity Type (1495) | Target Minimum Cardinality (1496) | Target Maximum Cardinality (1497) | OnCondition CollectionID (1498) | ... (1499) |
|---|---|---|---|---|---|---|---|---|---|---|---|
| DDLS | DDLS2 | 77 | VIEW2 | _V2 | _V2 | VIEW3 | VIEW | 0 | 1 | 1 | ... |

Conditions (1438)

| Object Type (1440) | Object Name (1444) | Object VersionID (1456) | Condition Collection ID (1458) | Group ID (1460) | Grouping Ordinal Number (1462) | Grouping Operator (1466) | Left Group ID (1470) | Left Data Source Name (1464) | Left Field Name (1472) | Left Value (1474) | LeftToRight Relation (1468) | Right Group ID (1476) | Right Data Source Name (1478) | Right Field Name (1480) | Right Value (1482) | ... (1499) |
|---|---|---|---|---|---|---|---|---|---|---|---|---|---|---|---|---|
| DDLS | DDLS4 | 255 | 1 | 1 |   |     |   | VIEW1  |        |   | LEFT_OUTER_JOIN | 2 |       |        |     | ... |
| DDLS | DDLS4 | 255 | 1 | 2 | 1 |     |   | VIEW2  | FIELD2 |   | EQUAL     |   | VIEW1 | FIELD2 |     | ... |
| DDLS | DDLS4 | 255 | 1 | 2 | 2 | AND |   | VIEW2  | FIELD3 |   | NOT_EQUAL |   |       |        | REL | ... |
| DDLS | DDLS3 | 88  | 1 |   |   |     |   | TABLE3 | FIELD4 |   |           |   |       |        |     | ... |
| DDLS | DDLS2 | 77  | 1 | 1 |   |     |   | VIEW2  | FIELD3 |   | EQUAL     |   | VIEW3 |        | x   | ... |

FIG. 14

DDLS2

```
define view View2                                    1504
  as select from View1
{                                1520
  key View1.Field1 as AliasedField1,
  case View1.Field2
    when 'VAL1' then 'X'
    when 'VAL2' then 'Y'
    else 'Z'              1522
  end as CalculatedField2,                          1524
  concat( View1.Field1, View1.Field2) as CalculatedField3,
  cast( View1.Field3 as DE4 preserving type ) as CalculatedField4
}                                                          1526
```

DDLS1

```
                         1508
  define view View1
    as select from Table1
  {                    1530
    key Table1.Field1,
        Table1.Field2,
        Table1.Field3  1532
  }       1534
```

TABLE1

```
                       1512
  define table Table1
  {        1540
    key Field1 : DE1 not null;
      Field2 : DE2;
  1542  Field3 : DE3;
  }       1544
```

FIG. 15

| Object Type | Object Name | Object Version ID | Entity Name | Field Name | Field Original Name | Base Entity Name | Base Entity Type | Base Field Name | Base Expression ID | IsKey Field | Data Element | Data Type | Data Type Length |
|---|---|---|---|---|---|---|---|---|---|---|---|---|---|
| DDLS | DDLS1 | 13 | VIEW1 | FIELD1 | Field1 | TABLE1 | TABL | FIELD1 | | TRUE | DE1 | CHAR | 30 |
| DDLS | DDLS1 | 13 | VIEW1 | FIELD2 | Field2 | TABLE1 | TABL | FIELD2 | | | DE2 | CHAR | 10 |
| DDLS | DDLS1 | 13 | VIEW1 | FIELD3 | Field3 | TABLE1 | TABL | FIELD3 | | | DE3 | CHAR | 20 |
| DDLS | DDLS2 | 65 | VIEW2 | ALIASEDFIELD1 | AliasedField1 | VIEW1 | VIEW | FIELD1 | | TRUE | DE1 | CHAR | 30 |
| DDLS | DDLS2 | 65 | VIEW2 | CALCULATEDFIELD2 | CalculatedField2 | | | | 1 | | | CHAR | 4 |
| DDLS | DDLS2 | 65 | VIEW2 | CALCULATEDFIELD3 | CalculatedField3 | | | | 2 | | | CHAR | 40 |
| DDLS | DDLS2 | 65 | VIEW2 | CALCULATEDFIELD4 | CalculatedField4 | VIEW1 | VIEW | FIELD3 | | | DE4 | CHAR | 20 |
| TABL | TABLE1 | 24 | TABLE1 | FIELD1 | | | | | | TRUE | DE1 | CHAR | 30 |
| TABL | TABLE1 | 24 | TABLE1 | FIELD2 | | | | | | | DE2 | CHAR | 10 |
| TABL | TABLE1 | 24 | TABLE1 | FIELD3 | | | | | | | DE3 | CHAR | 20 |

| Data Type Decimals | Field Definition StartLine | Field Definition StartColumn | Field Definition EndLine | Field Definition EndColumn | ... |
|---|---|---|---|---|---|
| ... | ... | ... | ... | ... | ... |
| | 4 | 2 | 4 | 35 | ... |
| | 5 | 2 | 9 | 25 | ... |
| | 10 | 2 | 10 | 57 | ... |
| | 11 | 2 | 11 | 65 | ... |
| ... | | | | | ... |

FIG. 16

ObjectVersionSource 2112, 2114, 2116

2104

| ObjectType | ObjectName | ObjectVersionId | ... |
|---|---|---|---|
| DDLS | I_CUSTOMER | 1 | ... |
| DDLS | I_CUSTOMER | 2 | ... |
| DDLS | I_CUSTOMER | 3 | ... |
| DDLS | I_CUSTOMER | 4 | ... |
| DDLS | I_CUSTOMER | 5 | ... |
| DDLS | I_SALESORDER | 1 | ... |
| DDLS | I_SALESORDER | 2 | ... |
| DDLS | I_SALESORDER | 3 | ... |
| DDLS | I_SALESORDERITEM | 1 | ... |

2108

DdlsVersion 2120, 2122, 2124, 2126

| DdlsName | DdlsVersionID | CdsEntityName | CdsEntityOriginalName | ... |
|---|---|---|---|---|
| I_CUSTOMER | 1 | I_CUSTOMER | I_Customer | ... |
| I_CUSTOMER | 2 | I_CUSTOMER | I_Customer | ... |
| I_CUSTOMER | 3 | I_CUSTOMER | I_Customer | ... |
| I_CUSTOMER | 4 | I_CUSTOMER | I_Customer | ... |
| I_CUSTOMER | 5 | I_CUSTOMER | I_Customer | ... |
| I_SALESORDER | 1 | I_SALESORDER | I_SalesOrder | ... |
| I_SALESORDER | 2 | I_SALESORDER | I_SalesOrder | ... |
| I_SALESORDER | 3 | I_SALESORDER | I_SalesOrder | ... |
| I_SALESORDERITEM | 1 | I_SALESORDERITEM | I_SalesOrderItem | ... |

FIG. 21

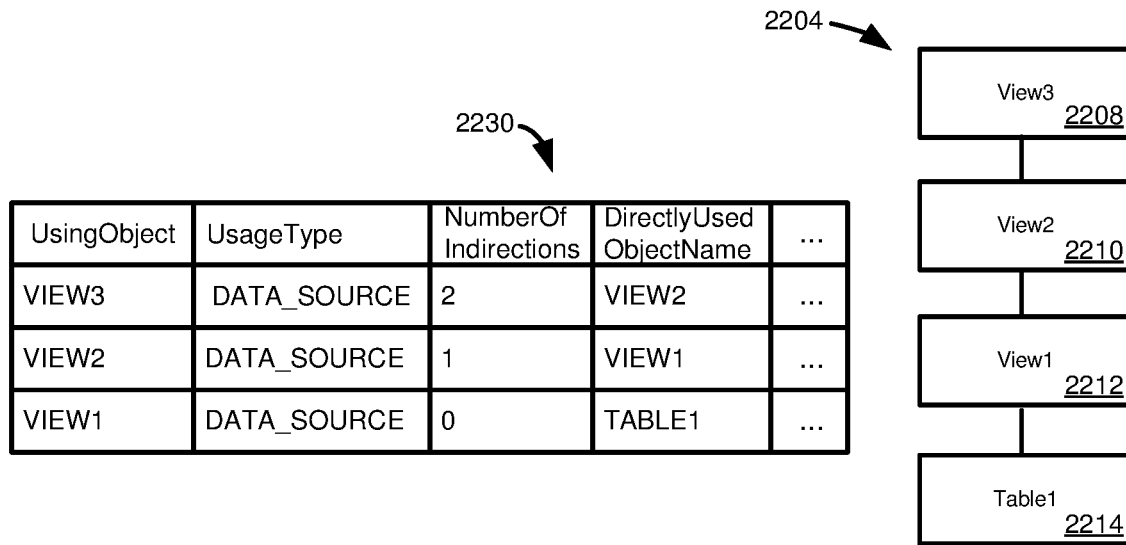

FIG. 22

```
<Annotations xmlns="http://docs.oasis-open.org/odata/ns/edm" Target=".../FieldName">
  <Annotation Term="Common.ValueList">
    <Record>
      <PropertyValue String="FieldName" Property="Label"/>
      <PropertyValue String="Field" Property="CollectionPath"/>
      <PropertyValue Property="SearchSupported" Bool="true"/>
      <PropertyValue Property="Parameters">
        <Collection>
          <Record Type="Common.ValueListParameterInOut">
            <PropertyValue Property="LocalDataProperty" PropertyPath="FieldName"/>
            <PropertyValue String="FieldName" Property="ValueListProperty"/>
          </Record>
          <Record Type="Common.ValueListParameterDisplayOnly">
            ...
          </Record>
          ...
        </Collection>
      </PropertyValue>
    </Record>
  </Annotation>
</Annotations>
```

FIG. 23

```
@Scope: [#VIEW, #ENTITY]
annotation DataWarehouse {
        @Scope: [#CONTEXT]
        contentImport: {
                acnPackage: String(100);
                connection: String(100);      2414                2404
                readOnly: boolean
        };
        space: String(100);
        @Scope: [#VIEW, #ENTITY]
        compoundKeySequence: array of ElementRef;
        enclosingObject: EntityRef;
        external: {
                schema: String(100);
                entity: String(100)
        };
        pinToMemory: boolean;
...
};
```

FIG. 24A

```
{
        "vocabularies": {
                "DataWarehouse": {
                        ...,
                        "@Scope": [
                                { { "#" }, { "VIEW" } },
                                { { "#" }, { "ENTITY" } }
                                ],
                        "elements": {                                              2426
                                "contentImport": {
                                        "@Scope: [ { { "#" }, { "CONTEXT" } } ],
                                        "elements": {
                                        "acnPackage": "cds.String(100)",
                                        "connection": "cds.String(100)",
                                        "readOnly": "cds.boolean"
                                        }
                                },
                                "space": "cds.String(100)",
                                "@Scope": [
                                        { { "#" }, { "VIEW" } },
                                        { { "#" }, { "ENTITY" } }
                                        ],
                                "compoundKeySequence": "ElementRef",
                                "enclosingObject": "EntityRef",
                                "external: {
                                "elements": {
                                        "schema": "cds.String(100)",
                                        "entity": "cds.String(100)"
                                        }
                                },
                                "pinToMemory": "cds.Boolean",
                                ...
                                }
                        }
                }
        }
}
```

FIG. 24B

```
annotation A {
        B: array of {                     2504
                C: Integer;
        }
}
```

FIG. 25A

```
{
        "vocabularies": {
        "A": {
                "B": {                                    2508
                        "items": {
                                "elements": {
                                        "C": "cds.Integer"
                                }
                        }
                }
            }
        }
}
```

FIG. 25B

```
annotation Semantics {
        telephone {                       2604
                type : array of String(10) enum {
                        HOME;
                        CELL;
                        WORK;
                        FAX;
                        PREF;
                        TEXT;
                        VOICE;
                        VIDEO;
                        PAGER;
                        TEXT_PHONE;
                } default PREF;
        };                    2606
        ...
}
```

FIG. 26A

```
{
    "definitions": {
        "telephoneTypeType": {
            "kind": "type",
            "type": "cds.String(10)",
            "enum": { "HOME", "CELL", "WORK", "FAX", "PREF", "TEXT", "VOICE", "VIDEO", "PAGER", "TEXT_PHONE" }
        }
    },
    "vocabularies": {
        "Semantics": {
            "elements": {
                "telephone": {
                    "elements": {
                        "type": {
                            "type": "telephoneTypeType",
                            "default": {
                                "val": { "#": "PREF" }
                            }
                        },
                        ...
                    }
                }
            }
        }
    }
}
```
2608

```
{"ordId":"sap.s4.a234:apiResource:XY_APIPACKAGE_0001:v1","title":"","shortDescription":"\r\n\r\n\r\n","description":"","version":"1.0.0","systemInstanceAware":true,"partOfPackage":"sap.s4.a234:package:Z_ODA_IN_PACK:v2020","partOfConsumptionBundles":[{"ordId":"sap.s4.a234:consumptionBundle:APS_ODA_HOME_ODA_PACK_V4:v1"}],"apiProtocol":"odata-v4","visibility":"public","resourceDefinitions":[{"type":"openapi-v3","mediaType":"application/json","url":"/sap/bc/http/sap/aps_oda_http_get_api_content/?api=XY_APIPACKAGE_0001&type=JSON&sap-client=000","accessStrategies":[{"type":"custom","customType":"sap:aps-iam-access-strategy:v1"}]},{"type":"edmx","mediaType":"application/xml","url":"/sap/bc/http/sap/aps_oda_http_get_api_content/?api=XY_APIPACKAGE_0001&type=EDMX&sap-client=000","accessStrategies":[{"type":"custom","customType":"sap:aps-iam-access-strategy:v1"}]}],"releaseStatus":"active","changelogEntries":[{"version":"1.0.0","releaseStatus":"active","date":"2020-11-23"}],"entryPoints":["/sap/opu/odata4/sap/aps_oda_home_oda_pack_v4/srvd_a2x/sap/apipackage/0001/"],"extensible":{"supported":"no"},"implementationStandard":"sap:ord-document-api:v1"},{"ordId":"sap.s4:apiResource:IN_APIPACKAGE_0001:v1","title":"","shortDescription":"\r\n\r\n\r\n","description":"","version":"1.0.0","systemInstanceAware":true,"partOfPackage":"sap.s4:package:Z_IN_ODA_PACKAGE_T:v2020","partOfConsumptionBundles":[{"ordId":"sap.s4:consumptionBundle:APS_ODA_HOME_ODA_PACK_V4:v1"}],"apiProtocol":"odata-v4","visibility":"public","resourceDefinitions":[{"type":"openapi-v3","mediaType":"application/json","url":"/sap/bc/http/sap/aps_oda_http_get_api_content/?api=IN_APIPACKAGE_0001&type=JSON&sap-client=000","accessStrategies":[{"type":"custom","customType":"sap:aps-iam-access-strategy:v1"}]},{"type":"edmx","mediaType":"application/xml","url":"/sap/bc/http/sap/aps_oda_http_get_api_content/?api=IN_APIPACKAGE_0001&type=EDMX&sap-client=000","accessStrategies":[{"type":"custom","customType":"sap:aps-iam-access-strategy:v1"}]}],"releaseStatus":"active","changelogEntries":[{"version":"1.0.0","releaseStatus":"active","date":"2020-11-23"}],"entryPoints":["/sap/opu/odata4/sap/aps_oda_home_oda_pack_v4/srvd_a2x/sap/apipackage/0001/"],"extensible":{"supported":"no"},"implementationStandard":"sap:ord-document-api:v1"},{"ordId":"sap.s4:apiResource:IN_AA_EVENT_IN:v1","title":"Proxy Interface (generated)","shortDescription":"\r\n\r\n\r\n","description":"","version":"1.0.0","systemInstanceAware":true,"partOfPackage":"sap.s4:package:Z_IN_ODA_PACKAGE_T:v2020","apiProtocol":"soap-inbound","visibility":"public","resourceDefinitions":[{"type":"openapi-v3","mediaType":"application/json","url":"/sap/bc/http/sap/aps_oda_http_get_api_content/?api=IN_AA_EVENT_IN&type=JSON&sap-client=000","accessStrategies":[{"type":"custom","customType":"sap:aps-iam-access-strategy:v1"}],{"type":"wsdl-v1","mediaType":"application/xml","url":"/sap/bc/http/sap/aps_oda_http_get_api_content/?api=IN_AA_EVENT_IN&type=EDMX&sap-client=000","accessStrategies":[{"type":"custom","customType":"sap:aps-iam-access-strategy:v1"}]}],"releaseStatus":"active","entryPoints":["/sap/bc/srt/scs_ext/sap/aa_event_in"],"extensible":{"supported":"no"},"implementationStandard":"sap:ord-document-api:v1"},{"ordId":"sap.s4:apiResource:IN_CO_AJT_ZAHLUNGSVERKEHR:v1","title":"Ok, now VERY new englisch text","shortDescription":"\r\n\r\n\r\n","description":"","version":"1.0.0","systemInstanceAware":true,"partOfPackage":"sap.s4:package:Z_IN_ODA_PACKAGE_T:v2020","apiProtocol":"soap-outbound","visibility":"public","resourceDefinitions":[{"type":"openapi-v3","mediaType":"application/json","url":"/sap/bc/http/sap/aps_oda_http_get_api_content/?api=IN_CO_AJT_ZAHLUNGSVERKEHR_PORT&type=JSON&sap-client=000","accessStrategies":[{"type":"custom","customType":"sap:aps-iam-access-strategy:v1"}]},
```

FIG. 27H

```
{"type":"wsdl-v1","mediaType":"application/xml","url":"/sap/bc/http/sap/aps_oda_http_get_api_content/
?api=IN_CO_AJT_ZAHLUNGSVERKEHR_PORT&type=EDMX&sap-
client=000","accessStrategies":[{"type":"custom","customType":"sap:aps-iam-access-
strategy:v1"}]},{"ordId":"sap.s4:apiResource:IN_APS_ODA_HOME_MAINTAIN_BUPA_IN:v1","title":"Maintain Business
document-api:v1"),("ordId":"sap.s4:apiResource:IN_APS_ODA_HOME_MAINTAIN_BUPA_IN:v1","title":"Maintain Business
Partner","shortDescription":"This is a service to Maintain/Query Business PartnerYou can use this service to
integrate external applications with sales order processing in SAP S/4HANA Cloud","description":"In every API call,
you can make use of the following operations:\r\n - You can retrieve sales orders. Apply any of the filters provided
or retrieve all existing data.\r\n - You can create sales orders. Note that you must use â€œdeep insertâ€ requests
(a header plus the following entities: header partner, header pricing element, header text, payment details, item,
item partner, item pricing element, and item text). You cannot create entities without including any related
entities.\r\n - For existing sales orders, you can create new items. Note that you must use â€œdeep insertâ€
requests (with the following entities: item partner, item pricing element, and item text). You cannot create
entities without including any related entities.\r\n - For existing sales orders, you can update the header, header
partner, header pricing element, header text, payment details, item, item partner, item pricing element, and item
text.\r\n - For existing sales orders, you can delete the header, header partner, header pricing element, header
text, payment details, item, item partner, item pricing element, and item text.\r\n - You can accept or deny
approval requests for sales orders that cannot be processed without the consent of an approver.\r
\n","version":"1.2.0","systemInstanceAware":true,"partOfPackage":"sap.s4:package:Z_IN_ODA_PACKAGE_I:v2020","apiProtoc
ol":"soap-inbound","visibility":"public","resourceDefinitions":[{"type":"openapi-v3","mediaType":"application/
json","url":"/sap/bc/http/sap/aps_oda_http_get_api_content/?api=IN_APS_ODA_HOME_MAINTAIN_BUPA_IN&type=JSON&sap-
client=000","accessStrategies":[{"type":"custom","customType":"sap:aps-iam-access-strategy:v1"}]},{"type":"wsdl-
v1","mediaType":"application/xml","url":"/sap/bc/http/sap/aps_oda_http_get_api_content/
?api=IN_APS_ODA_HOME_MAINTAIN_BUPA_IN&type=EDMX&sap-
client=000","accessStrategies":[{"type":"custom","customType":"sap:aps-iam-access-
strategy:v1"}]},"releaseStatus":"active","entryPoints":[{"/sap/bc/srt/scs_ext/sap/
aps_oda_home_maintain_bupa_in"],"extensible":{"supported":"no"},"implementationStandard":"sap:ord-document-
api:v1","ordId":"sap.s4:apiResource:CP_APIPACKAGE_0001:v1","title":"","shortDescription":"\r\n\r\r
\n","description":"","version":"1.0.0","systemInstanceAware":true,"partOfPackage":"sap.s4:package:MyAliasCC:v2020","p
artOfConsumptionBundles":[{"ordId":"sap.s4:consumptionBundle:APS_ODA_HOME_ODA_PACK_V4:v1"}],"apiProtocol":"odata-
v4","visibility":"public","resourceDefinitions":[{"type":"openapi-v3","mediaType":"application/json","url":"/sap/bc/
http/sap/aps_oda_http_get_api_content/?api=CP_APIPACKAGE_0001&type=JSON&sap-
client=000","accessStrategies":[{"type":"custom","customType":"sap:aps-iam-access-
strategy:v1"}]},{"type":"ednx","mediaType":"application/xml","url":"/sap/bc/http/sap/aps_oda_http_get_api_content/
?api=CP_APIPACKAGE_0001&type=EDMX&sap-client=000","accessStrategies":[{"type":"custom","customType":"sap:aps-iam-
access-
strategy:v1"}]},"releaseStatus":"active","changelogEntries":[{"version":"1.0.0","releaseStatus":"active","date":"20
20-11-23"}],
```

```
{
  "definitions": {
    "I_SalesOrder": {
      "kind": "entity",
      "query": {
        "SELECT": {
          "from": {
            "ref": ["I_SalesDocument"],
            "as": "SalesDocument"
          },
          "mixin": {
            "_BusinessAreaText": {
              "type": "cds.Association",
              "cardinality": {
                "max": "*"
              },
              "target": "I_BusinessAreaText",
              "on": [{
                "ref": ["$projection", "BusinessArea"]
              }, {
                "=": ","
              }, {
                "ref": ["_BusinessAreaText", "BusinessArea"]
              }]
            },
            "_CostCenterBusinessAreaText": {
              "type": "cds.Association",
              "cardinality": {
                "max": "*"
              },
              "target": "I_BusinessAreaText",
              "on": [{
                "ref": ["$projection", "CostCenterBusinessArea"]
              }, {
                "=": ","
              }, {
                "ref": ["_CostCenterBusinessAreaText", "BusinessArea"]
              }]
            },
            "_CreditControlAreaText": {
              "type": "cds.Association",
              "cardinality": {
                "max": "*"
              },
              "target": "I_CreditControlAreaText",
              "on": [{
                "ref": ["$projection", "CreditControlArea"]
              }, {
                "=": ","
              }, {
                "ref": ["_CreditControlAreaText", "CreditControlArea"]
              }]
            },
```

FIG. 28A

```
"_CreditControlAreaText"],
"@ObjectModel.compositionRoot": true,
"@ObjectModel.representativeKey": "SalesOrder",
"@ObjectModel.usageType.dataClass": {
    "#": "TRANSACTIONAL"
},
"@ObjectModel.usageType.serviceQuality": {
    "#": "B"
},
"@ObjectModel.usageType.sizeCategory": {
    "#": "L"
},
"@ObjectModel.supportedCapabilities": [{
    "#": "ANALYTICAL_DIMENSION"
},
{
    "#": "CDS_MODELING_ASSOCIATION_TARGET"
},
{
    "#": "SQL_DATA_SOURCE"
},
{
    "#": "CDS_MODELING_DATA_SOURCE"
}],
"@ObjectModel.modelingPattern": [{
    "#": "ANALYTICAL_DIMENSION"
}],
            "@Metadata.allowExtensions": true,
"elements": {
    "SalesOrder": {
        "@EndUserText.quickInfo": "{i18n>I_SALESORDER.SALESORDER@ENDUSERTEXT.QUICKINFO}",
        "@EndUserText.label": "{i18n>I_SALESORDER.SALESORDER@ENDUSERTEXT.LABEL}",
        "@EndUserText.heading": "{i18n>I_SALESORDER.SALESORDER@ENDUSERTEXT.HEADING}",
        "key": true,
        "type": "cds.String",
        "length": 10
    },
"SlsDocIsRlvtForProofOfDeliv": {
        "@EndUserText.quickInfo": "{i18n>I_SALESORDER.SLSDOCISRLVTFORPRCOFOFDELIV@ENDUSERTEXT.QUICKINFO}",
        "@EndUserText.label": "{i18n>I_SALESORDER.SLSDOCISRLVTFORPROOFOFDELIV@ENDUSERTEXT.LABEL}",
        "@EndUserText.heading": "{i18n>I_SALESORDER.SLSDOCISRLVTFORPROOFOFDELIV@ENDUSERTEXT.HEADING}",
        "type": "cds.Boolean"
    },
    "CreditControlArea": {
        "@Consumption.valueHelpDefinition": [{
            "entity": {
                "name": "I_CreditControlAreaStdVH",
                "element": "CreditControlArea"
            }
        }],
        "@ObjectModel.text.association":
```

FIG. 28B

```
"ServiceObjectType"]
        }, "=", {
            "val": "BUS2000172"
        }]
    },
    "_StandardPartner": {
        "type": "cds.Association",
        "target": "I_SalesDocumentStandardPartner",
        "cardinality": {
            "min": 1,
            "max": 1
        },
        "on": [{
            "ref": ["SalesOrder"]
        }, "=", {
            "ref": ["_StandardPartner", "SalesDocument"]
        }]
    },
    "_TransactionCurrency": {
        "type": "cds.Association",
        "target": "I_Currency",
        "cardinality": {
            "max": 1
        },
        "on": [{
            "ref": ["TransactionCurrency"]
        }, "=", {
            "ref": ["_TransactionCurrency", "Currency"]
        }]
    },
    "_VATRegistrationCountry": {
        "type": "cds.Association",
        "target": "I_Country",
        "cardinality": {
            "max": 1
        },
        "on": [{
            "ref": ["VATRegistrationCountry"]
        }, "=", {
            "ref": ["_VATRegistrationCountry", "Country"]
        }]
    }
}
},
"meta": {
    "creator": "ABAP Exporter v1.0.2"
},
"$version": "1.0"
}
```

FIG. 28C

IDENTIFICATION AND IMPORT OF METADATA FOR EXTENSIONS TO DATABASE ARTEFACTS

FIELD

The present disclosure generally relates to metadata that describe data artefacts, for example database artefacts such as table or views. Particular implementations provide a metadata exposure service that receives requests from a target system to identity or retrieve relevant metadata in a source system.

BACKGROUND

Ever increasing amounts of data are becoming available, from an increasing variety of sources. Data associated with a specific purpose, such as a specific analog-world entity, is typically associated with metadata that describes that data. For example, a ten-digit integer might be data, but without metadata, it may be difficult to know what that ten-digit integer represents—a phone number, a driver's license number, a password, etc. Thus, using and making "sense" of data can be highly dependent on having the correct metadata to provide context to the data.

A database or other data source associated with a complex endeavor, such as the operation of a business entity, can involve thousands of table types, and billions of records. Adding to the complexity, tables or other database objects can reference each other. In some cases, metadata from one system may be useful in another system. For example, it may be desirable to replicate or transfer data from one system to another, such as when migrating from an on-premise database solution to a cloud-based solution. Or, it may be desirable to make data available to another platform, such as through data federation. However, without access to the metadata, use or interpretation of the replicated or federated data may be difficult or impossible. Manually recreating the metadata in a new system can be extraordinarily time consuming, given the vast amount of metadata that may exist in a source system. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for storing and processing metadata. A target system sends a request to a source system to identify extensions to one or more specified database artefacts. The source system identifies one or more software objects that include metadata extensions to the one or more specified database artefacts and sends at least a portion of such metadata elements to the target system in response to the request. The source system can expose APIs, such as APIs in a standard format, to the target system to assist in requesting and retrieving metadata from the source system.

In one aspect, a method is provided for sending metadata for data artefact extensions to a target system. A first is received from a target system for at least a portion of metadata in a metadata repository. One or more software objects are identified that include metadata extensions for the one or more database artefacts. At least a portion of metadata elements of the metadata extensions are returned to the target system in response to the first request.

In another aspect, a method is provided for obtaining metadata from a client system describing data for database artefacts. A plurality of database artefacts are created in a database system. The database artefacts are configured to store data or references to data, where the data is described by metadata. At least a first portion of metadata associated with the data is deployed. A request is sent to a client system for a second portion of metadata associated with the data. The second portion of the metadata is deployed.

The present disclosure also includes computing systems and tangible, non-transitory computer readable storage media configured to carry out, or including instructions for carrying out, an above-described method (or operations). As described herein, a variety of other features and advantages can be incorporated into the technologies as desired.

BRIEF DESCRIPTION OF THE DRAWINGS

FIG. 2B is a timing diagram of a method of processing a client's request for metadata, with particular detail to operation of components of a target system.

FIG. 3 illustrates how a standardized API can provide access to metadata in a standardized format and can reference an API not in the standardized format.

FIG. 9 is code for an example metadata model for a database view.

FIG. 10 is code for an example metadata model for a database view, and for metadata models which modify or refer to such example metadata model.

FIG. 14 provides example database tables illustrating how metadata model information presented in FIG. 13 can be stored in a relational format.

FIG. 15 is a schematic diagram illustrating how metadata models can have fields that are defined with respect to other metadata models.

FIG. 16 provides an example database table illustrating how metadata model information presented in FIG. 15 can be stored in a relational format.

FIGS. 21 and 22 present example tables that can be used to carry out operations requested through a data access service.

FIG. 23 presents example code that can be used to annotate a user interface service displaying metadata model information.

FIG. 24A provides an example metadata description of a data warehouse, while FIG. 24B illustrates a vocabulary that can be generated therefrom.

FIG. 25A provides an example metadata description that include an element in the form of an array, while FIG. 25B illustrates a vocabulary that can be generated therefrom.

FIG. 26A provides an example metadata description that include an element in the form of an enumerated list, while FIG. 26B illustrates a vocabulary that can be generated therefrom.

Figure 27A:
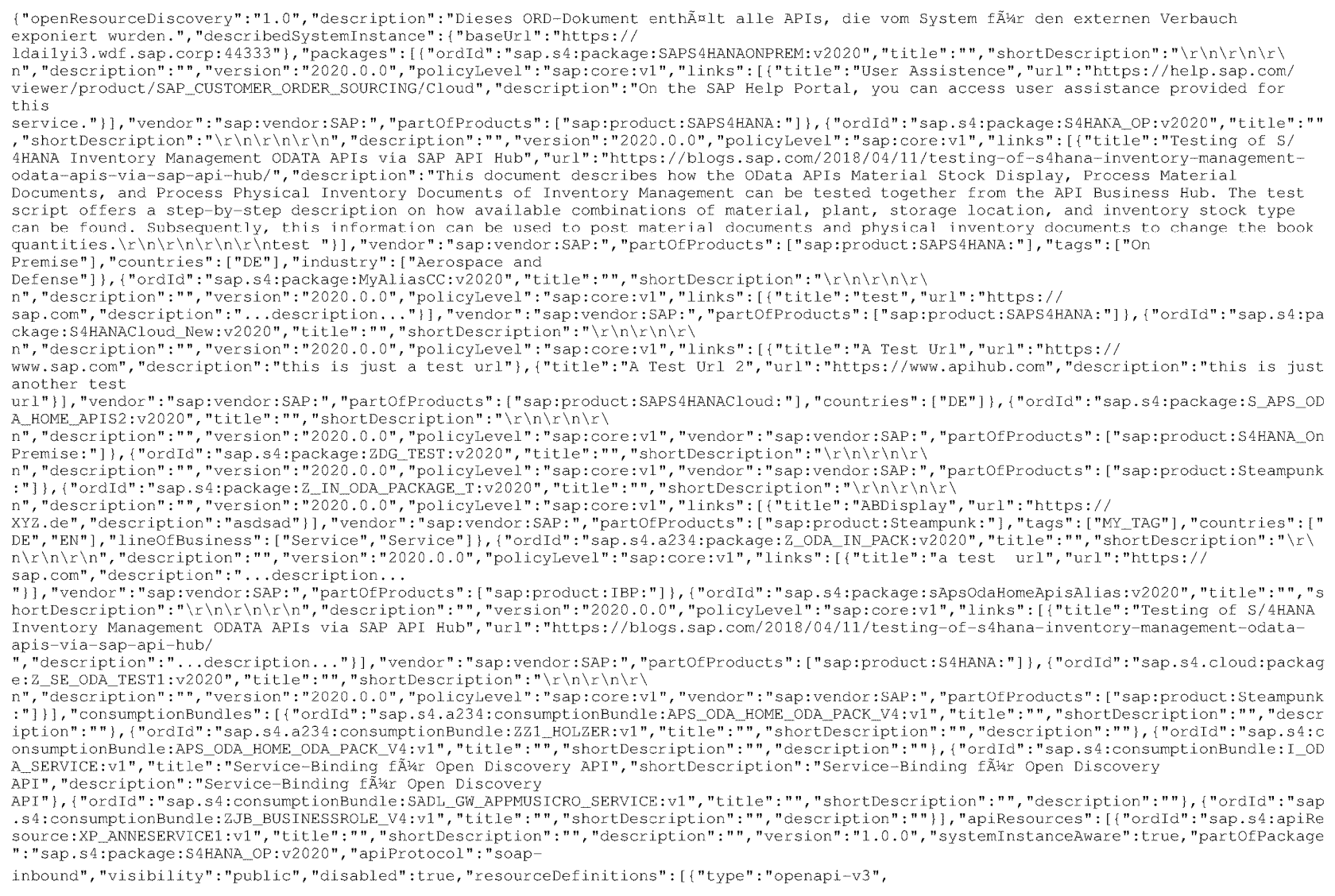
Figure 27C:
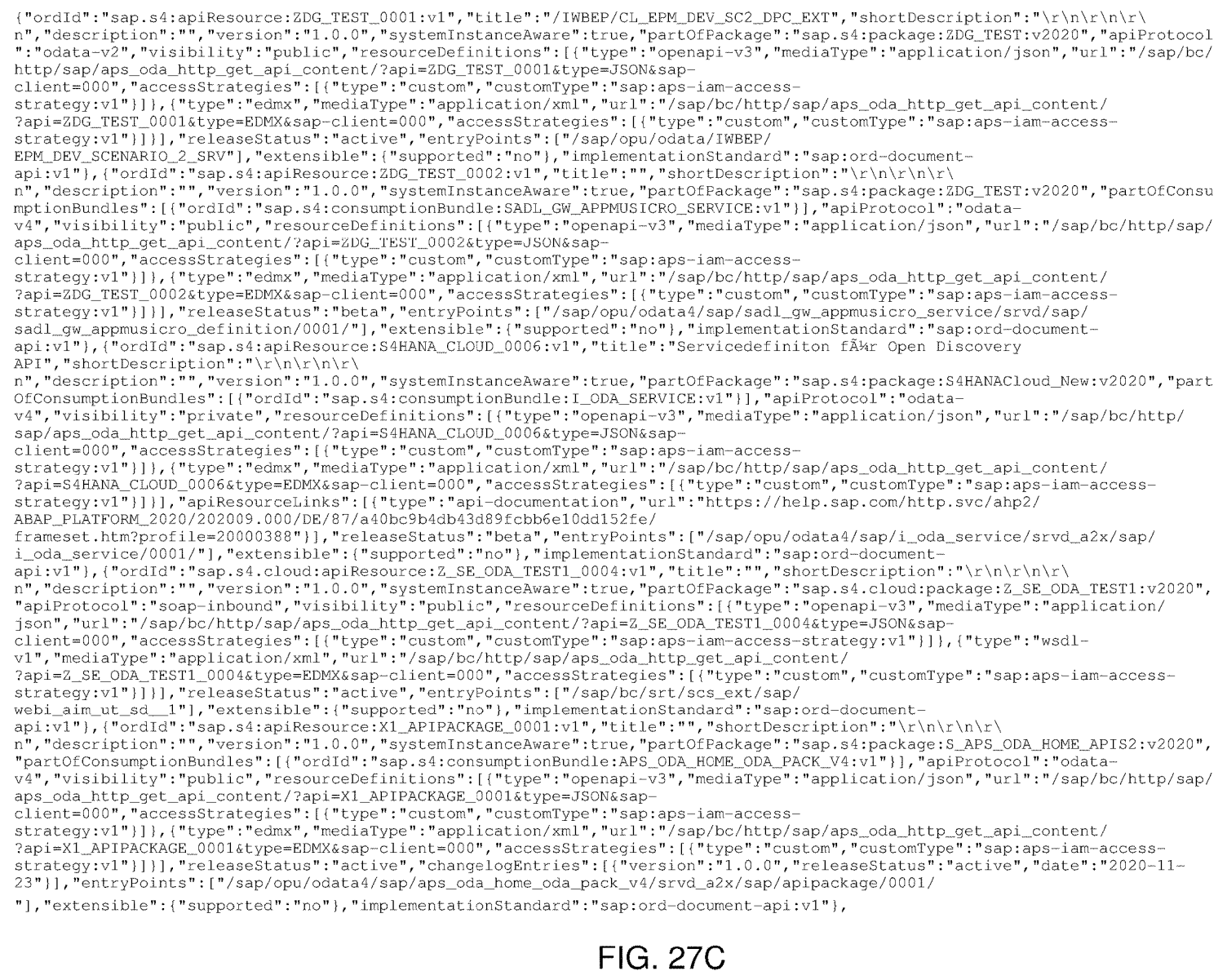
Figure 27D:
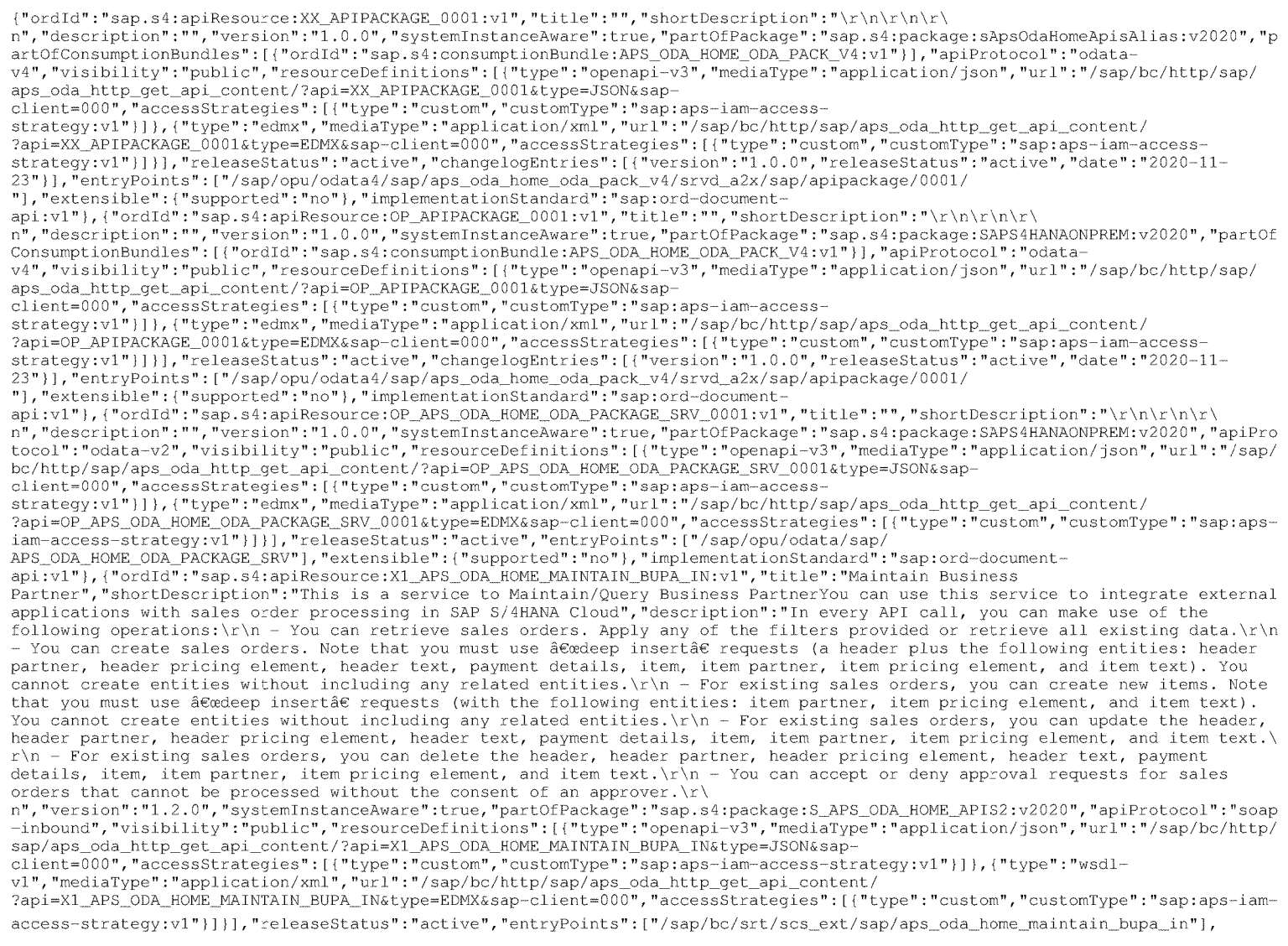
Figure 27E:
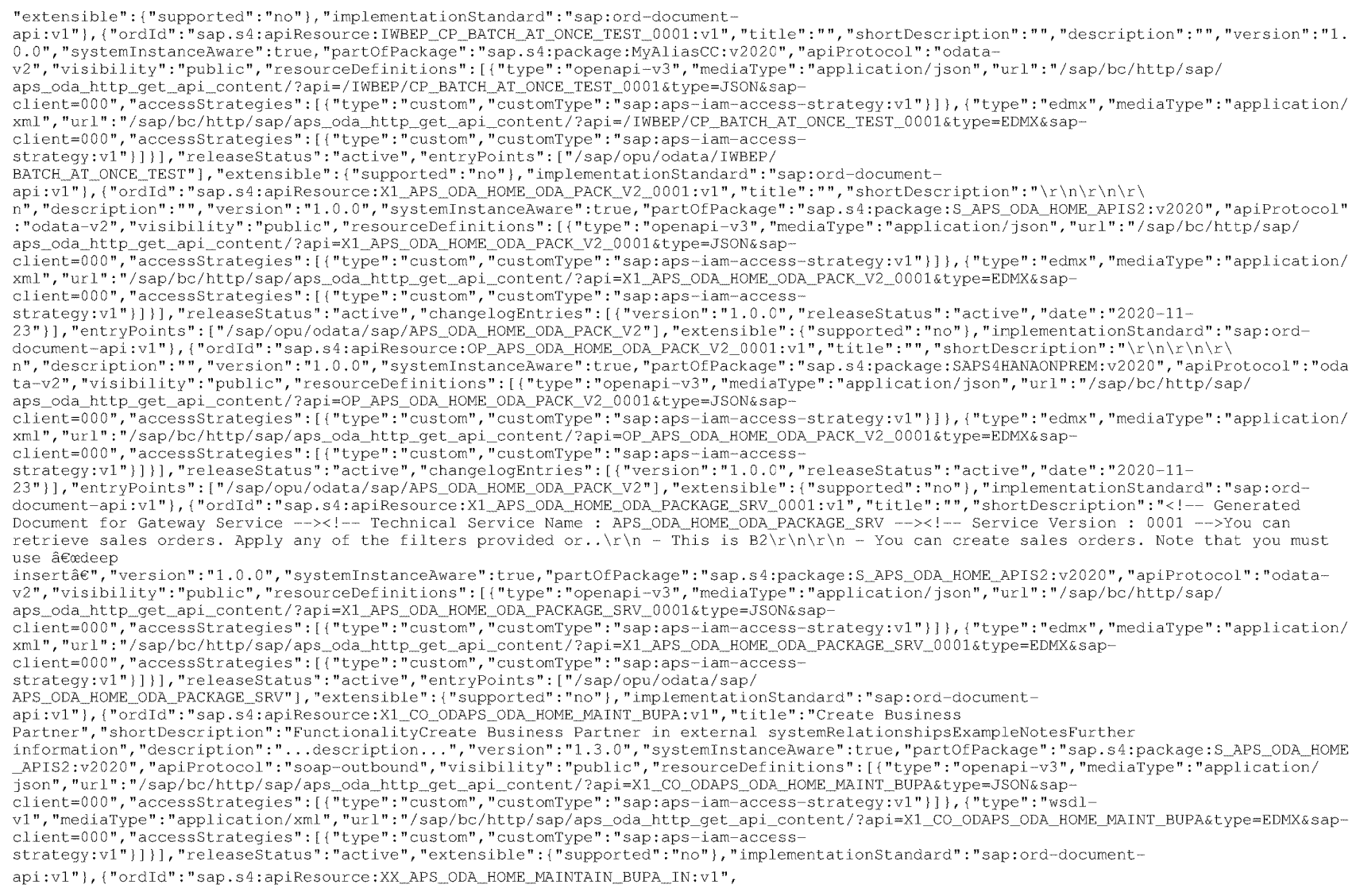

FIGS. 27A-27J provide an example listing of an API in a standardized format that can be used to retrieve metadata.

FIGS. 28A-28C provide at least a portion of an example metadata listing in a standardized format.

DETAILED DESCRIPTION

Example 1—Overview

Figure 1:
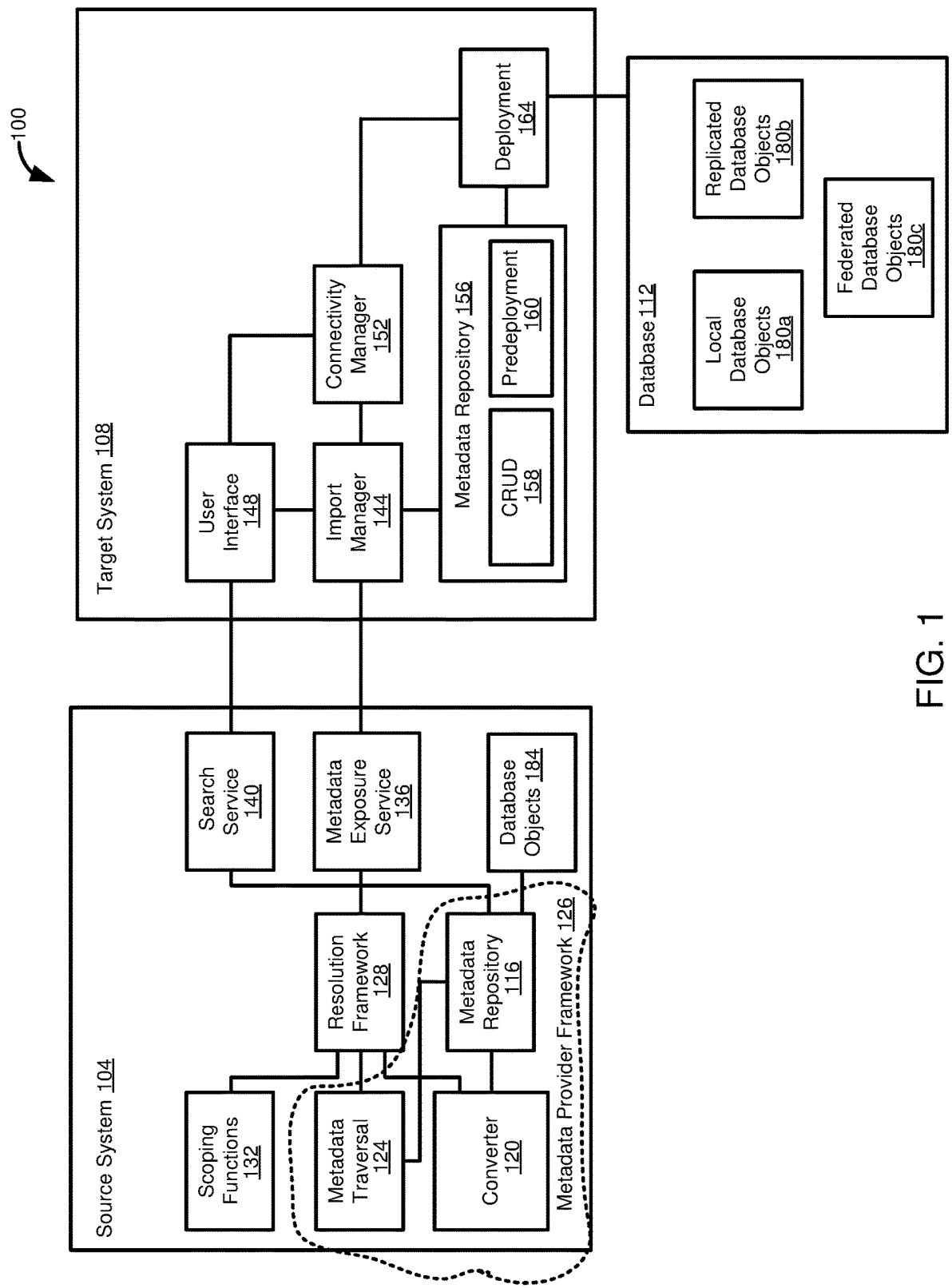
FIG. 1 is a diagram illustrating an example computing environment in which disclosed techniques can be implemented, where a source system provides a metadata exposure service that can be accessed by a target system.

Ever increasing amounts of data are becoming available, from an increasing variety of sources. Data associated with a specific purpose, such as a specific analog-world entity, is typically associated with metadata that describes that data. For example, a ten-digit integer might be data, but without metadata, it may be difficult to know what that ten-digit integer represents—a phone number, a driver's license number, a password, etc. Thus, using and making "sense" of data can be highly dependent on having the correct metadata to provide context to the data.

A database or other data source associated with a complex endeavor, such as the operation of a business entity, can involve thousands of table types, and billions of records. Adding to the complexity, tables or other database objects can reference each other. In some cases, metadata from one system may be useful in another system. For example, it may be desirable to replicate or transfer data from one system to another, such as when migrating from an on-premise database solution to a cloud-based solution. Or, it may be desirable to make data available to another platform, such as through data federation. However, without access to the metadata, use or interpretation of the replicated or federated data may be difficult or impossible. Manually recreating the metadata in a new system can be extraordinarily time consuming, given the vast amount of metadata that may exist in a source system. Accordingly, room for improvement exists.

The present disclosure provides technologies that can be used to retrieve metadata. In a particular example, the metadata can be accessed, or linked for access, when data described by the metadata at a source system is made available at a target system. For example, data at the target system can be made available by data federation (the data is retrieved from the source system when specifically requested) or by data replication (the data is retrieved from the source system and stored on the target system, such as prior to a specific request for such data). By automatically linking data made available to the target system to metadata at the source system, the data is more useable at the target system. Thus, disclosed technologies can remove the need for a user to manually recreate metadata or to manually retrieve metadata from the source system for data artefacts (such as database tables, database views, or database procedures) that are available at a source system.

In some aspects, a metadata service at the source system facilitates metadata retrieval by a target system, or by an intermediate system on behalf of the target system. The metadata service at the source system can include a metadata converter that converts metadata of the source system into a common format used to facilitate sharing of metadata content between systems. In a particular example, the common format can be CSN (core schema notation, such as used in software available from SAP, SE, of Walldorf, Germany). CSN can be considered as SQL statements enriched with annotations or semantic information.

The source system can include APIs that make metadata available to outside systems. In a particular example, metadata in the source system, which can be native metadata or metadata stored in the common format, can be flagged for exposure, which can trigger the creation of an API. For instance, a particular entity can be flagged for exposure and metadata relevant to that entity can be exposed via one or more APIs, and can optionally trigger conversion of the base metadata into the standard format.

In some cases, different source systems may make data and metadata available through different interfaces. For example, one system may have a SQL API and another system may have an OData API. The present disclosure provides technologies where source systems can include an API directory, where the API directory contains descriptions in a standard format for APIs offered by a source system.

To facilitate storage, retrieval, and comparison of models, models can be converted between representations. For example, a model can be converted between a string or string-like representation (e.g., a string holding the text of a SQL query) and a structured representation, such as a programming language (including a markup language) representation (e.g., an instance of a complex, composite, or abstract data type, such as an instance of a class) or a platform independent, but structured, format. For example, a string representation can be SQL DDL statements for defining database objects such as tables and views. The string can be parsed to generate a structured representation.

A structured representation can be a representation of these statements in a relational format, such as in one or more tables. For example, an entity (table) can store definitions of table fields and another entity (table) can store features like WHERE and JOIN conditions. Structured formats can also include formats such as XML, JSON, or CSON (Core Schema Object Notation, of SAP, SE, of Walldorf, Germany, also referred to as CSN, or Core Schema Notation). However, in some cases, format conversion can include converting between different structured formats, such as from a structured format such as XML, CSON, or JSON to a relational format, or vice versa.

In some cases, metadata from a source system can be retrieved when a database artefact is first instantiated on, or in association with, a target system. In other cases, metadata can be retrieved that supplements existing metadata for a database artefact. For example, in some cases standard content is provided to a client, which is associated with standard metadata. A client may wish to extent that content, and may have already done so on a target system. Rather than having the client recreate such content on the target system, disclosed technologies can retrieve extensions to standard metadata from a source system.

Example 2—Example Computing Environment for Facilitating Metadata Identification and Import FIG. 1 illustrates an example computing environment 100 that facilitates metadata retrieval. The computing environment 100 includes a source system 104 and a target system 108. The target system 108 is shown as being in communication with a database 112. While the database 112 is shown as a separate component from the target system 108, in some implementations the database can be part of the target system 108. In further embodiments, a computing environment 100 need not include a database 112. For example, disclosed technologies can facilitate metadata retrieval, but that retrieval need not be associated with creating database artefacts in the database 112.

The source system 104 includes a metadata repository 116. The metadata repository 116 includes metadata, such as metadata describing data maintained by, or accessible to, the source system 104, such as data maintained in relational database tables (not shown). Examples of metadata are metadata describing the data type or semantic information of data, such as information indicating when a particular set of values (such as for a particular column/field) of a database table represents a currency, a telephone number, a social security number, etc. Metadata can indicate the language of particular string values (e.g., German or English), or can provide details about a particular calculation for a particular number (e.g., how a particular KPI is calculated).

In some cases, metadata in the metadata repository 116 may be maintained in a format that is not easily consumable outside of the source system 104, or even by different applications of the source system. Accordingly, the source system 104 can include a converter 120. The converter 120 can convert metadata between formats, including between an application specific format and a standardized/transport/exchange format, such as CSN, JSON, or XML.

In some cases, the converter 120 converts metadata in the metadata repository 116 only when specifically requested, such as in response to a request from the target system 108. A metadata traversal component 124 can be called by a resolution framework 128. The metadata traversal component 124 can retrieve specific metadata, or can determine what metadata is relevant to a request. For example, a metadata request may specify a particular database object (or artefact, e.g., a table, view, column, or row), and the resolution framework 128 can determine what metadata is relevant to that database object. In some cases, metadata that is relevant to a particular request can be associated with multiple database objects. Tables, for instance, can be related to each other through formal relationships, such as a foreign key, or associations, such as implemented in products available from SAP SE, of Walldorf, Germany. The resolution framework 128 can determine related database objects and related metadata, such as by following foreign key relationships or associations.

One or more of the metadata repository 116, the converter 120, or the metadata traversal component 124 can be part of a metadata provider framework 126.

In some cases, the resolution framework 128 can access a set of scoping functions 132. The scoping functions 132 can be used to help determine the operation of the metadata traversal component 124. The scoping functions 132 can include graph traversal algorithms, such as an algorithm to determine a transitive hull. In some cases a scoping function can specify that the scope includes all hierarchy views related to the selected entity or to a dimension view, related dimension views, text views associated with the dimension views, and optionally additional dimension views within a specified level of indirection. Or a scoping function can include parameters that determine the scope of a traversal, such as retrieving all relevant or specified metadata for a particular star schema, retrieving all metadata for a particular view and all tables or views referenced by that view, or retrieving all or selected metadata for one or more specified/related database artefacts and artefacts within a specified level of indirection.

While the scoping functions 132 are shown in the source system 104, the scoping functions can be implemented in the target system 108 in place of, or in addition to, the scoping functions 132 implemented in the source system.

The resolution framework 128 can be accessed by a metadata exposure service 136, which in turn can be in communication with an import manager 144 of the target system 108. The metadata exposure service 136 can accept metadata requests from the import manager 144 and pass them to the resolution framework 128, optionally with any scoping parameters that might be specified by the target system 108.

The source system 104 can include a search service 140 that communicates with the metadata repository 116. The search service 140 can communicate all or a portion of the metadata available in the metadata repository 116. The search service 140 can allow the target system 108 to specify search terms (e.g., string, portions of strings), where relevant results from the metadata repository 116 are returned, to specify particular database objects, portions of database objects (e.g., columns), or collections of database objects (e.g., specifying a particular schema) to be returned, or a combination of search terms and database object specifications.

The search service 140 communicates with the target system 108, such as through a user interface 148. The user interface 148 allows a user or application to enter search parameters, and presents search results in response. In some cases, the user interface 148 allows a user to browse/navigate through the metadata repository 116. The user interface 148 also communicates with the import manager 144, allowing a user or application to specify requests to retrieve metadata and optionally parameters for a search request, such as scope functions to be used by the metadata traversal component 124. In other cases, the scoping functions are located at the target system 108, and the import manager 144 issues requests to the metadata exposure service 136 according to the scoping functions of the target system 108.

The user interface 148 can also communicate with a connectivity manager 152, where the connectivity manager can also communicate with the import manager 144. The connectivity manager 152 can store parameters for accessing the source system 104, such as storing a network location for the source system, login information, user credentials, etc. The communication parameters can, at least in some cases, be provided through the user interface 148. In other cases, the communication parameters can be retrieved from another source, such as from configuration information for the target system 108, for example configuration information associated with a particular application of the target system. The import manager 144 can retrieve connectivity information from the connectivity manager 152 for use in connecting to the metadata exposure service 136 of the source system 104.

The target system 108 includes a metadata repository 156. The metadata repository 156 stores metadata, including metadata received from one or more source systems 104. The metadata can be stored in the format as received from a source system 104 (e.g., CSN, XML), or can be converted to one or more formats used by the target system 108, such as storing the data in relational database tables or storing the metadata in instances of an abstract or composite data type (e.g., in logical data objects, such as BusinessObjects), or in a data dictionary (such as an ABAP data dictionary), or as elements of a virtual data model (e.g., CDS views), such as implemented in software available from SAP, SE, of Walldorf, Germany.

The metadata repository 156 can also manage changes to metadata, such as with a CRUD (Create Read Update Delete) component 158. the metadata repository 156 can manage conflicts between metadata as received from the source system 104 and metadata stored in the target system 108. Conflicts can arise, for example, if metadata is updated on the source system 104 after the metadata is initially transferred to the target system 108, or if the metadata is updated on the target system after being imported from the source system. Conflict resolution can include applying rules such as specifying that a most recent change will be applied or specifying that either the source system 104 or the target system 108 version will take precedence over the other.

The metadata repository 156 can also include a predeployment component 160, which, in other implementations, can be part of another component of the target system 108 or can be implemented as a separate component of the target system. The predeployment component 160 can communicate with a deployment component 164. Prior to sending a request to the deployment component 164, the predeployment component 160 can create suitable artefacts (e.g., tables, instances of composite or abstract data types, artefacts in a virtual data model, or updates/modifications to existing tables, data types, or artefacts) to store imported metadata. The predeployment component 160 can perform other functions, such as editing metadata to be imported. For example, an initial specification of metadata to be imported can include dangling references, such as references to database artefacts or metadata that has not been exposed for export, which is lower than a threshold granularity specified for import, or references data described by the metadata rather than for the metadata itself. The predeployment component 160 can analyze an initial import specification (such as from the import manager 144, in turn received from the metadata exposure service 136) and detect and remove such dangling references.

The predeployment component 160 can initiate a transfer of metadata, and optionally associated data, by calling the deployment component 164. In a particular implementation, the deployment component 164 causes a table or view to be created in the database 112 and metadata associated with that table to be imported. Tables or views that are created can be implemented as independent tables in the database 112, or can be implemented as tables that are identified as referencing an external table (e.g., a table stored in or accessible to the source system 104). Tables that are identified as referencing the source system 104 can be implemented as tables where data is retrieved from the tables associated with the source system, or can be linked to such tables where the data is dynamically retrieved at runtime when requested. A particular implementation of database tables that reference the source system 104 can be fabric virtual tables as implemented in software available from SAP SE, of Walldorf, Germany. The fabric virtual tables can be set as local tables that receive and store data replicated from the source system 104, or as federated tables where requested data is dynamically fetched at runtime upon request.

The database 112 can include database objects 180a, 180b, 180c, such as tables or views. Database objects 180a can represent purely local database objects (e.g., local with respect to the target system 108). Database objects 180b can represent database objects that are associated with database objects 184 of the source system 104, where data is replicated to, and stored in, the database objects 180b of the target system 108. Database objects 180c can represent database objects that are associated with the database objects 184, but where data is obtained upon request via federation from the database objects 184, rather than prospectively storing data in the database objects 180c.

Example 3—Example Operations in Metadata Identification and Retrieval

Figure 2A:
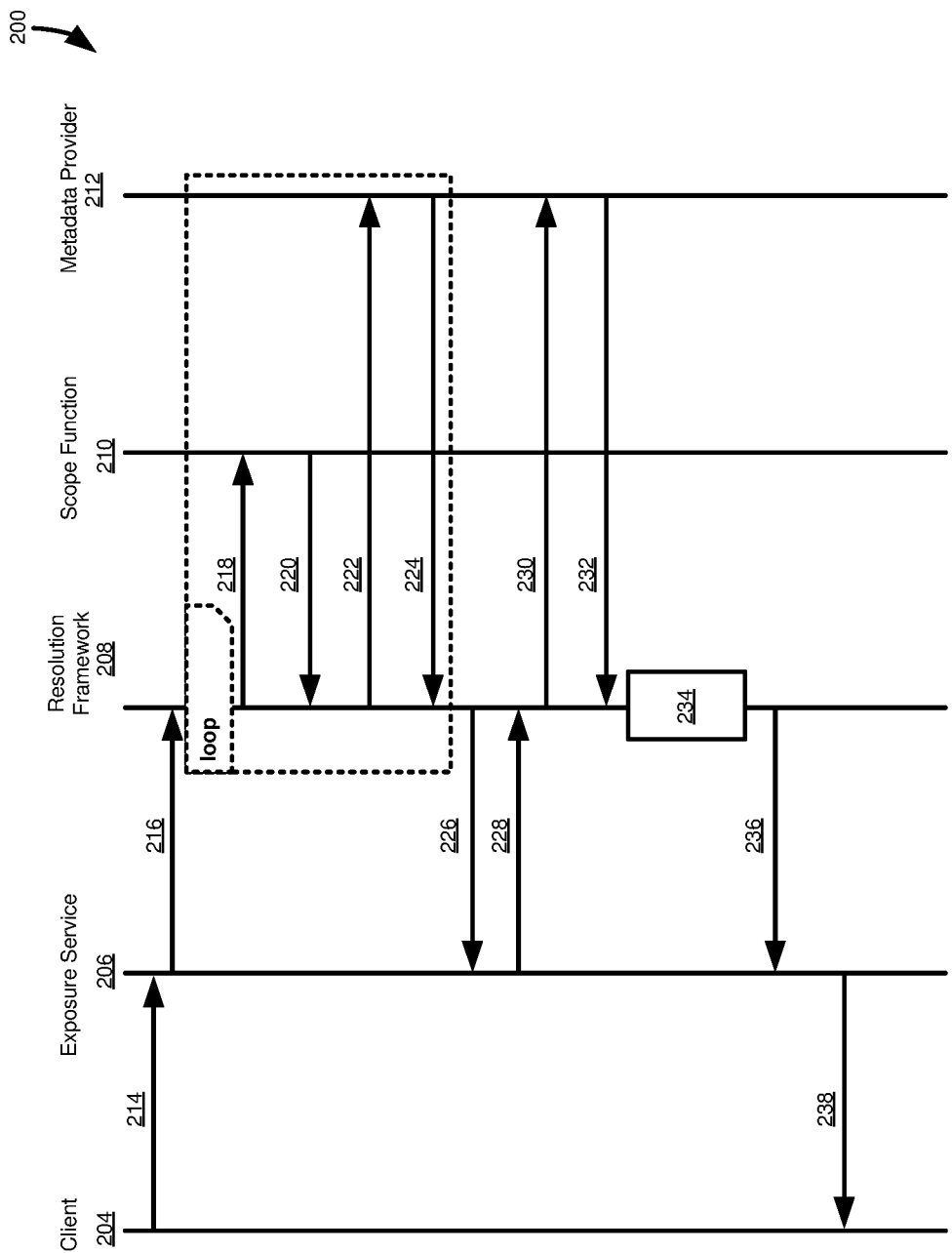
FIG. 2A is a timing diagram of a method of processing a client's request for metadata, with particular detail to operation of components of a source system.

FIG. 2A is a timing diagram of a method 200 for a client 204 requesting metadata from a target system. The method 200 can be implemented in the computing environment 100 of FIG. 1, where the client 204 can represent one or more components of the target system 108, such as the user interface 148 or the import manager 144. The method 200 is carried out using the client 204 (e.g., a component of a target system), a metadata exposure service 206, a resolution component 208, one or more scope functions 210, and a metadata provider 212, which can correspond, respectively, to corresponding components 108, 136, 128, 132, 126 of FIG. 1.

At 214, the client 204 provides a metadata request to the metadata exposure service 206, such as by specifying a particular database artefact or element thereof, such as specifying a particular schema, table, or view. At 216, the metadata exposure service 206 passes the request to the resolution component 208. The resolution component 208 calls a scope function 210 at 218 to determine entity types related to the database artefact specified by the client 204. In some cases, an identifier of the scope function 210 to be used is included in the request from the client 204, or the request include a scope algorithm to be applied. In other cases, the resolution component 208 determines a scope function 210 to be applied, including in cases where the request from the client 204 does not specify a scope function (and where the scope function 210 used by the resolution component 208 can be a default function). At 220, the scope function 210 returns related entities to the resolution component 208.

The resolution component 208 sends identifiers for entities whose metadata should be retrieved, optionally identifying a subset of such metadata (e.g., only particular metadata fields) to the metadata provider 212 at 222. The metadata provider 212 returns those identifiers, and identifiers for additional related entities, at 224. The method 200 can loop at 218-224 until no more related entities are identified, at which point the method can proceed to 226.

At 226, the resolution component 208 sends identifiers for the database artefacts with relevant metadata to the metadata exposure service 206. The metadata exposure service 206 sends a request to convert metadata for all or selected database artefacts identified at 218-224 to the resolution component 208 at 228. In some cases, the resolution component 208 includes the converter 120 of FIG. 1, in other cases, rather than the request to convert metadata being sent to the resolution component, the request is sent to the converter. In yet further example, the conversion request is first sent to the resolution component 208, and then the resolution component sends the request to the converter 120.

The resolution component 208 (or converter 120) sends a request for the relevant metadata to the metadata provider 212 at 230. The metadata provider 212 returns the metadata to the resolution component 208 (or converter 120) at 232. The resolution component 208 (or converter) converts the metadata received from the metadata provider 212, such as to a standard or serializable format, such as CSN or XML, at 234. The converted metadata is sent from the resolution component 208 to the exposure service 206 at 236. At 238, the exposure service 206 returns the converted metadata to the client 204. In another implementation, at 236 a list of database artefacts associated with the converted metadata is sent to the client 204, but the actual metadata itself is not sent. In this case, the client 204 can later request all or a portion of the actual metadata associated with such database artefacts.

FIG. 2B illustrates an import process 240, which can include the process 200. The process is carried out using a client 242 (such as a target system, which can be a cloud-based system), an import wizard 244 (which can be part of the import user interface 148 of FIG. 1), an import manager 246 (which can be the import manager 144), a metadata repository 248 (such as the metadata repository), a deployment service 250 (which can be the deployment component 164), and a local or source system 252 (such as the source system 104 of FIG. 1).

At 254, the client submits an import request through the import wizard 244, such as providing one or more identifiers for database artefacts to be imported or providing search criteria to identify such artefacts. The import wizard 244 passes the request to the source system 252 at 256. The request can be processed by a metadata transfer framework of the source system 252, such as the metadata exposure service 136 (which can in turn communicate with the resolution framework 128, the scoping functions 132, or the metadata framework 126).

At 258, the source system 252 returns identifiers for relevant database artefacts, such as artefacts determined using the scoping functions 132. The import wizard 244 calls the import manager 246 at 260 to retrieve at least a portion of the metadata associated with at least a portion of the database artefacts returned at 258.

At 262, the import manager 246 sends a request to the source system 252 for the specified metadata, which is returned to the import manager 246 at 264. At 266, the import manager 246 saves the metadata to the repository 248. The repository 248 returns control to the import manager 246 at 268, optionally including an indication of whether the save was executed successfully.

The import manager 246 requests the deployment service 250 to deploy the metadata at 270, which can include linking the metadata to database artefacts of a target system or creating and/or populating software objects, such as instances of an abstract or composite data type with the metadata. The deployment service 250 returns control to the import manager 246 at 272, optionally with an indication of whether the metadata was successfully deployed. The import manager 246 returns control to the import wizard at 274, optionally with an indication of whether the earlier operations executed successfully, including identifying any errors that might have occurred, and in turn the import wizard 244 returns control/this information to the client 242 at 276.

Figure 2C:
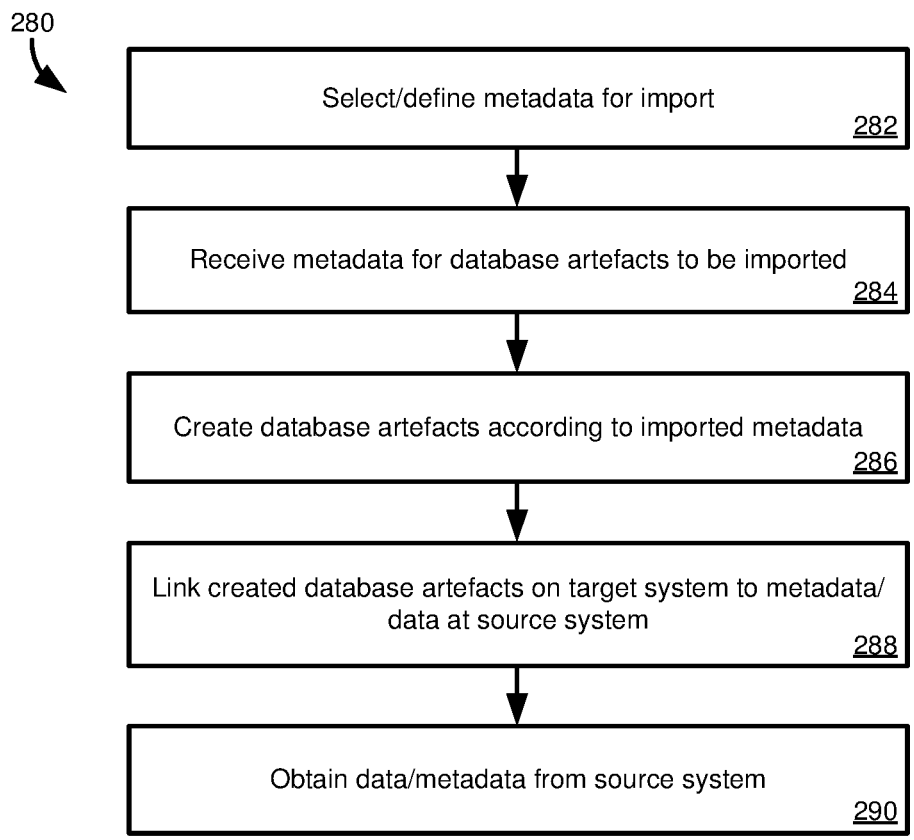
FIG. 2C is a flowchart of a method of automatically creating database artefacts at a target system and linking such artefacts to data and metadata maintained at a source system.

The processes 200 and 240, or processes similar thereto (e.g., containing one or more steps from one or both of such processes), can be used in a process to automatically generate database artefacts based on retrieved metadata, as well as linking the generated database artefacts to metadata describing the database artefact and data stored in a source system for the database artefact. FIG. 2C provides an example of such a process, shown as process 280. At 282, a user or process selects metadata for import. The metadata can be all metadata associated with one or more database artefacts, or a portion of such data. Typically, the metadata includes at least enough metadata to describe a schema for a database artefact of a source system, such as columns in a table or view, the names or identifiers for such columns, and datatypes associated with such columns.

The metadata is received, such as by the import manager 144 or the user interface 148 of FIG. 1, at 284. At 286, database artefacts are created at the target system according to the imported metadata, where the database artefacts can be created as local artefacts, or as virtual artefacts that are linked to database artefacts on a source system (e.g., by data replication or federation).

At 288, database artefacts created on the target system are linked to corresponding database artefacts on the source system. For example, an API on the source system for obtaining data for a database artefact can be located using the metadata exposure service 136 of FIG. 1 and linked to the database artefact on the target system. The API can be used by the target system at 290 to obtain data and optionally additional metadata for the database artefact on the target system from the source system.

One or more datatypes, such as abstract or composite datatypes, can be used to help implement the process 280. For example, an abstract datatype can be defined to represent a database artefact and can contain information useable to obtain data or metadata for the database artefact. The datatype can include a data member that stores an API location or a data member that stores an API type. When metadata or data is desired for the database artefact, a method of an instance of the data type for the particular database artefact can be called. The method can call the API on the source system to retrieve requested information.

Retrieving data/metadata from the source system can be facilitated by having information, such as in a standard format, describing APIs in the source system useable to retrieve data/metadata from identified database artefacts.

Thus, disclosed techniques can help avoid situations where data/metadata cannot be retrieved for a database artefact on the source system because the API is not known. Similarly, having a repository/library of APIs can help avoid issues that can arise from having APIs of different types. The library can be used to locate the appropriate API, and type information stored for the API can assist in determining the appropriate method for obtaining data from the API (for example, an instance of an abstract datatype representing an imported database artefact can call different API/import methods depending on what API for obtaining data is available on a source system for a given database artefact of the source system).

In some cases, there can be a method for retrieving data and a separate method for retrieving metadata for a database artefact of the source system, while in other cases a single method can be used to obtain both data and metadata. The instance of the datatype can serve as a link between a particular database artefact and information about the artefact maintained in the source system. In particular implementations, when a database artefact is created in the target system, or at least a database artefact that is created to use disclosed techniques, an instance of the datatype for linking the database artefact to data/metadata in the source system is automatically created.

In some cases, disclosed techniques can be used to create a single database artefact. However, in other cases disclosed techniques can be used to create multiple database artefacts. That is, for example, an identifier for a database artefact at the source system, or search criteria, can be used to identify multiple related database artefacts in the source system (such as using a scope function). Database artefacts can be created at the target system using metadata from the source system, linked to the appropriate APIs, and data and/or additional metadata retrieved from the source system and populated into the target system.

Disclosed techniques can be implemented in a different manner, if desired. In some cases, for example, rather than storing information for imported database artefacts in instances of an abstract or composite data type, such information can be stored in a relational database table. For example, a table can have a field with a database artefact identifier, a field with an identifier of an API location, and a field with an identifier of an API type. An import process/component can access the database table to determine how to retrieve data/metadata for the artefact, and the table can thus serve as the link between the database artefact and data/metadata in the source system.

The present disclosure can provide techniques, such as the process 280, for creating data artefacts at a target system based on data artefacts as a source system. In particular, the disclosed techniques can allow for automatic creation of database artefacts at a target system, and automatically importing associated data and metadata from the source system. So, the database artefacts can be made quickly available to a user without the user needing to manually perform any actions (other than providing initial import criteria).

The use of the metadata exposure service 136 can help facilitate automating a database artefact creation process, as it can assist in locating APIs for obtaining data/metadata and providing information about how the data/metadata can be accessed (e.g., a protocol/API type). The resolution framework can help ensure that relevant metadata is obtained, and can be used to create database artefacts that may be relevant to a user's request. That is, the user could specify a single database artefact, or search criteria, and the disclosed techniques can result in the creation of one or more database artefacts at the target system for relevant database artefacts in the source system (e.g., as determined by a scope function), as well as populating the target system with corresponding data/metadata from the source system.

Example 4—Example Software Objects Facilitating Metadata Discovery and Exchange

FIG. 3 illustrates how information about particular database artefacts, having or associated with metadata, on a source system can be exposed to a target system. The source system can provide APIs for obtaining information about database artefacts. The APIs can be in different formats, either between different source systems or within a single source system. For example, APIs can be implemented in an OData format, in a SQL format, or in some other format.

FIG. 3 illustrates a portion of an API 310 expressed in SQL format. Note that the SQL format API 310 specifies a particular database artefact 314, in this case a view "product." The database artefact 314 is specified by a schema name and an entity name.

FIG. 3 also illustrates a standardized representation 320 of the API 310. The standardized representation 320 includes an identifier 322, and includes a reference 324 to the API (e.g., in the form of a URI). The standard representation 320 can have a type 326, which can indicate a protocol used by the referenced/source API 310, such as whether the API is a SQL API or is an OData API. The standard representation 320 can have an element 330 which can identify one or more use cases for the API 310, such as whether the API is intended to be used for an ETL process, for a different type of process, or can be used for general metadata discovery and retrieval. Similarly, the standard representation 320 can specify a particular type or level of coverage 332, which can indicate what portion of metadata has been made available for the database entity.

In the example shown, a single database artefact 314 has been specified. In other cases, a single representation 320 can specify multiple database artefacts, where the coverage can be the same or different for different database artefacts.

FIG. 3 also shows a standardized representation 330 of the database artefact 314, along with metadata 332 for the artefact. The data and metadata in the standardized representation 330 can be exposed using the SQL API 310, information about which is made available using the standardized API representation 320. The standardized representation 330 includes the identifier 314 for the database artefact, and this identifier is included in the standard API representation 320. In this way, the standard API representation 320 ties a particular database artefact to the SQL API 310, which can be used to obtain data for the database artefact, and ties metadata associated with the data, through the link to the representation 330 (which in turn can be generated from a native representation of the metadata on a source system).

Note that, in general, a standardized representation of metadata and a standardized representation of a particular entity from which data can be retrieved (and which is associated with metadata) can be in a standardized format. That is, metadata and database entity information can be represented in a common format, regardless of the actual storage format of the metadata or data or a protocol (e.g., an API type) used for accessing such data or metadata. Accordingly, the standardized API representation 320 may have different identifying and type information if an API corresponding to the API 310 was in a different format (e.g., OData), but the overall structure of the standard representation can be the same (e.g., having the same fields or keys). In the same way, data for particular entities can be expressed in a common format in both the standardized representation of the entity 330 and the standardized API representation 320, which can facilitate a target system finding database artefacts and information about APIs useable to obtain data or metadata associated with a particular database entity on a source system.

Example 5—Example Metadata Exposure Service

Figure 4:
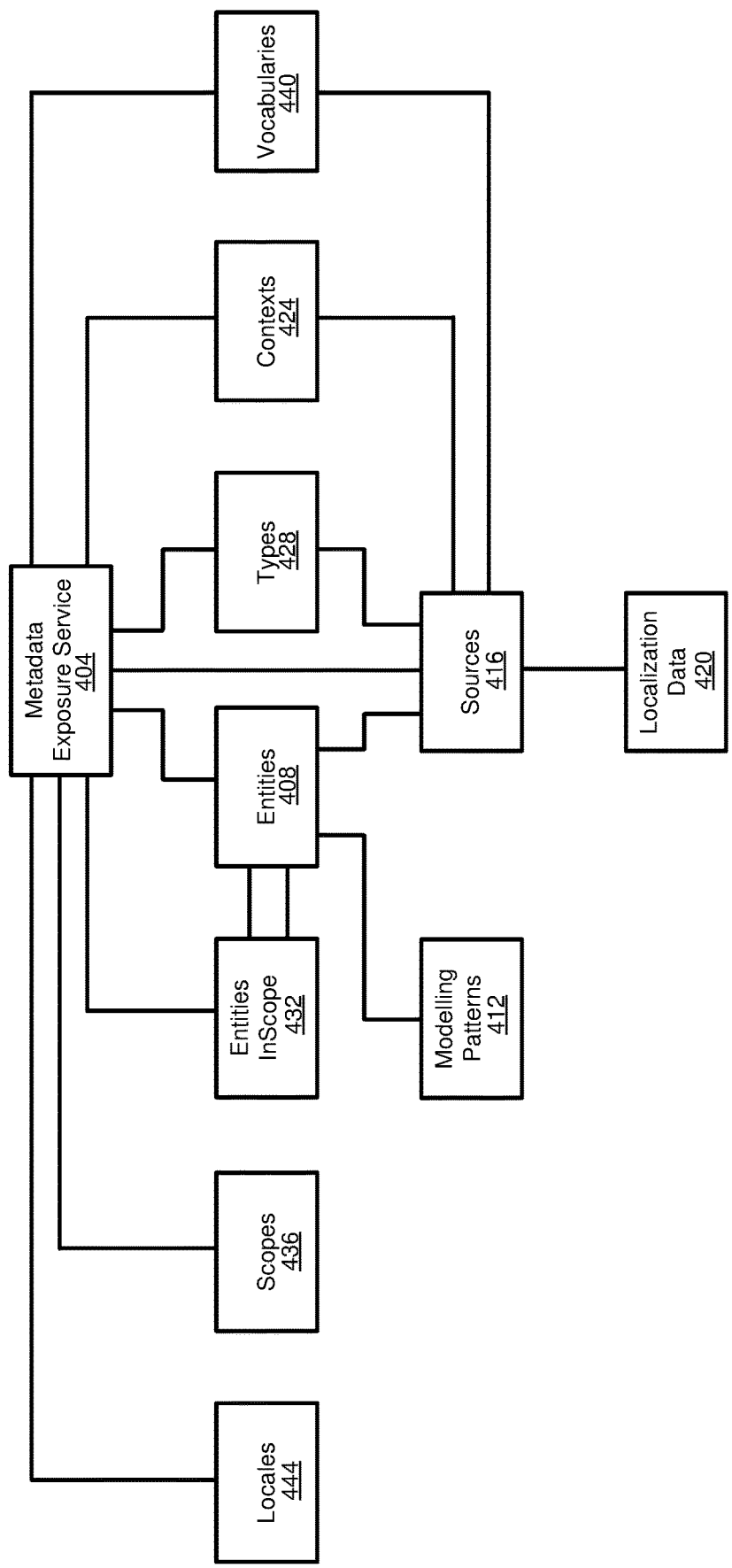
FIG. 4 illustrates information that can be maintained by, and can be accessed using, a metadata exposure service.

FIG. 4 illustrates information that can be exposed using a metadata exposure service 404, which can be the metadata exposure service 136 of FIG. 1.

The metadata exposure service 404 can provide information about entities 408, which can be database artefacts such as tables or views. Information for entities 408 can include a name or identifier of the entity (such as with reference to an entity expressed in a serializable format, such as CSN or XML), a language dependent description of the entity, optionally a release contract (which can be used to help maintaining a group of entities that are useable with a particular contract identifier, which can be used to help ensure that a correct set of entities is selected, such as to keep the set of entities stable against incompatible changes, such as changes that an application has not been updated to use), a release state (such as whether the entity is released, obsolete, decommissioned, not yet released, etc.), and information indicating when an entity was last modified. Optionally, other information can be included, such as when an entity was first created or an identifier of a user, process, or application that created or last updated an entity 408.

An entity 408 can be associated with a modelling pattern 412. A modelling pattern 412 can be used to indicate what a particular entity 408 is used for. In some cases, an entity 408, such as a view, can have a main purpose, which can be indicated by the modelling pattern 412. Optionally, the modelling pattern 412 can list multiple uses for a given entity 408, where in some cases a given use can be notated as a primary use.

An entity 408 can also be associated with a source 416, where the source can be a standardized (e.g., CSN, XML) representation of the entity (e.g., the entity's definition or contents). In some cases, a source 416 for an entity 408 can include language-specific content. Such content can be kept as localization data 420, where the localization data can be retrieved by navigating through a particular entity 408.

The metadata exposure 404 can be associated with contexts 424. A context 424 can be used to identify metadata, such as the metadata belonging to a specific repository or application. That is, the context 424 can provide, or be used for a similar purpose as, namespace information. The context 424 can include additional information, such as a label or description of an entity 408.

A metadata exposure 404 can be associated with types 428. Types 428 can be used to identify a particular type of entity 408 (e.g., a view, a table, a column, a stored procedure, etc.), and can also contain definitional information for that type (e.g., schema information, such as particular metadata elements that are associated with a given type, essentially providing the structure or definition for a particular type). Types 428 can be used or associated with particular sources 416, and in turn can be referenced by the localization data 420 (e.g., information in a particular language relating to the type, such as a language-dependent description of the type).

As has been described, often it will be desired to obtain metadata for not just a single entity 408, but for a collection of related entities. Thus, a given entity 408 for a metadata exposure 404 can be linked to entities in scope 432, which provides a list of related entities. Related entities can include a full list of related entities 408, or a smaller subset of such entities. A scoping function can be used to define the entities in scope 432, and available scoping functions can be provided by scopes 436.

Metadata can be specified in different ways, including by annotations (for example, annotations in CSN). A vocabulary 440 can provide definitions for various annotations.

Locales 444 can store information about particular locales that are associated with a metadata exposure service 404, such as locales that are represented in the localization data 420. The locales 444 can be used, for example, to filter data associated with a metadata exposure 404 by location.

Example 6—Example Computing Environment With Database Artefact Extension and Example Thereof In some cases, disclosed technologies, like a metadata exposure service, can be used to retrieve metadata from a source system when the data is transferred to a target system, either as independent local tables, local tables having data replicated from the source system, or a virtual table where data for the virtual table is retrieved from the source system when requested at the target system (e.g., in response to a query from the target system on a database associated with the target system). However, disclosed technologies can be used in other scenarios. In particular, disclosed technologies can be used to augment standard content with customer-specific content. For instance, after a standard database schema is installed or upgraded, extensions to such content can be retrieved from a client's database system.

Figure 5:
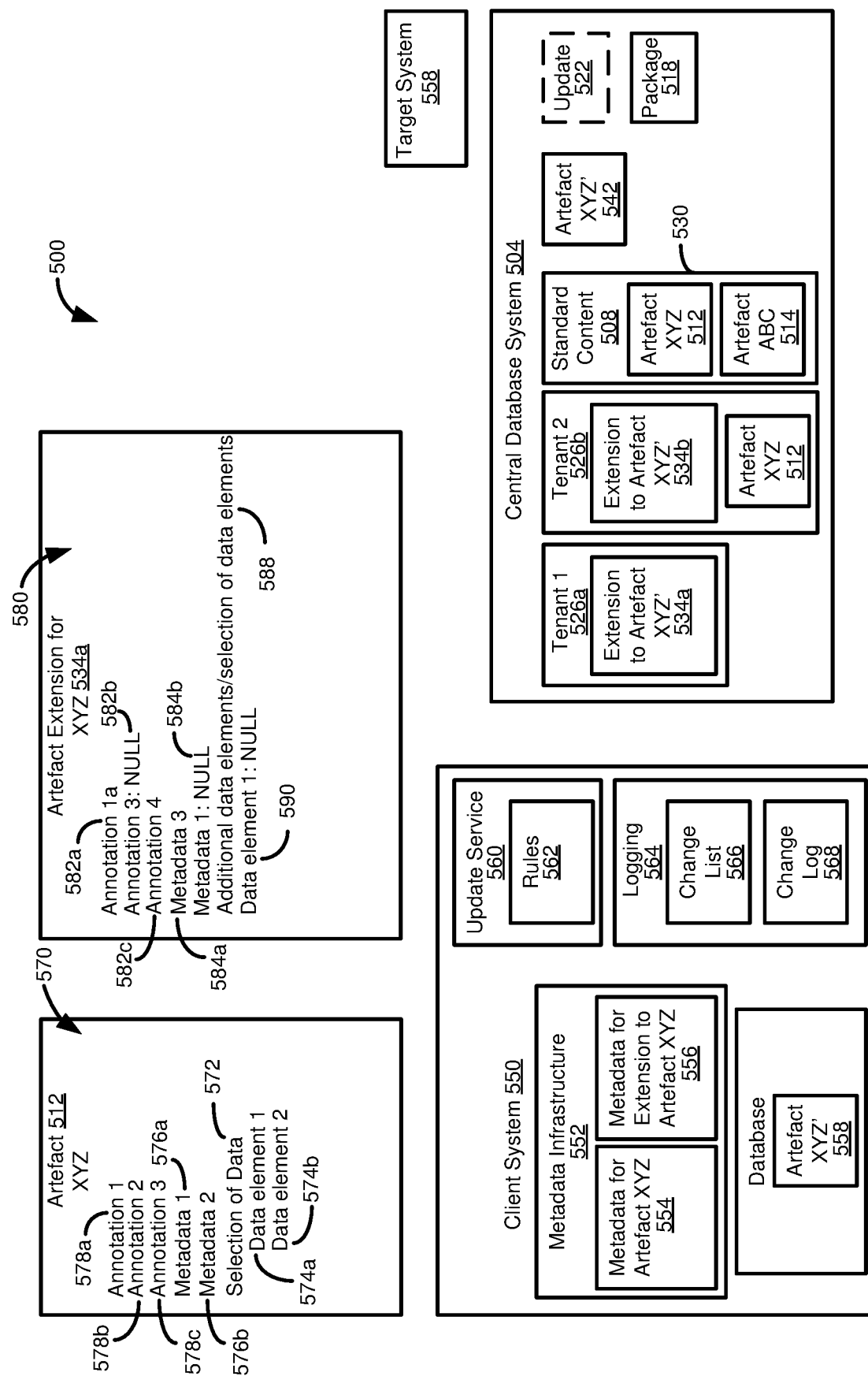
FIG. 5 is diagram illustrating a computing environment that can be used to supplement standard metadata for database artefacts with metadata associated with extensions to such database artefacts.

FIG. 5 illustrates a computing environment 500 in which disclosed technologies can be implemented. The computing environment 500 includes a central database system 504, which can be, in some implementations, a cloud-based database system. The central database system 504 can include standard content 508, such as database artefacts 512, 514, where the database artefacts can be tables or views. The standard content 508 can be content associated, for example, with a specific application or set of applications, and typically all or a large portion of the content is relevant to many clients. The standard content 508 can be installed from a package 518, and can be updated or upgraded using an update 522 (which can also be implemented as a package).

In some cases, clients can modify all or a portion of the standard content 508. In other cases, standard content 508 is protected from client modification, particularly if the standard content is shared by multiple clients, or if modification of the standard content might cause the loss of application functionality. If standard content 508 is not modifiable by a client, it can in some implementations be extended by a client. That is, database artefacts of the standard content 508 may be "locked," but a client may be able to create other database artefacts that add to or alter standard database artefacts.

FIG. 5 shows the computing environment 500 as including tenants 526a, 526b. In some cases, the tenants 526a, 526b access the standard content 508 via a shared container 530, as shown for tenant 526a (where the tenant container is not shown as including the artefacts 512, 514). In other cases, a tenant container can include artefacts of the standard content 508, such as shown for tenant 526b, the container which includes the artifact 512.

The tenant containers are shown as including extensions 534a, 534b to the artefact 512. An extension 534a, 534b can make various modifications to the artefact 512, such as adding, removing, or changing data or metadata of the artefact. As an example of a change to data, the extension 534a can add a column to a view or table represented by the artefact 512. For instance, the artefact 512 may represent data for employees, having fields for a name, a social security number, a job identifier, a rate of pay, etc. Given the COVID-19 pandemic starting in 2020, and with the vaccines introduced in 2020-2021, an employer may wish to track whether employees have been vaccinated or not, a date the employee was vaccinated, etc. For various reasons, it may take time before a flag indicating if an employee is vaccinated is introduced into the artefact 512 via the standard content 508. A client (represented by a tenant 526a, 526b) can include an extension 534a, 534b that adds the vaccinated flag to the artefact 512. In some cases, an artefact used for a particular client or tenant is created based on the standard content 508 and any extensions defined for/by a client. For example, artefact 542 can be created (for instance, using DDL statements) by combining or merging the artefact 512 with the extension 534a or 534b.

In some implementations, data for an extension is imported from a client system 550 and stored in a container for a tenant 526a, 526b, or otherwise in the central database system 504. In other cases, the data is stored in another component of the computing environment 500, or is obtained from the client system 550 as part of an artefact creation process, but is not stored outside of the client system 550.

Metadata for the extension 534a can be obtained from the relevant client system 550 using a metadata infrastructure 552. The metadata infrastructure 552 can include the components 116-140 of the source system 104 of FIG. 1. The client system 550 can include a database artefact 556, which can correspond to the database objects 184 of the source system 104. In FIG. 1, one or more of the database objects can be database artefacts that are produced by combining or merging a standard definition of the database artefact with extensions created for use with that database artefact. That is, a database object 184 can correspond to a database artefact 542.

The metadata infrastructure 552 include metadata 554 for artefact 512 and metadata 556 for an extension to the artefact 552. The metadata 554, 556 can be used to describe, and in at least some implementations create, the artefact 558.

Extension data can be retrieved from the client system 550 in a similar manner as discussed with respect to FIG. 1. That is, the central system 504, or a target system 558 in communication with the central system, can include component analogous to components 144-168 of FIG. 1. In some implementations, a portion of the components 148-168 can be omitted from the use case for the computing environment 500. The import UI 148 can be omitted, for instance, when a system automatically tries to retrieve client specific information when a standard package is installed, updated or upgraded.

The logic for obtaining information from the client system 550 can be generally analogous to the method 200 of FIG. 2. However, such a method can optionally remove steps from the method 200, or can add steps. As discussed, a step of receiving input from a user interface for metadata/data artefacts to import can be omitted. A step can be added that checks the client system 550 for extensions to database artefacts of the standard content 508. If no extension exists for a particular database artefact, then no further action need be taken. If an extension exists, relevant metadata can be retrieved and used to define the data artefact 542, and the metadata can optionally be stored in a container for a tenant 526a, 526b.

In some cases, metadata can be obtained from the client system 550 multiple times. For example, metadata can be obtained when a client is "onboarded," and in response to subsequent updates/changes made by the client.

An update service 560 can be used to determine what metadata should be sent, which can include selecting a single version of metadata or layering multiple versions of metadata. The update service 560 can apply various rules 562, which can include precedence rules. A precedence rule can specify, for example, that a most recent version of a metadata artefact be used. Or, a precedence rule can specify how multiple metadata versions should be combined, such as overwriting metadata elements from earlier versions with changes made by later versions, where typically the latest version's changes would be applied in case of a conflict with an earlier version. Metadata elements from a base version that were not modified would be included in their original form in the final metadata. In other cases, precedence rules can specify that at least certain metadata is additive. For example, if metadata is specified as an array of values or an enumerated list, rules can specify whether values are added or overwritten. Whether elements are added or overwritten can depend on the nature of the metadata element, and so the rules can be specified at the granularity of particular metadata elements, if appropriate.

The client system 550 can include a logging component 564. The logging component 564 can include a change list 566, which can identify metadata that should be imported because it does not yet exist in the central database system 504 or the target system 558, or has been changed since a last import. The change list 566 can also specify with particularity what metadata is to be imported, such as the result of applying the rules 562. A change log 568 can be used to track the progress of a transfer of metadata from the client system 550 to the central database system 504 or the target system 558, such tracking failed transactions and error messages so that it can be determined whether a transfer completed as expected/directed. In some cases, a change log 568 can be included in the central database system 504 or the target system 558 in place of, or in addition to, being included in the client system 550.

FIG. 5 also illustrates an example of standard content 508 and an extension to such standard content, in the form of contents 570 for the artefact 512 and contents 580 for the extension 534a. The contents 570 include a selection of data 572, which includes data elements 574a, 574b. The selection of data 572 can be a query, such as a SQL query. The contents 570 can include metadata elements 576a, 576b, such as elements that provide semantic information about the data elements 574a, 574b. The contents 570 can further comprise annotations 578a, 578b, 578c, where an annotation can indicate properties of the artefact 512 or control the use of the artefact, such as defining whether the artefact is exposed to an end user.

The contents 580 of the extension 534 can add, remove, or alter data elements of the contents 570, and can add or modify annotations of the content 570. As shown, the contents 580 include an annotation 582a that modifies annotation 578a, an annotation 582b that sets a value of annotation 578c to NULL, and an annotation 582c that has been added to the contents 570. Since the annotation 578b has not been removed or modified, that annotation will be present as in in the artefact 570 when the artefact is merged with the artefact extension 580.

In at least some cases, data elements and metadata can be handled in a similar manner as annotations. The artefact extension 580 shows that a metadata element 584*a* has been added to the contents 570, and metadata element 576*a* has been removed by setting the value of the metadata element 576*b* to NULL using metadata element 584*b*. The contents 580 can include additional data elements or an additional selection of data elements 588, or can remove a data element, such as a statement 590 in the contents 580 that sets the value of data element 576*a* to NULL.

Example 7—Example Table Elements Including Semantic Identifiers

Database systems typically include an information repository that stores information regarding a database schema. For instance, PostgreSQL includes an INFORMATION_SCHEMA that includes information regarding tables in a database system, and certain table components, such as attributes (or fields) and their associated datatypes (e.g., varchar, int, float). Other database systems, or query languages, include similar concepts. However, as described above, these types of repositories typically only store technical information regarding database components, not semantic information.

Other database systems, or applications or frameworks that operate using a database layer, may include repositories that store semantic information for data. For instance, SAP SE of Walldorf, Germany, provides the ABAP programming language which can be used in conjunction with database systems. ABAP provides the ability to develop database applications that are agnostic to the nature, including vendor, of the underlying relational database management system. In part, this ability is enabled using a data dictionary. The data dictionary can include at least some information that is similar to information that is maintained in an information schema. However, the data dictionary can include semantic information regarding data, and optionally additional technical information.

In addition, the data dictionary can include textual information regarding fields in a table, such as human-readable descriptions (sometimes in different languages, such as English, French, or German) of the purpose or use of the field. In at least some cases, the textual information can serve as semantic information to a computer. However, other types of semantic information need not necessarily be (at least easily) human-understandable, but can be easier for a computer to process than parsing textual information primary intended for human use. Data dictionaries can also contain or express relations between data dictionary objects through various properties (which can be reflected in metadata), such as having the data dictionary reflect that dictionary objects are assigned to packages, and thus having a relationship to one another through a package assignment. The information in a data dictionary can correspond to metadata that can be retrieved from a source system by a target system according to the techniques previously described in this disclosure.

As used herein, "technical information" (or technical metadata) relates to information that describes data as data, which is information such as a type that can be used to interpret a value of the data, and which can influence how the data is processed. For instance, the value "6453" could be interpreted (or cast) as an integer, a float, a string, or an array of characters, among various possibilities. A value may be processed differently, in some cases, depending on whether it is a number, such as an integer or a float, or whether it is treated as a collection of characters. Similarly, technical information can specify acceptable values for data, such as a length or a number of decimal places that are allowed. The technical information can specify properties of the data without concern regarding what the data represents or "means." Of course, however, a designer of a database system can select particular technical properties for particular data knowing themselves the semantic properties of the data—e.g., "If I intend to have a value representing a person's name, I should use a string or array of characters rather than a float." On the other hand, in at least some cases, data types might be a type that would not be expected by a database administrator or user. For instance, rather than using a person's name to identify data associated with the person, a separate numerical or alphanumerical identifier might be used, which might be counter intuitive based on the "meaning" of the data (e.g., "I do not consider myself to be a number").

As used herein, "semantic information" (or semantic metadata) relates to information that describes the meaning or purpose of data, which meaning or purpose can be to a human or to a computer process. As an example, technical data information may specify that data is obtained having a value in the format "XXX-XX-XXXX," where X is an integer between 0 and 9. That technical information can be used to determine how the data should be processed, or whether a particular value is valid (e.g., "111-11-1111" is, but "1111-11-1111" is not), but does not indicate what the value represents. Semantic information associated with the data can indicate whether the value is a social security number, a telephone number, a routing address, etc.

Semantic information can also describe how data is to be processed or displayed. For instance, "knowing" that data is a telephone number may cause the value to be displayed in one part of a GUI as opposed to another part of a GUI, or may invoke or not invoke particular processing rules depending on if the rule is active for "telephone number." In at least some cases, "semantic information" can include other types of information that can be used to describe data, or how it should be used or processed. In a particular case, data can be associated with one or more of a label, such as a human understandable description of the data (e.g., "telephone number"), documentation, such as a description of what information should be included in a field having the label (e.g., "enter an 11 digit phone number including area code"), or information that can be used in a help screen (e.g., "enter your home phone number here").

Typically, technical information must be provided for data. In the case of a field of a database table, for example, it is typically necessary to provide a name or identifier for a field and a datatype. The name or identifier for a field might, or might not, serve to provide semantic information. That is, a database designer might choose a name of "Employee_Name," "EMPN," or "3152." However, as the name or identifier is used to locate/differentiate the field from another field, in the context of the present disclosure, it is considered to be technical information, rather than semantic information, even if it may readily convey meaning to a human. In at least some implementations, the use of semantic information is optional. For instance, even using the data dictionary, some fields used in database objects (such as tables, but potentially other objects too, where such other objects are typically associated with one or more tables in an underlying relational database system) can be specified without the use of semantic information, while other fields are associated with semantic information.

Figure 6:
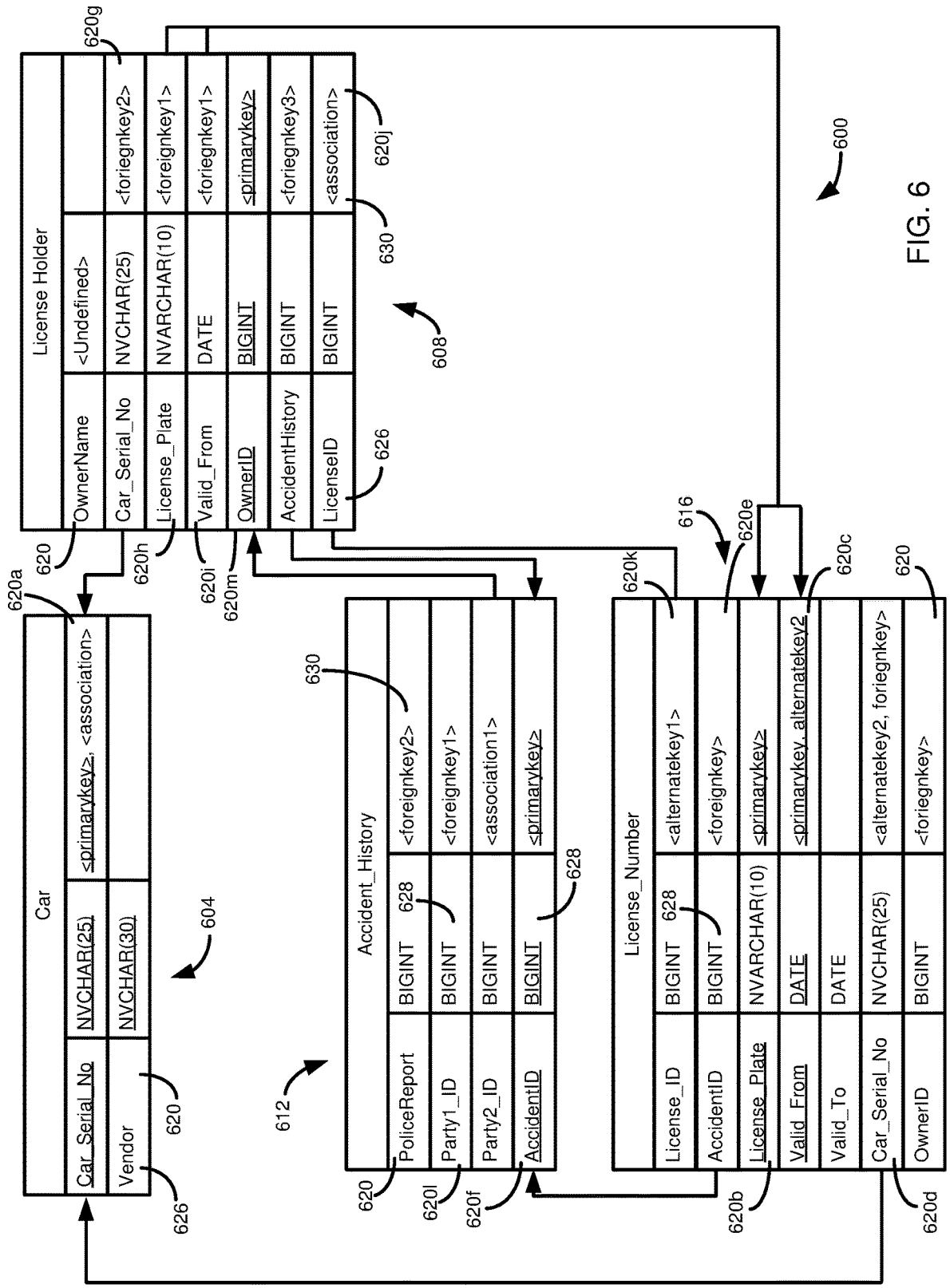
FIG. 6 is a diagram of a database schema showing technical relationships between at least a portion of database tables in the schema.

FIG. 6 is an example entity-relation (ER) type diagram illustrating a data schema 600, or metadata model, related to a driver's accident history. The schema 600 (which can be part of a larger schema, the other components not being shown in FIG. 6) can include a table 608 associated with a license holder (e.g., an individual having a driver's license), a table 612 associated with a license, a table 616 representing an accident history, and a table 604 representing cars (or other vehicles).

Each of the tables 604, 608, 612, 616 has a plurality of attributes 620 (although, a table may only have one attribute in some circumstances). For a particular table 604, 608, 612, 616, one or more of the attributes 620 can serve as a primary key—uniquely identifying particular records in the tuple and being designated as the main method of accessing tuples in the table. For example, in the table 604, the Car_Serial_No attribute 620a serves as the primary key. In the table 616, the combination of attributes 620b and 620c together serve as the primary key.

A table can reference records associated with the primary key of another table through the use of a foreign key. For example, the license number table 616 has an attribute 620d for a Car_Serial_No in table 616 that is a foreign key and is associated with the corresponding attribute 620a of table 604. The use of a foreign key can serve various purposes. The foreign key can link particular tuples in different tables. For example, a foreign key value of 8888 for the attribute 620d would be associated with a particular tuple in table 604 having that value for attribute 620a. Foreign keys can also act as constraints, where a record cannot be created having (or altered to have) a foreign key value that does not exist as a primary key value in the referenced table. Foreign keys can also be used to maintain database consistency, where a change to a primary key value can be propagated to a table where the attribute is a foreign key.

A table can have other attributes, or combinations of attributes, that can serve to uniquely identify tuples, but which are not primary keys. Table 616, for instance, has an alternate key that is formed from attribute 620c and attribute 620d. Thus, a unique tuple can be accessed in the table 616 using either the primary key (e.g., being a foreign key in another table) or through an association to the alternate key.

Schema information is typically maintained in a database layer, such as a software layer associated with where table values are maintained (e.g., in a RDBMS), and typically includes identifiers for the tables 604, 608, 612, 616, and the name 626 and datatype 628 of their associated attributes 620. Schema information may also include at least some of the information conveyable using the flag 630, such as whether a field is associated with a primary key, or indicating a foreign key relationship. However, other relationships, including more informal associations, may not be included in a schema associated with a database layer (e.g., the INFORMATION_SCHEMA of PostgreSQL).

Example 8—Example Table Elements Including Semantic Identifiers

Figure 7:
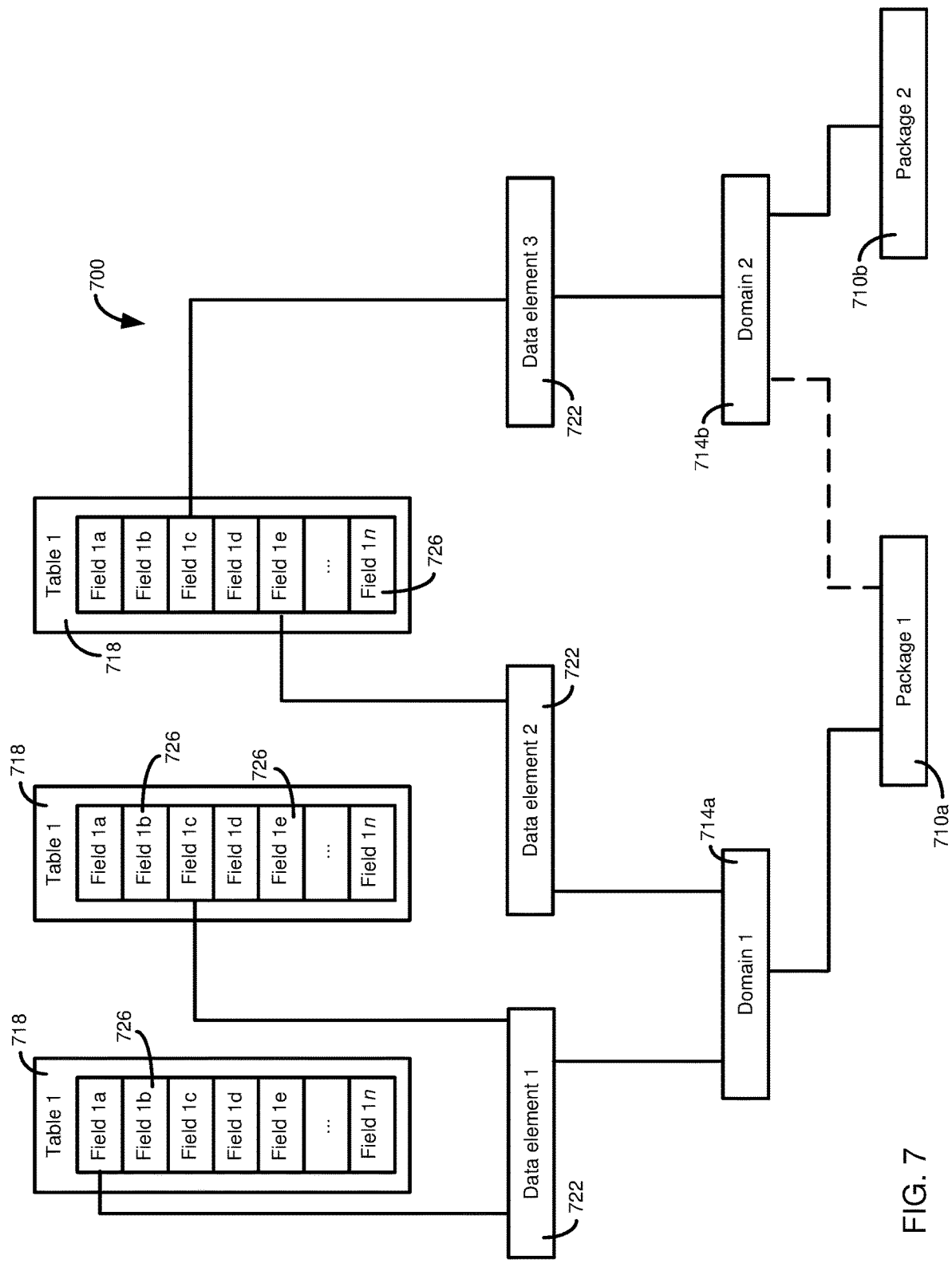
FIG. 7 is a schematic diagram illustrating relationships between table elements that can be included in a data dictionary, or otherwise used to define database tables.

FIG. 7 is a diagram illustrating elements of a database schema 700 and how they can be interrelated. In at least some cases, the database schema 700 can be maintained other than at the database layer of a database system. That is, for example, the database schema 700 can be independent of the underlying database, including a schema used for the underlying database. Typically, the database schema 700 is mapped to a schema of the database layer (e.g., schema 600 of FIG. 6), such that records, or portions thereof (e.g., particular values of particular fields) can be retrieved through the database schema 700.

The database schema 700 can include one or more packages 710. A package 710 can represent an organizational component used to categorize or classify other elements of the schema 700. For example, the package 710 can be replicated or deployed to various database systems. The package 710 can also be used to enforce security restrictions, such as by restricting access of particular users or particular applications to particular schema elements.

A package 710 can be associated with one or more domains 714 (i.e., a particular type of semantic identifier or semantic information). In turn, a domain 714 can be associated with one or more packages 710. For instance, domain 1, 714a, is associated only with package 710a, while domain 2, 714b, is associated with package 710a and package 710b. In at least some cases, a domain 714 can specify which packages 710 may use the domain. For instance, it may be that a domain 714 associated with materials used in a manufacturing process can be used by a process-control application, but not by a human resources application.

In at least some implementations, although multiple packages 710 can access a domain 714 (and database objects that incorporate the domain), a domain (and optionally other database objects, such as tables 718, data elements 722, and fields 726, described in more detail below) is primarily assigned to one package. Assigning a domain 714, and other database objects, to a unique package can help create logical (or semantic) relationships between database objects. In FIG. 7, an assignment of a domain 714 to a package 710 is shown as a solid line, while an access permission is shown as a dashed line. So, domain 714a is assigned to package 710a, and domain 714b is assigned to package 710b. Package 710a can access domain 714b, but package 710b cannot access domain 714a.

Note that at least certain database objects, such as tables 718, can include database objects that are associated with multiple packages. For example, a table 718, Table 1, may be assigned to package A, and have fields that are assigned to package A, package B, and package C. The use of fields assigned to packages A, B, and C in Table 1 creates a semantic relationship between package A and packages B and C, which semantic relationship can be further explained if the fields are associated with particular domains 714 (that is, the domains can provide further semantic context for database objects that are associated with an object of another package, rather than being assigned to a common package).

As will be explained in more detail, a domain 714 can represent the most granular unit from which database tables 718 or other schema elements or objects can be constructed. For instance, a domain 714 may at least be associated with a datatype. Each domain 714 is associated with a unique name or identifier, and is typically associated with a description, such as a human readable textual description (or an identifier than can be correlated with a human readable textual description) providing the semantic meaning of the domain. For instance, one domain 714 can be an integer value representing a phone number, while another domain can be an integer value representing a part number, while yet another integer domain may represent a social security number. The domain 714 thus can held provide common and consistent use (e.g., semantic meaning) across the schema 700. That is, for example, whenever a domain representing a social security number is used, the corresponding fields can be recognized as having this meaning even if the fields or data elements have different identifiers or other characteristics for different tables.

The schema 700 can include one or more data elements 722. Each data element 722 is typically associated with a single domain 714. However, multiple data elements 722 can be associated with a particular domain 714. Although not shown, multiple elements of a table 718 can be associated with the same data element 722, or can be associated with different data elements having the same domain 714. Data elements 722 can serve, among other things, to allow a domain 714 to be customized for a particular table 718. Thus, the data elements 722 can provide additional semantic information for an element of a table 718.

Tables 718 include one or more fields 726, at least a portion of which are mapped to data elements 722. The fields 726 can be mapped to a schema of a database layer, or the tables 718 can be mapped to a database layer in another manner. In any case, in some embodiments, the fields 726 are mapped to a database layer in some manner. Or, a database schema can include semantic information equivalent to elements of the schema 700, including the domains 714.

In some embodiments, one or more of the fields 726 are not mapped to a domain 714. For example, the fields 726 can be associated with primitive data components (e.g., primitive datatypes, such as integers, strings, Boolean values, character arrays, etc.), where the primitive data components do not include semantic information. Or, a database system can include one or more tables 718 that do not include any fields 726 that are associated with a domain 714. However, the disclosed technologies can include a schema 700 (which can be separate from, or incorporated into, a database schema) that includes a plurality of tables 718 having at least one field 726 that is associated with a domain 714, directly or through a data element 722.

Example 9—Example Data Dictionary Components

Schema information, such as information associated with the schema 700 of FIG. 7, can be stored in a repository, such as a data dictionary. In at least some cases the data dictionary is independent of, but mapped to, an underlying relational database. Such independence can allow the same database schema 700 to be mapped to different underlying databases (e.g., databases using software from different vendors, or different software versions or products from the same vendor). The data dictionary can be persisted, such as being maintained in stored tables, and can be maintained in memory, either in whole or part. An in-memory version of a data dictionary can be referred to as a dictionary buffer.

Figure 8:
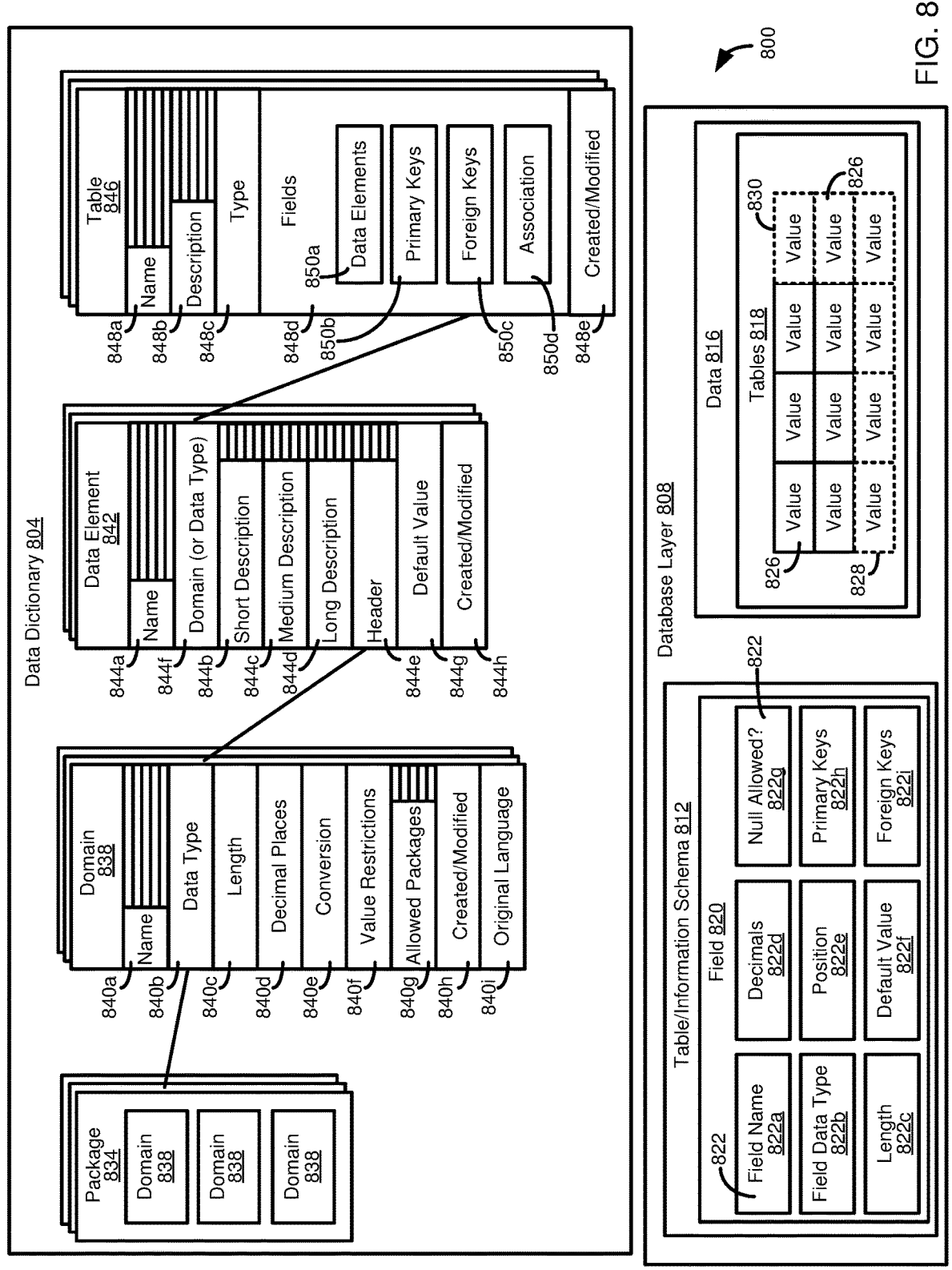
FIG. 8 a schematic diagram illustrating components of a data dictionary and components of a database layer.

FIG. 8 illustrates a database environment 800 having a data dictionary 804 that can access, such as through a mapping, a database layer 808. The database layer 808 can include a schema 812 (e.g., an INFORMATION_SCHEMA as in PostgreSQL) and data 816, such as data associated with tables 818. The schema 812 includes various technical data items/components 822, which can be associated with a field 820, such as a field name 822*a* (which may or may not correspond to a readily human-understandable description of the purpose of the field, or otherwise explicitly describe the semantic meaning of values for that field), a field data type 822*b* (e.g., integer, varchar, string, Boolean), a length 822*c* (e.g., the size of a number, the length of a string, etc., allowed for values in the field), a number of decimal places 822*d* (optionally, for suitable datatypes, such as, for a float with length 6, specifying whether the values represent XX.XXXX or XXX.XXX), a position 822*e* (e.g., a position in the table where the field should be displayed, such as being the first displayed field, the second displayed field, etc.), optionally, a default value 822*f* (e.g., "NULL," "0," or some other value), a NULL flag 822*g* indicating whether NULL values are allowed for the field, a primary key flag 822*h* indicating whether the field is, or is used in, a primary key for the table, and a foreign key element 822*i*, which can indicate whether the field 820 is associated with a primary key of another table, and, optionally, an identifier of the table/field referenced by the foreign key element. A particular schema 812 can include more, fewer, or different technical data items 822 than shown in FIG. 8.

The tables 818 are associated with one or more values 826. The values 826 are typically associated with a field 820 defined using one or more of the technical data elements 822. That is, each row 828 typically represents a unique tuple or record, and each column 830 is typically associated with a definition of a particular field 820. A table 818 typically is defined as a collection of the fields 820, and is given a unique identifier.

The data dictionary 804 includes one or more packages 834, one or more domains 838, one or more data elements 842, and one or more tables 846, which can at least generally correspond to the similarly titled components 710, 714, 722, 718, respectively, of FIG. 7. As explained in the discussion of FIG. 7, a package 834 includes one or more (typically a plurality) of domains 838. Each domain 838 is defined by a plurality of domain elements 840. The domain elements 840 can include one or more names 840*a*. The names 840*a* serve to identify, in some cases uniquely, a particular domain 838. A domain 838 includes at least one unique name 840*a*, and may include one or more names that may or may not be unique. Names which may or may not be unique can include versions of a name, or a description, of the domain 838 at various lengths or levels of detail. For instance, names 840*a* can include text that can be used as a label for the domain 838, and can include short, medium, and long versions, as well as text that can be specified as a heading. Or, the names 840*a* can include a primary name or identifier and a short description or field label that provides human understandable semantics for the domain 838.

In at least some cases, the data dictionary 804 can store at least a portion of the names 840*a* in multiple language, such as having domain labels available for multiple languages. In embodiments of the disclosed technologies, when domain information is used for identifying relationships between tables or other database elements or objects, including searching for particular values, information, such as names 840*a*, in multiple languages can be searched. For instance, if "customer" is specified, the German and French portion of the names 840*a* can be searched as well as an English version.

The domain elements 840 can also include information that is at least similar to information that can be included in the schema 812. For example, the domain elements 840 can include a data type 840*b*, a length 840*c*, and a number of decimal places 840*d* associated with relevant data types, which can correspond to the technical data elements 822*b*, 822*c*, 822*d*, respectively. The domain elements 840 can include conversion information 840*e*. The conversion information 840*e* can be used to convert (or interconvert) values entered for the domain 838 (including, optionally, as modified by a data element 842). For instance, conversion information 840*e* can specify that a number having the form XXXXXXXXX should be converted to XXX-XX-XXXX, or that a number should have decimals or comma separating various groups of numbers (e.g., formatting 1234567 as 1,234,567.00). In some cases, field conversion information for multiple domains 838 can be stored in a repository, such as a field catalog.

The domain elements 840 can include one or more value restrictions 840f. A value restriction 840f can specify, for example, that negative values are or are not allowed, or particular ranges or threshold of values that are acceptable for a domain 838. In some cases, an error message or similar indication can be provided as a value is attempted to be used with a domain 838 that does not comply with a value restriction 840f. A domain element 840g can specify one or more packages 834 that are allowed to use the domain 838.

A domain element 840h can specify metadata that records creation or modification events associated with a domain element 838. For instance, the domain element 840h can record the identity of a user or application that last modified the domain element 840h, and a time that the modification occurred. In some cases, the domain element 840h stores a larger history, including a complete history, of creation and modification of a domain 838.

A domain element 840i can specify an original language associated with a domain 838, including the names 840a. The domain element 840i can be useful, for example, when it is to be determined whether the names 840a should be converted to another language, or how such conversion should be accomplished.

Data elements 842 can include data element fields 844, at least some of which can be at least generally similar to domain elements 840. For example, a data element field 844a can correspond to at least a portion of the name domain element 840a, such as being (or including) a unique identifier of a particular data element 842. The field label information described with respect to the name domain element 840a is shown as separated into a short description label 844b, a medium description label 844c, a long description label 844d, and a header description 844e. As described for the name domain element 840a, the labels and header 844b-844e can be maintained in one language or in multiple languages.

A data element field 844f can specify a domain 838 that is used with the data element 842, thus incorporating the features of the domain elements 840 into the data element. Data element field 844g can represent a default value for the data element 842, and can be at least analogous to the default value 822f of the schema 812. A created/modified data element field 844h can be at least generally similar to the domain element 840h.

Tables 846 can include one or more table elements 848. At least a portion of the table elements 848 can be at least similar to domain elements 840, such as table element 848a being at least generally similar to domain element 840a, or data element field 844a. A description table element 848b can be analogous to the description and header labels described in conjunction with the domain element 840a, or the labels and header data element fields 844b-844e. A table 846 can be associated with a type using table element 848c. Example table types include transparent tables, cluster tables, and pooled tables, such as used as in database products available from SAP SE of Walldorf, Germany.

Tables 846 can include one or more field table elements 848d. A field table element 848d can define a particular field of a particular database table. Each field table element 848d can include an identifier 850a of a particular data element 842 used for the field. Identifiers 850b-850d, can specify whether the field is, or is part of, a primary key for the table (identifier 850b), or has a relationship with one or more fields of another database table, such as being a foreign key (identifier 850c) or an association (identifier 850d).

A created/modified table element 848e can be at least generally similar to the domain element 840h.

Example 10—Example Metadata Model

FIG. 9 illustrates a definition of a metadata model 900. The metadata model 900, in particular, represents a view, such as a Core Data Services view of SAP SE, of Walldorf, Germany, and be expressed in a format such as CSN. The metadata model 900 can include a variety of different components, at least some of which can be considered to be metadata models. That is, the metadata model 900 can be a model that is based at least in part on multiple sub-models. The sub-models can specify particular aspects of the overall metadata model 900.

The metadata model 900 can optionally include one or more annotations 904. An annotation can be a metadata component that can be added to a metadata model. For example, a provider may supply a base model, and individual users or customers may wish to add metadata that is specific to their operating environment and use cases. The ability to add annotations can thus enhance usability by allowing for custom metadata elements, without impacting other users of a base metadata model. Annotations can be specified for different software layers or frameworks.

In the example shown, annotations 904 can be indicated as annotations using particular syntax elements, such as by preceding an annotation with the "@" symbol. In at least some cases, annotations 904 can also be indicated by placing them in the appropriate portion of a metadata model, such as in a header section or another section designated for annotations. In some cases, annotations 904 can reference other metadata models, such as a metadata model of a data source, or can reference a data source that is associated with a metadata model. In either event, such an association 904 can create a dependency between the metadata model 900 and the other metadata model/data source.

The metadata model 900 can include instructions 908, in this case a SQL statement 910, defining a core metadata model/object having an identifier 912 (which can be used, for example to later access or activate, such as to instantiate, the metadata model). In particular, the instructions 908 shown define a view. The annotations 904 further specify properties of the view, as do other portions of the metadata model 900 that will be further described.

The instructions 908 can specify one or more data sources 916. Data sources 916 can define data to which at least a portion of the metadata of the metadata model 900 will apply, and can also supply additional metadata for the metadata model 900. Note that the metadata model 900 can be, in at least a sense, dependent on referenced data sources 916. For example, if the metadata model 900 relies on particular expected data or metadata of a data source 916, the metadata model may be unusable, have performance issues, or provide incorrect results if the referenced data sources do not include expected data or metadata, or are otherwise inconsistent with how the data source is used in the metadata model. As shown, the data sources 916 includes two tables, "vbak" and "vbkd." These tables will typically include metadata features such as one or more fields, where each field is associated with a data type, designations of a primary key, and optionally associations with other database components, such as association or foreign key relationships with other database tables.

The metadata model 900 can optionally include specifications of one or more associations 920. An association 920 can define a relationship to another entity. An association 920 can be processed during the use of the metadata model 900, such as being converted to a SQL expression such as a JOIN. Unlike other conditions or elements that are included in the metadata model 900, associations can define a relationship that can at least in some cases be optional, such as being selectively activated depending upon how the metadata model is accessed. For example, an association 920 can be converted to a JOIN condition that uses a table provided in a SELECT statement that references the metadata model 900.

The metadata model 900 can include one or more components 922 that specify how data retrieved using the metadata model should be processed, including to generate values that are associated with other metadata elements of the metadata model. Processing can include calculating values, such as using a formula specified in, or referenced by, the metadata model 900. In particular, a processing component 922 can specify that a particular field value should be treated as an element 924, where an element can be as described in Examples 8 and 9. Thus, the metadata model 900 can include dependencies on how elements are defined, and the metadata model 900 may not be accurate, or useable, if the element definition does not match how it is used, and intended to be used, in the metadata model 900.

The metadata model 900 can optionally include additional components, such as one or more conditions 928, or other operations, such as aggregations, unions, etc., including such operations that are typically supported by a database query language.

Example 11—Example Metadata Model, Including Relationships with Other Metadata Models FIG. 10 illustrates how metadata models may have dependencies on other metadata models. In particular, FIG. 10 shows a view metadata model 1004, which can be the metadata model 900 of FIG. 9. FIG. 10 also illustrates a metadata model 1008 for an access control object (such as a DCLS, or data control language source), a metadata model 1012 for a metadata extension object (such as a DDLX, or metadata extension), and a metadata model 1016 for an extension element object (such as a DDLS, or data definition language source). The metadata model 1016 represent an extension whose data can be imported by a target system from a source system as described in Example 6.

The access control object metadata model 1008 can be used for restricting access to data that can be retrieved using the view metadata model 1004. For example, the view metadata model 1004 and the access control object metadata model 1008 can be processed together when the view metadata model 1004 is activated, such as to generate SQL commands that retrieve data for the view metadata model, but which are filtered or restricted based on the access control object metadata model. As the access control object metadata model 1008 references the view metadata model 1004, the access control object metadata model depends on the view existing, and on the view containing elements specified in the access control object metadata model. For example, the access control object metadata model references the "SalesOrderType" element of the view "I_SampleSalesOrder" and the authorization object "V_VBAK_AAT" with its authorization field "AUART". Thus, the first element would be undefined or unusable if the corresponding element did not exist in the view metadata model 1004.

The metadata extension object metadata model 1012 (which adds annotations to the view metadata model 1004) has similar dependencies on the view metadata model, as does the extension element object metadata model 1016 (which adds additional elements to the view metadata model).

Example 12—Example Relational Model of Metadata Models

Figure 11:
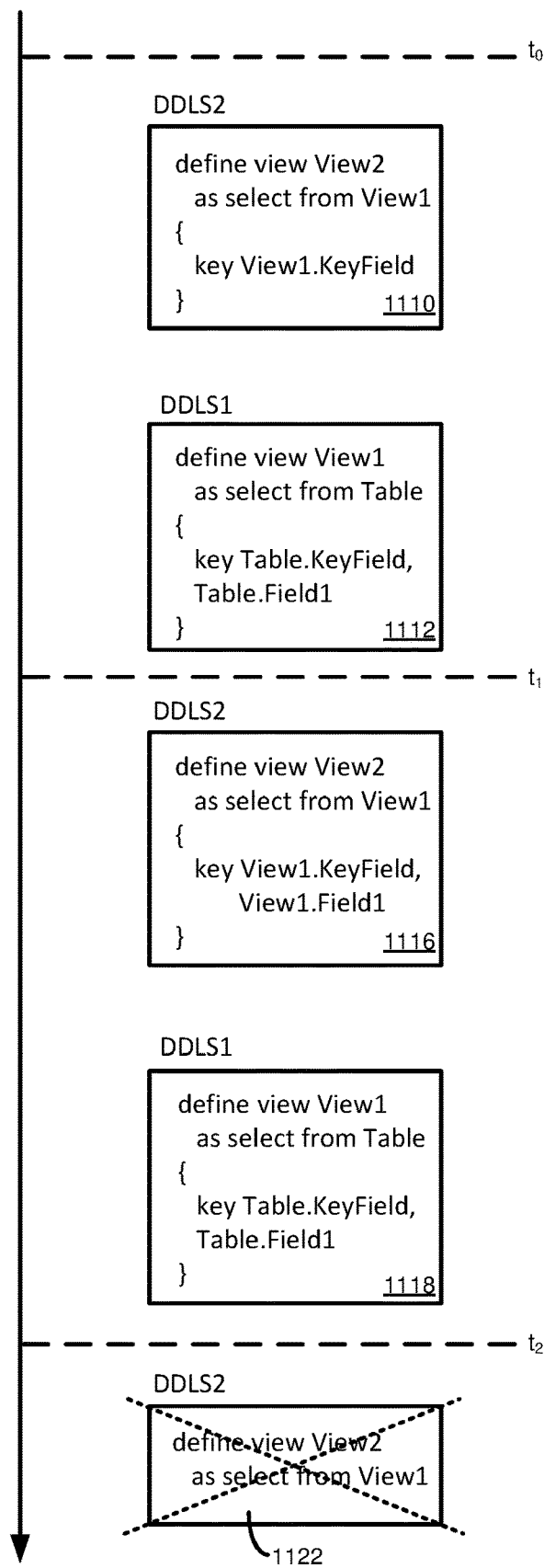
FIG. 11 is a schematic diagram illustrating how metadata models can be interrelated, and updated or deleted, including by multiple computing systems.

FIG. 11 illustrates how metadata models may be dependent on one another, and can be changed over time, which can affect the use or validity of dependent metadata models. At time $t_0$, data definition language versions of metadata models are provided. The metadata models are for two database objects, a model 1110 for a View1 and a model 1112 for a View2. The model 1112 for View2 references View1, as it contains a SQL select statement that defines a particular subset of data defined by the model 1110 for View1. Thus, the model 1110 includes a dependency on the model 1112. In particular, the model 1110 depends on View1 existing, and there being a field "KeyField" in View 1.

At time $t_1$, a model 1116 for a second version of View2 is received. Compared with the model 1112, the model 1116 includes another field, Field1, of View1, in the definition of View2. In some cases, the model 1116 can be provided as a complete model, while in other cases only changes compared with a prior model version are sent.

At a time $t_2$, the second system uploads an indication 1122 that View2 was deleted. Note that, in this case, the deletion of View2 does not affect any described metadata model, as View2 depended on View1, but View1 did not depend on View2. If, instead, View1 had been deleted at time $t_2$, it could be determined that deleting View1 would create issues with View2.

Figure 12A:
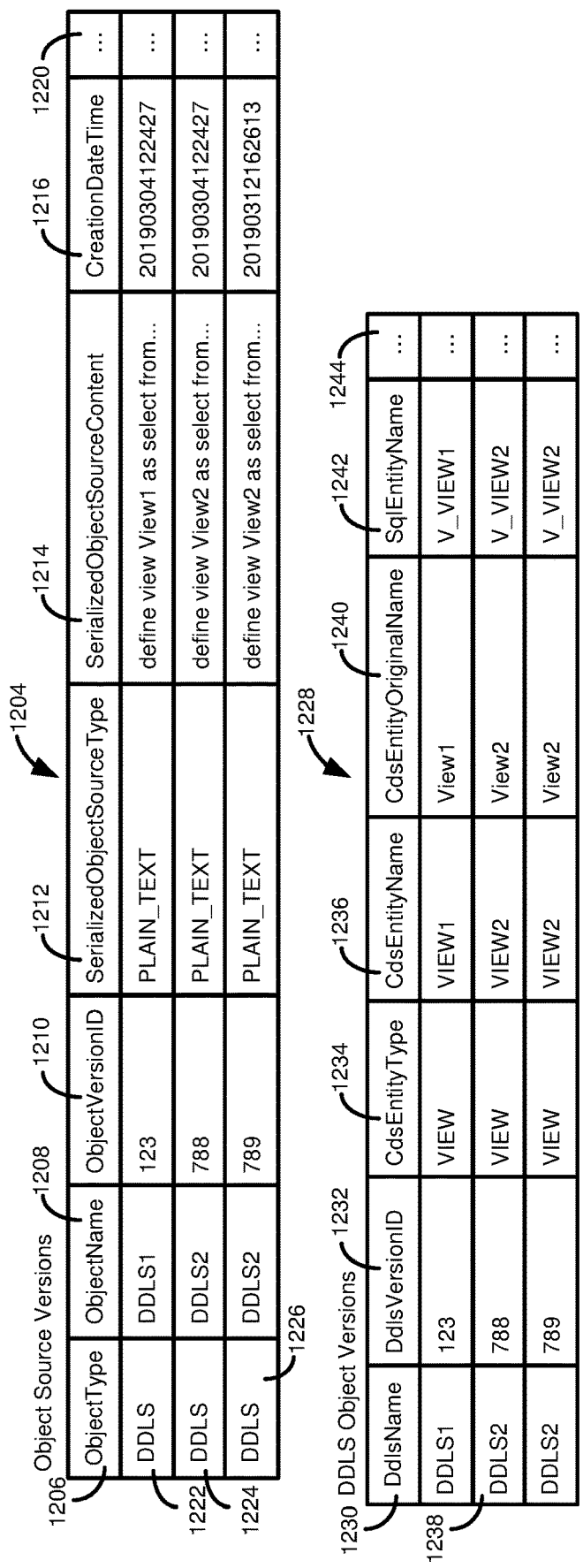
FIGS. 12A and 12B are example tables illustrating how metadata models can be stored in a relational format.
Figure 12B:
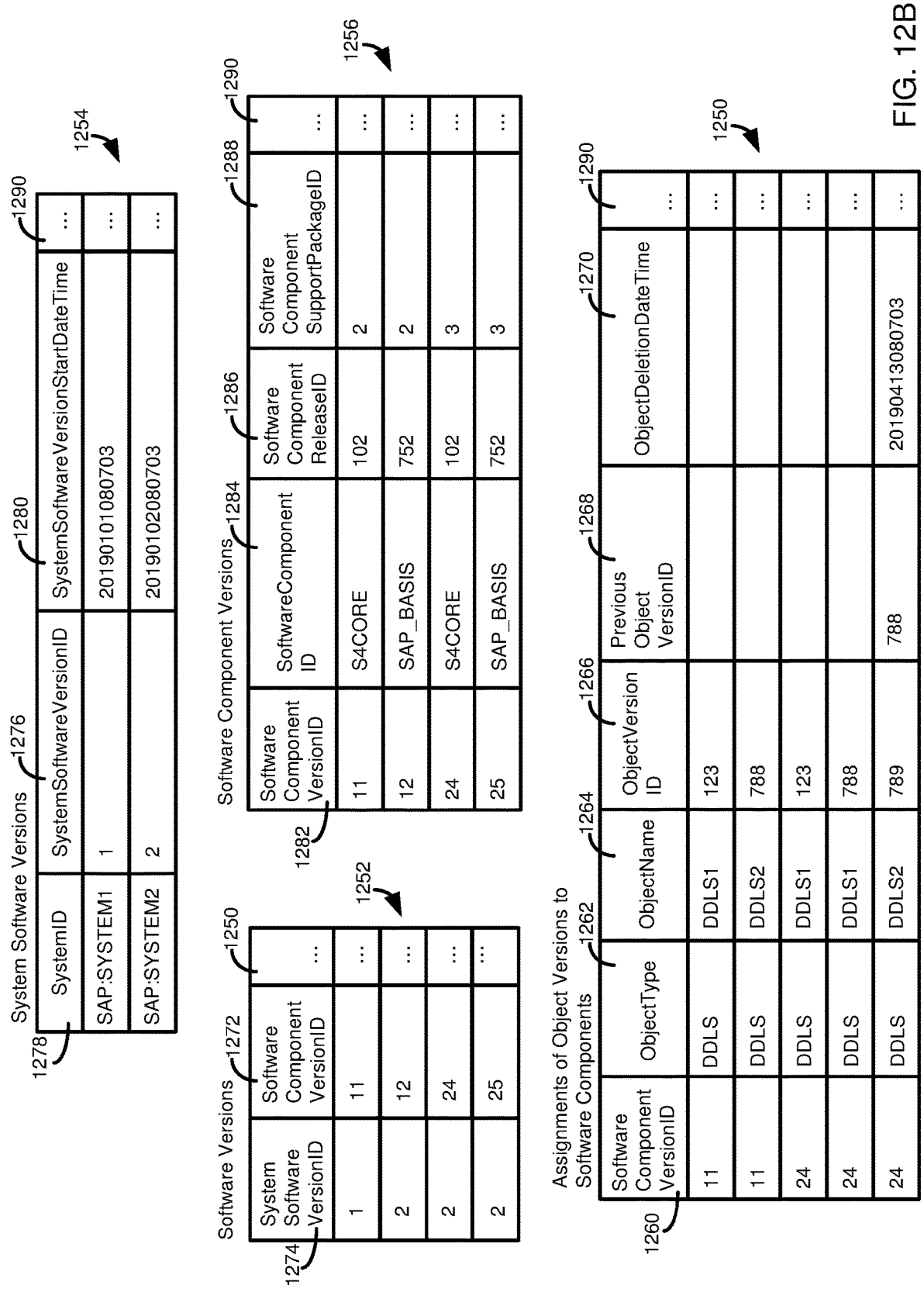

FIG. 11 illustrates the metadata models as defined in a first format, such as a SQL statement defining the views. FIGS. 12A and 12B illustrates how the metadata models shown in FIG. 11 can be converted to a different format, such records in a collection of database tables used to store representations of metadata models. In particular, FIG. 12A shows a table 1204 that includes a field 1206 for an object type associated with a record of the table, a field 1208 holding a name of the object, a field 1210 holding a version identifier associated with the object, a field 1212 providing a type associated with an original format in which the corresponding metadata model was received (e.g., plain text, JSON, XML, CSON, etc.), a field 1214 holding a listing of the original source content (in the type associated with the field 1212), and a field 1216 that includes a timestamp of when the object was received (e.g., with reference to FIG. 11, a timestamp associated with time $t_0$, $t_1$, or $t_2$). The table 1204 can optionally include one or more additional fields 1220.

It can be seen that the table 1204 includes a record 1222 for View1, received at $t_0$, a record 1224 for the metadata model of View2 received at $t_0$, and a record 1226 for the metadata model of View2 received at $t_1$. Note that table 1204 can include information for object source versions, and so type, name, and version information (i.e., fields 1206, 1208, 1210) can be specific for the object as an object source (e.g., a data definition language source, or DDLS).

A table 1228 can include fields for data definition language object versions, which can include a field 1230 for a DDLS name and a field 1232 for a DDLS version identifier, which fields can correspond to the fields 1208, 1210 of the table 1204. The table 1228 can further include a field 1234 that describes an entity (e.g., metadata model) type associated with the corresponding metadata model. Examples of entity types can be table, view, access control, annotation extension, metadata extension, etc.

A field 1236 can include an entity name or identifier, which can be a name or identifier assigned to the metadata model in the declaration of the metadata model, such as in the SQL statements shown in FIG. 11. For example, FIG. 11 shows metadata model 1110 as defining a VIEW1, which then supplies the type indicated in field 1234, and the name entered in field 1236 indicated for a record 1238. Note that field 1236 can be a canonical form of the name of the metadata model, and the original name, supplied in the metadata model definition, can be included in a field 1240. Similarly, the canonical name of field 1236 can be associated with other formats, such as a format provided in a field 1242, which, as shown, can be a name used in SQL queries for the metadata model, which can correspond to a name of the metadata model used in a database layer, such as in an information schema. The table 1228 can include one or more additional fields 1244.

As shown in FIG. 12A, all of the information for the metadata models provided at to and $t_1$ in FIG. 11 can be retrieved from the tables 1204, 1228, either from individual fields or from the field 1214 with the original source content. FIG. 12B illustrates tables 1250, 1252, 1254, 1256, which can store additional information about the metadata models, including about the systems from which the metadata models, or updates (including deletions) were received. In particular, table 1250 can be used to associate metadata models with software component version identifiers, which can be used to describe the operating environment on the system from which the metadata model was received. Table 1250 includes a field 1260 for the software component version ID associated with the metadata model object name listed in field 1264 (and which corresponds to the field 1208 of table 1204) and the version identifier of field 1266 (which corresponds to the field 1210 of table 1204). A type for the object can be specified in a field 1262.

When a metadata model is changed, the version associated with the identifier in the field 1266 can be linked to a prior version of the metadata model, which can be stored in a field 1268. In the case of a metadata model deletion, a deletion time can be listed in a field 1270 (where no value, or a NULL value, can indicate that the object has not been deleted). In some cases, the deletion field 1270 can be filled out for all versions of the data model. In other cases, the deletion field 1270 is only populated for the last version of the metadata model prior to the deletion.

The table 1252 can associate particular software components, listed in field 1272 (and corresponding to field 1260) with specific system software versions listed in a field 1274. In turn, table 1254 can associate the specific software system versions, in a field 1276, with specific systems indicated by a system identifier in a field 1278, and a timestamp in field 1280 indicating when the system was installed, released, or activated. The table 1256 can include a field 1282 for particular software component versions, corresponding to field 1260 with an identifier of the software component provided in field 1284, a release identifier in field 1286, and a support package identifier in a field 1288. Each of the tables 1250, 1252, 1254, 1256 can optionally include one or more additional fields 1290.

Figure 13:
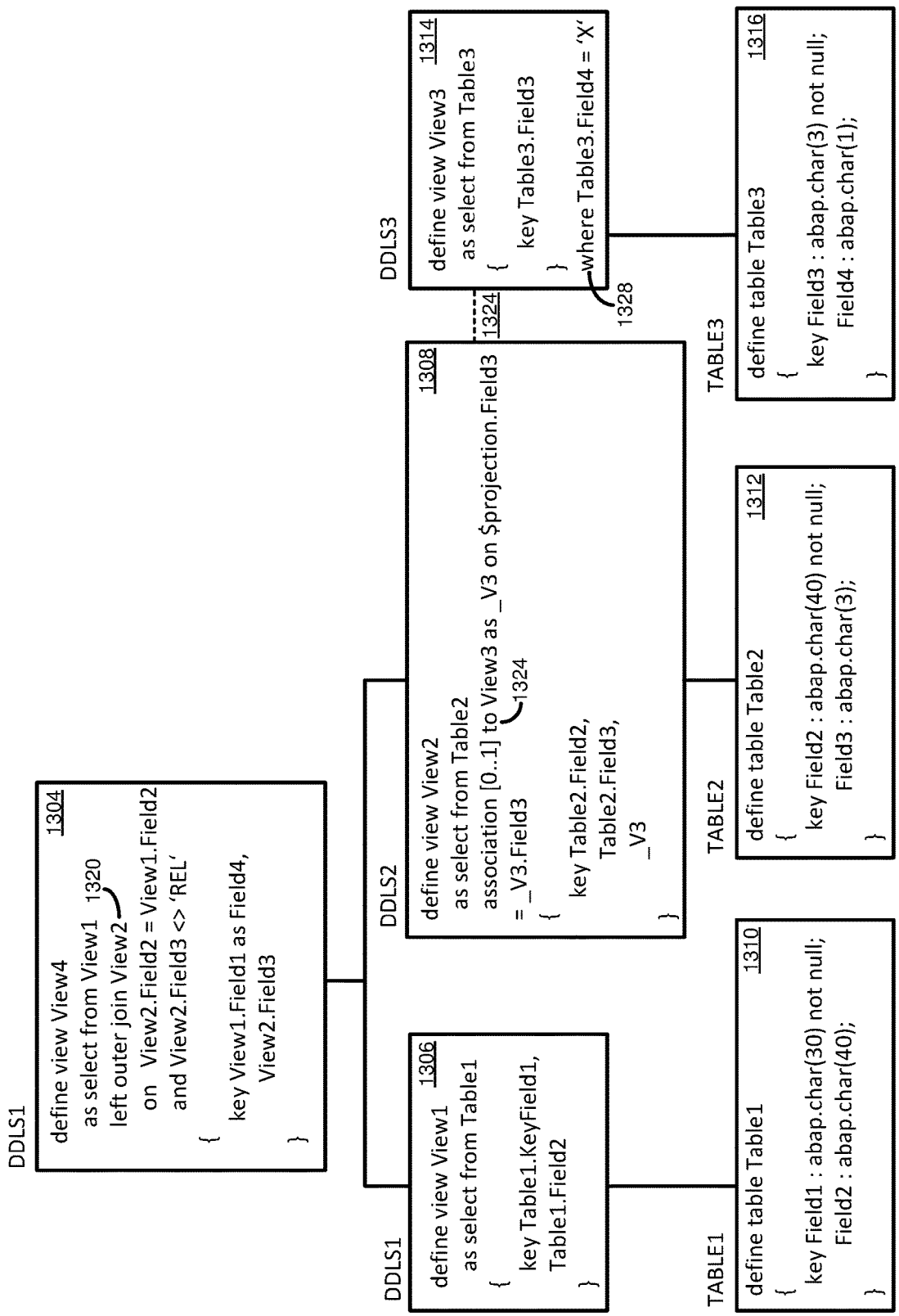
FIG. 13 is a schematic diagram illustrating how metadata models can be interrelated, and can include query operations, such as select statements, join conditions, and where conditions, and how database objects can be related by associations.

Example 13—Example Metadata Relational Model, Including Query Language Operations FIG. 13 illustrates a scenario where a metadata model 1304, in particular, a view, is defined with reference to two view metadata models 1306, 1308, which can in turn depend on one or more additional data models. The metadata model 1306 depends from a metadata model 1310 for a table, while the metadata model 1308 depends from a metadata model 1312 for a table, and has an association with a metadata model 1314 for another view, which in turn references a metadata model 1316 for a table. These dependencies can be evaluated as described for a scoping function and a traversal component for identifying database artefacts and associated metadata for one or more specified artefacts (including artefacts that are responsive to a particular search/query request).

The view metadata models 1304, 1306, 1308, 1314 include SQL select statements that can be stored in an alternative format, such as in tabular form, as shown in FIG. 14. The select statements of the view metadata models 1304, 1306, 1308, 1314 of FIG. 13 can include additional features/operations that can be stored in an alternative representation, such as a join condition 1320 in the metadata model 1304, an association 1324 between the metadata model 1308 and the metadata model 1314, and a where condition 1328 in the metadata model 1314.

FIG. 14 illustrates a table 1404 that can store information for metadata models having select statements in tabular format. Table 1404 includes a field 1408 for an object type, which for the metadata models 1304, 1306, 1308, 1314 is a data definition language source object. A field 1410 includes a name or identifier for each record, which can be a system assigned name, or a name used for system purposes, for a given object, such as to uniquely identify each object.

Note that the SQL statements in FIG. 13 do not assign the name used in the field 1410. A field 1412 can store an object version identifier value for the object associated with each record. In some cases, the value stored in the field 1412 can be unique to the given object, and can be incremented when a change is made to the object. For example, record 1416 is shown as having an object version identifier of 56 for the DDLS1 object. If the DDLS1 object is changed again, the object version identifier can be incremented to 57.

The table 1404 can include a field 1420 that stores an entity name, which can be an entity name used in the SQL statements shown in FIG. 13. For example, the metadata model 1304 defines a view View4, which is the name provided in the field 1420 for record 1422, corresponding to View4. In at least some cases, each object in the table 1404 can be associated with a primary data source. For example, a SQL statement can have the form "SELECT FROM primaryDataSource," where the identifier of "primaryDataSource" is stored in the field 1424. For metadata model 1304, View4 is defined primarily with respect to View1, and so View1 is listed in field 1424 for record 1422. The primary data source of field 1424 can have a type, such as table or field, which type is provided in a field 1426.

As described, a select statement used in a metadata model can have additional operations, which can be recorded in the table 1404. If an object metadata model definition includes a where condition, an identifier for that condition can be included in a field 1428. Metadata model 1314 includes where condition 1328, and so an identifier for that condition can be entered in the field 1428 for record 1422. The identifier in the field 1428 can identify a particular condition collection, where additional information can be included in a condition collection table 1432, as will be further described. Similarly, if an object metadata model definition includes a join condition, an identifier for the condition can be included in a field 1436. The identifier in the field 1434 can identify a condition collection in the table 1432.

The table 1432 allows condition details associated with the select statements in table 1404 to be further detailed. The table 1432 includes an object type field 1438 and an object name field 1440, which can correspond to the fields 1408, 1410 of table 1404. Note that the join condition of metadata model 1304 is represented by records 1444-1448, the "where" condition of metadata model 1314 is represented by record 1450, and the "on" condition of the association of metadata model 1308 is represented by record 1452.

The table 1432 includes a field 1456 for a version identifier of the object listed in the field 1440, and can correspond to the field 1412. A field 1458 includes condition collection identifiers, and can correspond to the fields 1428, 1436. A group ID field 1460 and a grouping ordinal number field 1462 can be used to preserve the semantics of the conditions as originally expressed (e.g., in SQL). For example, the group ID field 1460 can be used to indicate portions of a condition that are associated with a data source indicated in a field 1464. So, record 1444 is associated with a group identifier in field 1460 of 1, as it is associated with a value of VIEW1 in field 1464, while records 1446, 1448 are associated with a group identifier of 2, as both records are both associated with a value of VIEW2 for field 1464. The values of the grouping ordinal number field 1462 can further identify particular semantics for the records 1446, 1448, such as indicating that record 1446 precedes record 1448 in the original select statement. A grouping operator field 1466 can provide an operator that associates records associated with a particular group identifier value of the field 1460.

For a given operator or relation listed in a field 1468, fields 1470, 1464, 1472, 1474 can list a left group identifier, the left data source name, a left field name, and a left value, respectively. Similarly, fields 1476, 1478, 1480, 1482 can provide a right group identifier, a right group source name, a right field name, and a right value, respectively. "Left" and "right" refer to the position of the values with respect to the operator of the field 1468.

It can thus be seen that the records of the table 1432 can be used to reconstitute the operations or conditions of the metadata models in the format shown in FIG. 13. Although the table 1432 may not explicitly list a type of operation or condition, that information can be gathered from the fields 1428, 1436 of the table 1404 (or from the table 1484, as will be further described).

An association definition table 1484 can define associations included in metadata models, such as models provided in the format shown in FIG. 13, and can include an object type field 1486, an object name field 1487, an object version identifier field 1488, and an entity name field 1489, which can be as described for the fields 1408, 1410, 1412, 1420 of table 1404. A field 1490 can store a standardized version of an object identifier (e.g., an identifier of an object metadata model) listed in a field 1492, which can be the object name as included in the association definition in the original metadata model, such as the association 1324. A field 1494 can provide a name of the associated entity, and a type associated with the entity (e.g., table, view) can be provided in a field 1495. An association can be associated with a minimum cardinality and a maximum cardinality, fields 1496 and 1497, respectively. A field 1498 can include a condition collection identifier, which can correspond to the field 1458 of the table 1432.

Taking the example association 1324 of FIG. 13, the record 1452 sets forth the condition defined for the association (i.e., the "on" condition). For example, values in a FIELD3 of the table referenced by the view 1308 being defined being equal to a FIELD3 of the associated view defined in metadata model 1314, which in turn are associated with the table defined in metadata model 1316.

The tables 1404, 1432, 1484 can optionally include one or more additional fields 1499.

Example 14—Example Relational Metadata Model, Including Field Definitions and Relations In some cases, a metadata object, such as a view, can include fields that are calculated or otherwise based at least in part on elements (e.g., fields) of one or more other metadata models. The calculations can be explicitly specified in the metadata model definition, or can be referenced in the model definition, such as by calling in a built in function or referencing a function in another metadata model, in a library, an API call, etc.

FIG. 15 illustrates a metadata model 1504 that defines a view with reference to a metadata model 1508, that in turn references a table defined by a metadata model 1512. The metadata model 1504 includes four fields, 1520, 1522, 1524, 1526 that are derived from fields in the metadata model 1508. The metadata model 1508 includes three fields 1530, 1532, 1534 that are selected from the table defined by the metadata model 1512. The table defined by the metadata model 1512 includes three fields 1540, 1542, 1544 that are declared/defined in that metadata model.

FIG. 16 illustrates a table 1600 that can be used to summarize the fields used in the metadata models 1504, 1508, 1512. The table 1600 includes a field 1602 that indicates the type of object with which the field is associated, such as being associated with a table or a data definition language source object (e.g., a view). A name of the object is provided in a field 1604, which can be an object name used by, or supplied by, a system with which the metadata model is used, or, for example, by a metadata repository A version identifier for the object can be provided in a field 1606, which, as discussed for other metadata model representations, can be a unique number for each object, and can be incremented as the object is changed. An entity name field 1608 can include a name that is associated with the metadata model, such as a name that is defined in the declaration of the metadata model.

Each metadata object can be associated with one or more fields, and a field 1610 can store a standardized representation of a field name provided in a field 1612. For example, the field 1610 can store a name that removes formatting/capitalization (e.g., lower case letters) from the field name listed in the field 1612. As described, metadata models may incorporate fields from other metadata models. The immediate source of the field can have a name, provided in a field 1614, and can have a type, such as a table or view, and this type can be provided in a field 1616. The name of the field in the immediate source can be different than the name of the field in the metadata model into which it is incorporated, so a field 1618 can include the name of the field in the source metadata model.

Calculated fields can be associated with an expression, and an identifier for the expression can be provided in a field 1620, which can be used to access the expression, such as an expression stored as a representation in one or more other tables. A field 1622 can indicate whether the field is a key field (e.g., a field used in a primary key). fields can be associated with a data type, which can be listed in a field 1626, and a data type can be associated with additional semantic or technical information, such as in a data element, an identifier for which can be provided in a field 1624. Often, a data type associated with a field 1626 (and in turn with the field 1624) can have a length, such as number of digits or characters that are allowed, and this information can be included in a field 1628.

Numerical fields that allow for the use of decimals can be associated with a value (e.g., a number of decimal places allowed) through a field 1630. Fields 1632, 1634, 1636, 1638 can be used to define where in a source metadata model a definition of the expression appears, such as a start line, start column, end line, and end column, respectively. The table 1600 can optionally include one or more additional fields 1640.

As an example of how the table 1604 can be used to represent fields from the metadata models of FIG. 15, consider record 1650, associated with the metadata model 1508. Metadata model 1508 is for a view, VIEW1, and references a Field1 of Table1 (defined by the metadata model 1512), which is a key field. Record 1652 corresponds to the definition of Field1 of Table1 in the metadata model 1512, where Field1 is defined as a key field, that has data element type DE1, and may not be a null value. Record 1650 includes the name of the object, VIEW1, in field 1608, the name, FIELD1, of the field in the object in field 1610, the original name, Field1, of the field in the object in field 1614, the name of the entity where the field is referenced from, TABLE1, in field 1616, the type of the referenced entity, TABL (for table) in field 1616, and the name of the field, FIELD1, in the referenced entity in field 1618. Field 1622 of record 1650 is set to TRUE, indicating that the field associated with record 1650 is a key field, while field 1624 specifies that the field has a data element type of DE1, which fields 1626 and 1628 indicate is a character data type of length 30.

Example 15—Example Relational Metadata Model, Including Annotations

Figure 17:
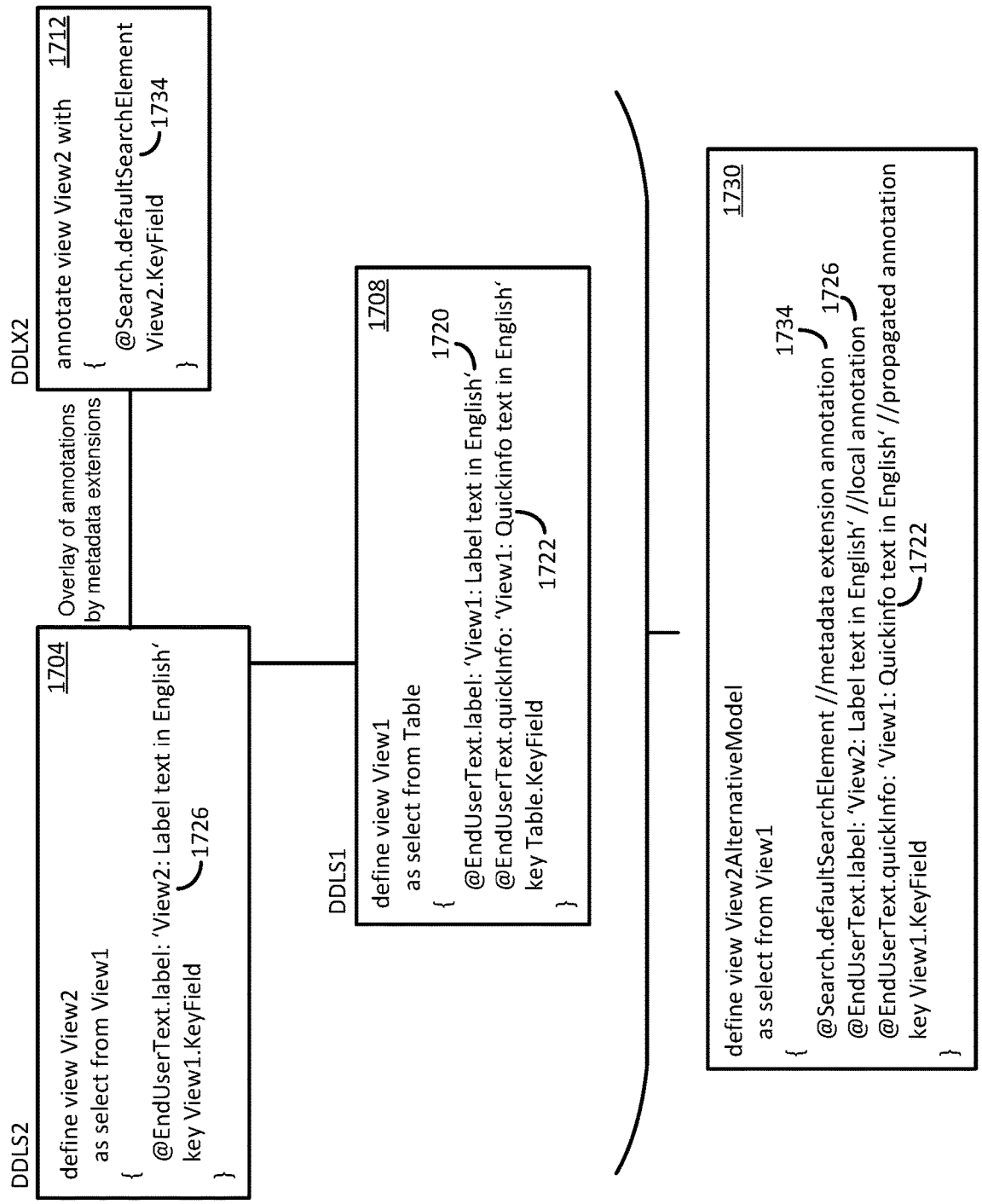
FIG. 17 is a schematic diagram illustrating how metadata models can be related, including metadata models having annotations and metadata models that annotate other metadata models.
Figure 18:
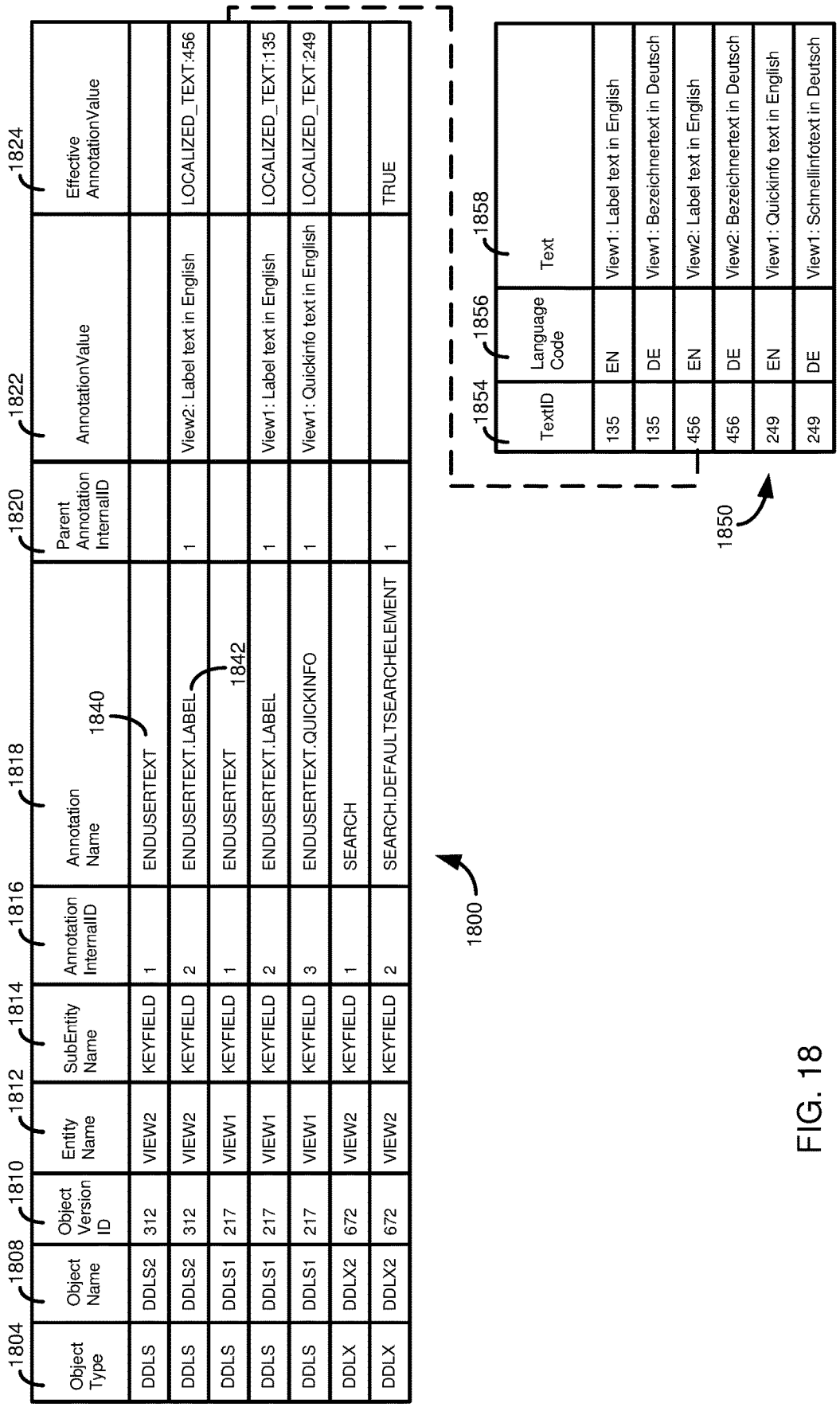
FIGS. 18 and 19 provide example database tables illustrating how metadata model information presented in FIG. 17 can be stored in a relational format.

As described in Example 10, a metadata object, such as a view definition, can include annotations. FIG. 17 illustrates how metadata objects, which can have dependencies on one another, can have annotations, which can be stored in another format, such as the format shown in the table 1800 of FIG. 18.

FIG. 17 includes a metadata model 1704 for a view, View2, which is defined with respect to another view, View1, defined in metadata model 1708. A metadata model 1712 for a metadata extension, DDLX2, provides additional metadata elements for the metadata model 1704. The metadata model 1708 includes two annotations, 1720, 1722 that may be incorporated into the metadata model 1704. However, the annotation 1720, which provides a label for View1, is superseded by an annotation 1726 defined in the metadata model 1704 for View2. An annotation can be superseded, in some cases, if the annotation has the same name or type (e.g., "@EndUserText.label" as shown) in the referencing metadata model as in the referenced metadata model.

Metadata model 1730 illustrates an "effective" representation of the metadata model 1704, including annotations incorporated into the metadata model 1704 by dependency. It can be seen that the effective metadata model 1730 includes the annotation 1726, but not the annotation 1720. As the annotation 1722 for the metadata model 1708 is not superseded, it is included in the effective metadata model 1730, as is annotation 1734 from the metadata model 1712.

The table 1800 can summarize the annotations of the metadata models of FIG. 17. The table 1800 includes a field 1804 for an object type associated with the metadata model which is annotated by a record representing an annotation. As shown, the field 1804 includes values of "DDLS" for views, or "DDLX" for metadata extension objects. A field 1808 can provide a name of the object, such as a system name, while a field 1812 can provide an object name defined by the declaration of the object. A field 1810 can provide a version identifier for the object. A field 1814 can provide a name of a subentity associated with an annotation, which can be, for example, a particular view field to which an annotation applies.

A field 1816 can provide an annotation internal identifier, which can be used to distinguish between multiple annotations for a metadata model, and can be used to provide an ordering of annotations when multiple annotations are present in a metadata model. A value of the field 1816 can also be used to correlate a base or parent annotation or annotation type with a sub-annotation, as will be further described. An annotation name can be included in a field 1818, which can be a type (or class) or subtype (or class method or class data member) of an annotation. A field 1820 can provide an identifier for a parent annotation. For example, record 1840 assigned an annotation internal identifier of "1" to the "ENDUSERTEXT" annotation. "ENDUSERTEXT" can be a base annotation type, and record 1842 can include the subtype of the annotation, "ENDUSERTEXT.LABEL," where the value of "1" in field 1820 indicates that the record 1842 refers to the annotation of record 1840.

A value of the annotation as defined in the declaration of the metadata model can be provided in a field 1822. The value in the field 1822 represents the explicitly defined value assigned to the annotation. An effective value assigned to the annotation can be indicated in a field 1824. For example, the annotation @Search.defaultSearchElement has the effective value "TRUE" even though this is not explicitly captured in the declaration of the metadata model but automatically derived from the annotation defaulting logic. Furthermore, in the example shown, the effective value for language dependent texts can be specified with respect to an identifier in a table 1850, where the value in the field 1824 corresponds to a value in a text identifier field 1854. The table 1850 is also shown as including a field 1856 that provides a code for a language associated with the text, and the actual text to be displayed can be provided in a field 1858.

Figure 19:
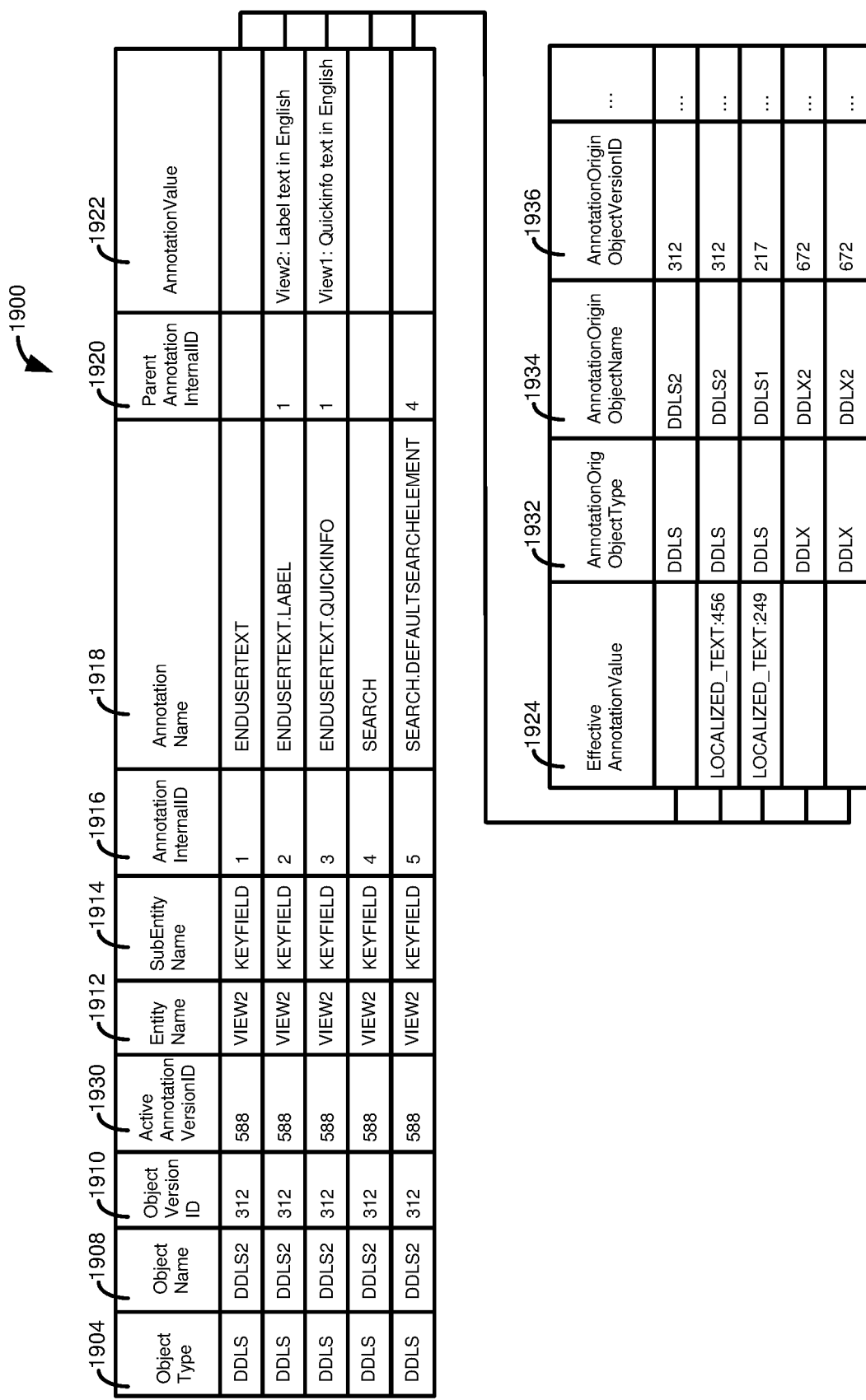

The table 1800 can store information for all annotations that are incorporated into a particular metadata model. However, as described, some of the annotations may not be "active," in that, for instance, a locally declared annotation may overwrite an imported or referenced annotation. Similarly, in some cases annotations from multiple referenced sources (e.g., metadata models) may overlap or conflict, in which case only one (or, generally, a subset) of the annotations may be designated as active. It can be beneficial to separately maintain a repository of active annotations, which can be stored as shown in the table 1900 of FIG. 19.

The table 1900 can include a field 1904 for an object type, a field 1908 for an object name, a field 1910 for an object version identifier, a field 1912 for an entity name, a field 1914 for a subentity name, a field 1916 for an annotation internal identifier, a field 1918 for an annotation name, a field 1920 for a parent annotation identifier, a field 1922 for an annotation value, and a field 1924 for an effective annotation value, which fields can be implemented at least generally described for the similarly titled and numbered fields of the table 1800.

The table 1900 can include additional fields, such as an active annotation version identifier field 1930. Note that the active annotation version identifier in the field 1930 can have a value that is different than the object version identifier in the field 1910. For example, a new metadata extension could change the active annotation of an existing base (e.g., view) model version being annotated, so it may be useful to track the versions separately.

As annotations can be imported from other sources, it can be useful to track information about such annotations with respect to their source object (e.g., metadata model). Accordingly, a field 1932 can store the object type associated with the annotation (either the local object type or the object type of the object from which the annotation is being imported), while a field 1934 can store the name of the originating object. A field 1936 can store the version identifier of the originating object.

Example 16—Example API for Metadata Access

Users or applications can access stored metadata models, such as metadata maintained in one or more of the tabular formats described in Examples 12-15. In some cases, the information can be accessed via an API, such as a web-based API using REST services. In a particular example, the API can use the OData protocol.

Figure 20:
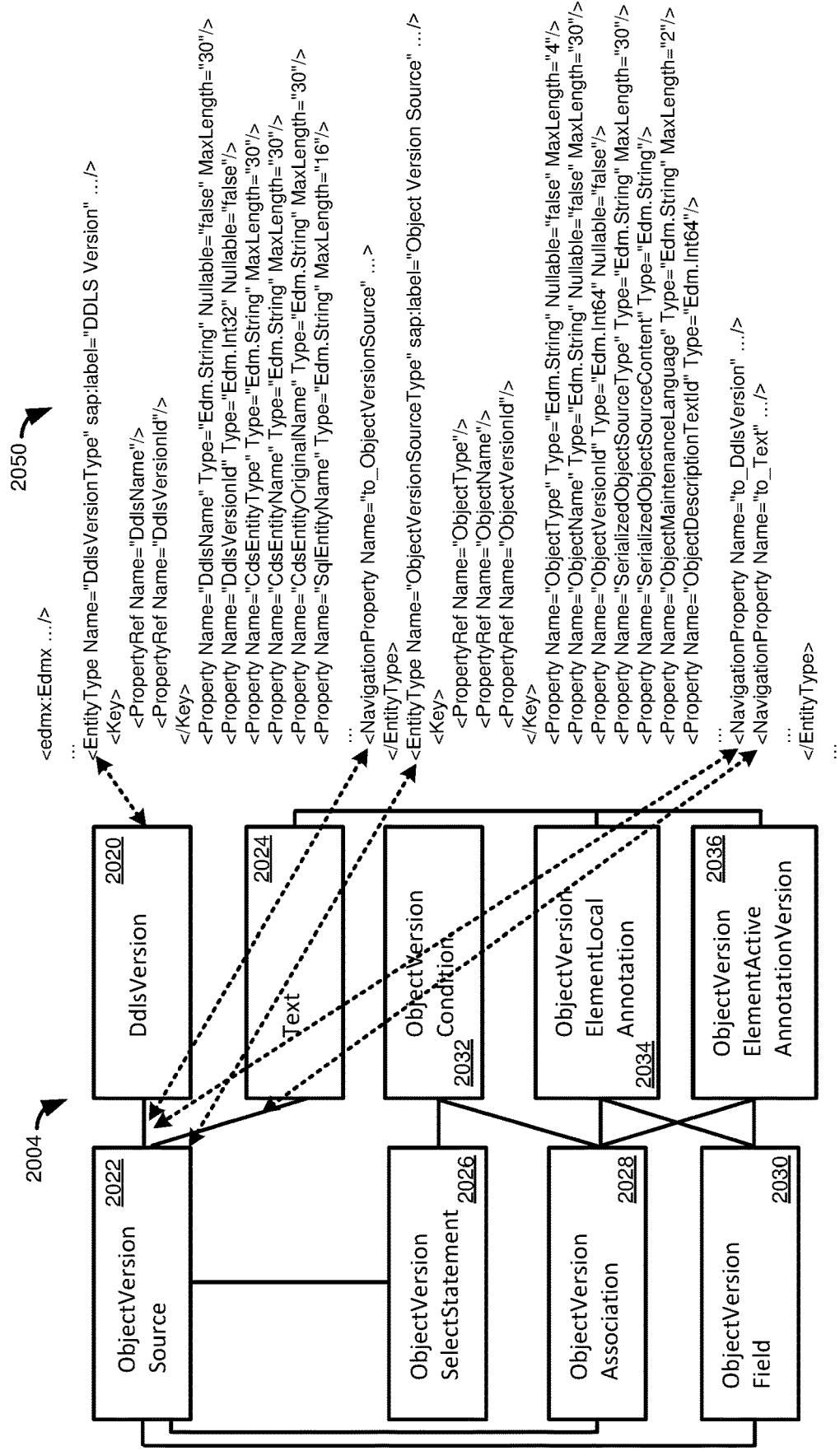
FIG. 20 illustrates code for a data access service that can access a persistency model for metadata models.

FIG. 20 illustrates an extract 2004 of a persistency model (e.g., all or a portion of the tables of Examples 12-15) and an extract 2050 of an OData service that can be used to access data maintained in the persistency, or determined or calculated from data in the persistency. The persistency extract 2004 can include tables, or portions thereof (e.g., one or more fields), for DDLS version information 2020, object version source information 2022, textual information 2024 (e.g., text of original metadata object definition information), select statement information 2026 associated with object versions, association information 2028 associated with object versions, field information 2030 associated with object versions, condition information 2032 associated with object versions (e.g., "where" or "on" conditions, such as described with respect to table 1432), local annotation information 2034 associated with object versions, and active annotation information 2036 associated with object versions.

An API, or other functionality for accessing services of a metadata service, can provide functionality for, among other things, querying and maintaining representations of metadata models, such as to create, update, or delete metadata model representations (or specific versions thereof). The API can allow for other options, such as aggregating data from persisted metadata model representations or searching a metadata repository, including using fuzzy search techniques. For example, a user (or an application) might request information regarding how many objects are registered in a repository, how many versions are associated with a particular object, or a number of fields, such as a maximum number of fields, that an object may have.

FIG. 21 illustrates an example table 2104 having objection version source information, and an example table 2108 having DDLS version information. The table 2104 can have multiple fields, including a field 2112 for an object type associated with a record, a field 2114 for an object name associated with a record, and a field 2116 for an object version identifier associated with a record. The table 2108 can have a field 2120 for a DDLS name, a DDLS version field 2122, an entity name (such as a CDS entity name) field 2124, and an original entity name field (such as an original CDS entity name) field 2126.

Taking the metadata representations of tables 2104 and 2108 and using the extract 2050, a navigation property of the extract can be traversed to the DDLS version table 2108 from a record of the object version source table 2104 by an OData read request like:

. . . /sap/opu/odata/sap/CdsMetadataService/ObjectVersionSource(ObjectType='DDLS',ObjectName='I_SALESORDER',ObjectVersionId=1)/to_DdlsVersion The operation results in the related data record:
<?xml version="1.0" encoding="UTF-8" ?> . . .
<id> . . . /sap/opu/odata/sap/CdsMetadataService/DdlsVersion(DdlsName='I_SALESORDER', DdlsVersionId=1)</id> . . .
<content type="application/xml">
　<m:properties>
　　<d:DdlsName>I_SALESORDER</d:DdlsName>
　　<d:DdlsVersionId>1</d:DdlsVersionId>
　　. . .
　</m:properties>
</content> . . .

The API can allow all related information for a given object version to be searched. For example, a search request for "cust" can have the form:

. . . /sap/opu/odata/sap/CdsMetadataService/Ddls/?search=cust

Which retrieves all five records having the DDLS object name (e.g., field 2114) as I_CUSTOMER. Note that a user can retrieve and access metadata information without knowing the exact name of a metadata model or any of its constituent elements.

An API, or other metadata service access functionality, can support other services, including services based on more coarse granular actions than just simply retrieving and updating metadata models. These services can include uploading object source information, comparing metadata models (and parts thereof), including comparing metadata models between different components or system versions. Analysis can be provided of where various metadata models, or elements, are used, including identifying dependencies between metadata models/metadata model components. Providing such services can be more efficient, and less error prone, than achieving the functionality every time through the application of multiple lower level functions.

As an example, for a request to upload a metadata model, instead of converting object source information for each individual table starting with the object version table to tables storing more detailed information, a user or application can request an upload object action, which can supply an original string defining the object (e.g., the original SQL statement), optionally along with additional information, such as the type of the original source string (e.g., SQL, XML, plain text), the name of the object, the object type (e.g., view, table), other information, and combinations thereof. The input can include:
　ObjectType
　ObjectName
　SerializedObjectSourceType
　SerializedObjectSourceContent
　ObjectMaintenanceLanguage
　ObjectLastChangedDateTime
　SoftwareComponentId
　SoftwareComponentReleaseId A metadata repository can be queried to determine whether a new version of the metadata model needs to be created, and, if so, can convert the uploaded model to a persistency format used by the metadata service. In at least some cases, it can be determined whether any metadata models depend on the updated model and, if so, such dependent models can be updated to provide new model versions.

For a function that compares two metadata models, including two versions of a metadata model, information can be provided as to differences between the objects, how metadata models differ between different versions of a software component, or how metadata models differ between two versions of a system. Example input for comparing two versions of a metadata model can include:
 ObjectType
 ObjectName
 ObjectVersion1Id
 ObjectVersion2Id
 ChangeTypes [e.g., change types to be queries, such as all, insert, update, delete, unchanged]
 ComparisionScope [e.g., all elements of a metadata model, or only specified elements or sets of elements]
The comparison can return information including:
 ObjectVersion
 ChangeType
 SubObjectType [e.g., field, association, parameter]
 SubObjectName
 PropertyType [e.g., active annotation, key, data type, name]
 PropertyName
 PropertyValue The following can represent information in a request for changes in a metadata model:
 Input:
 ChangeTypes=INSERT
 ComparisonScope=ALL
The response can include:
 Output:
 ObjectVersion=2
 ChangeType=INSERT
 SubObjectType=FIELD
 SubObjectName=NewField Thus, the comparison request reveals that a new field, NewField, was introduced in object version 2 of the metadata model.

A metadata exposure service or other functionality for accessing a metadata repository can be to return a list of objects where a particular metadata element is used. For example, a field may be initially defined for a particular table, but then may be referenced by multiple views. Input for this functionality can include:
 Input:
 ObjectType: Identification
 ObjectName: Identification
 ObjectVersionId: Identification
 UseageTypes [e.g., ALL, association, target, data source, annotation)
 MaximumNumberOfIndirections
The output of the request can include:
 UsingObjectType
 UsingObjectName
 UsingObjectVersionId
 UsageType
 DirectlyUsedObjectType
 DirectlyUsedObjectName
 DirectlyUsedObjectName
 DirectlyUsedObjectVersionId
 NumberOfIndirections FIG. 22 provides an example of a "where used" request. A group 2204 of related metadata models includes a metadata model 2208 for a View3 that references a metadata model 2210 for a View2, which references a metadata model 2212 for a View1, which in turn references a metadata model 2214 for a Table1. Assuming that each of the views, 2208, 2210, 2212 references a field of Table1, and that the views refer to this field through their referenced views as shown, a request could be:
 Input:
 ObjectName: TABLE1
 UseageTypes: ALL
 MaximumNumberOfIndirections: 5

In response to the request, the information shown in table 2230 could be provided, either in tabular form as shown, or in another format.

For a dependency check, input (e.g., arguments to the function) can include:
 ObjectType
 ObjectName
 ObjectSourceType
 ObjectSourceContent
 SoftwareComponentVersions
 NewSoftwareComponentVersions A response to the request (e.g., values returned by the function, such as in a structure (e.g., a C++ struct) or class instance, or another complex or abstract data type), can include:
 MessageType [e.g, INFO, WARNING, ERROR]
 MessageText
 EntityReference [e.g., a link to additional details for the metadata model, so that additional information regarding dependent objects can be identified]

As a particular example, consider that a new annotation, NewAnnotation, is added to a field ViewField, which is exposed by a user model. Output for a dependency check can include:
 MessageType: INFO
 MessageText: A new annotation NewAnnotation was added to the field ViewField
 EntityReference= . . . /sap/opu/odata/sap/CdsMetadata-Service/ . . . NewAnnotation . . . .

A service processing access to metadata can cause, or assist, in displaying metadata information to an end user, such on a user interface screen. The service can augment model metadata with additional information that can define the layout of the user interface, and can include or define additional services that allow a user to interact with the data. For example, annotations can be provided that assist a user in providing filter criteria via a value help, as shown in the example code of FIG. 23.

Example 17—Example Vocabularies

As discussed with respect to FIG. 4, a metadata exposure service can provide access to vocabularies that describe annotations that serve as metadata for a database artefact. Some examples are provided of how vocabularies can be derived from a corresponding annotation.

FIG. 24A illustrates an annotation 2404 for a data warehouse that lists elements 2414 for the annotation. FIG. 24B provides an example vocabulary 2426 created from the annotation 2404. The annotation 2404 represents an annotation expressed in CDS notation (as in products available from SAP SE, of Walldorf, Germany), while the vocabulary 2426 is expressed in CSN. This pattern of having a CDS notation for an annotation and CSN notation for a vocabulary continues for the remaining examples in this Example 17.

FIG. 25A illustrates an annotation 2504 that includes an array of values (in this case integers). FIG. 25B shows the corresponding vocabulary 2508. FIG. 26A shows an example annotation 2604 that provides an enumerated list of types, including a default value 2606, while FIG. 26B shows the corresponding vocabulary 2608.

Example 18—Example Standardized API and Metadata Representations

FIGS. 27A-27J illustrate an example listing of at least a portion of an API in a standardized format, which can be an example of an API in a standardized format 320 of FIG. 3.

FIGS. 28A-28C illustrate an example listing of at least a portion of metadata for a data artefact in a standardized format, which can be an example of metadata in a standardized format 330 of FIG. 3.

Example 19—Example Implementations

Figures 29A, 29B:
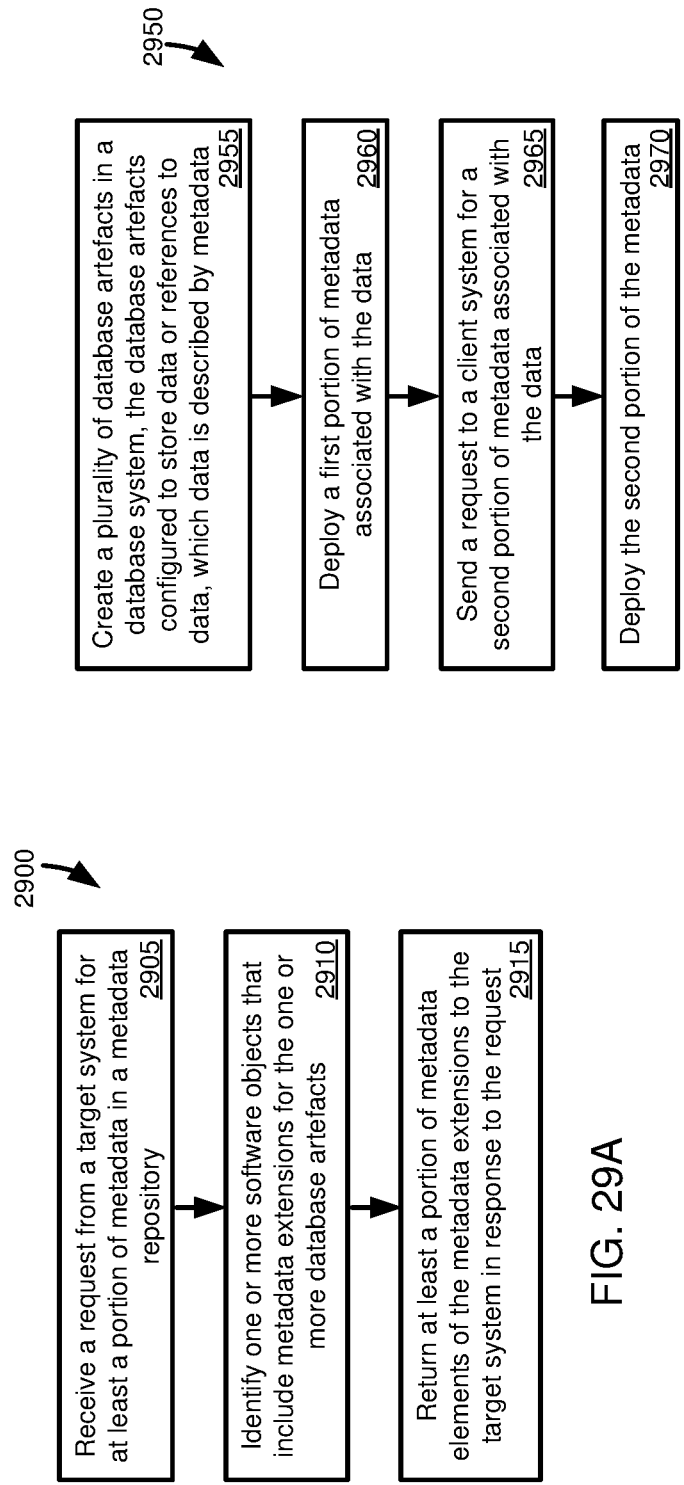
FIGS. 29A and B are flowcharts illustrating an embodiment of disclosed innovations.

FIG. 29A is a flowchart of an example method 2900 for sending metadata for data artefact extensions to a target system. The method 2900 can be implemented in the computing environment 100 of FIG. 1 or the computing environment 500 of FIG. 5.

At 2905, a first request is received from a target system for at least a portion of metadata in a metadata repository. One or more software objects are identified at 2910 that include metadata extensions for the one or more database artefacts. At 2915, at least a portion of metadata elements of the metadata extensions are returned to the target system in response to the first request.

FIG. 29B is a flowchart of an example method 2950 for obtaining metadata from a client system describing data for database artefacts. The method 2950 can be implemented in the computing environment 100 of FIG. 1 or the computing environment 500 of FIG. 5.

At 2955, a plurality of database artefacts are created in a database system. The database artefacts are configured to store data or references to data, where the data is described by metadata. At least a first portion of metadata associated with the data is deployed at 2960. At 2965 a request is sent to a client system for a second portion of metadata associated with the data. The second portion of the metadata is deployed at 2970.

Example 20—Computing Systems

Figure 30:
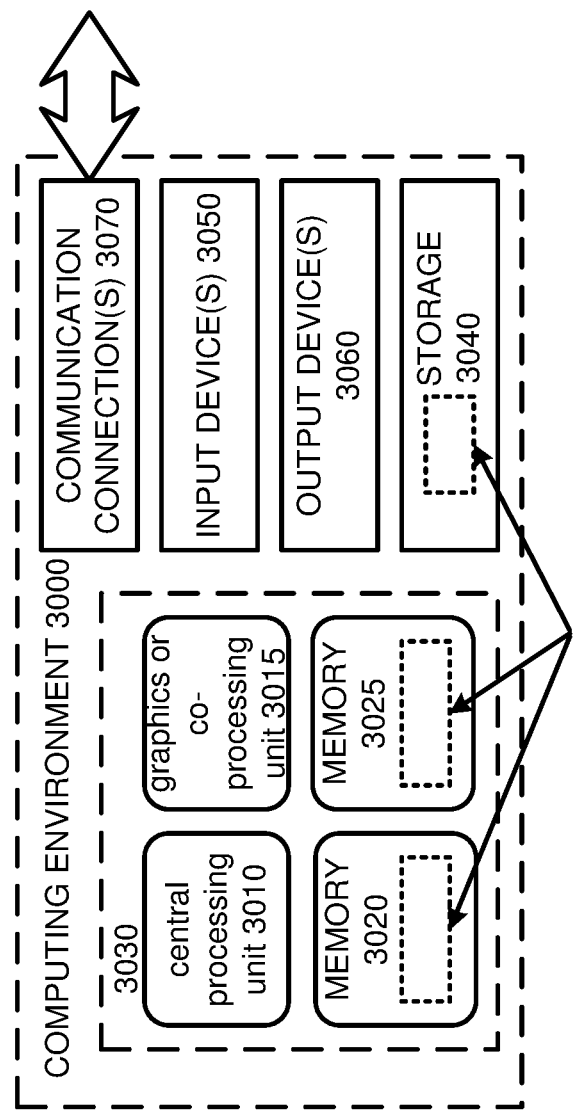
FIG. 30 is a diagram of an example computing system in which some described embodiments can be implemented.

FIG. 30 depicts a generalized example of a suitable computing system 3000 in which the described innovations may be implemented. The computing system 3000 is not intended to suggest any limitation as to scope of use or functionality of the present disclosure, as the innovations may be implemented in diverse general-purpose or special-purpose computing systems.

With reference to FIG. 30, the computing system 3000 includes one or more processing units 3010, 3015 and memory 3020, 3025. In FIG. 30, this basic configuration 3030 is included within a dashed line. The processing units 3010, 3015 execute computer-executable instructions, such as for implementing components of the environment 100 of FIG. 1, including as described in Examples 1-19. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 30 shows a central processing unit 3010 as well as a graphics processing unit or co-processing unit 3015. The tangible memory 3020, 3025 may be volatile memory (e.g., registers, cache, RAM), non-volatile memory (e.g., ROM, EEPROM, flash memory, etc.), or some combination of the two, accessible by the processing unit(s) 3010, 3015. The memory 3020, 3025 stores software 3080 implementing one or more innovations described herein, in the form of computer-executable instructions suitable for execution by the processing unit(s) 3010, 3015.

A computing system 3000 may have additional features. For example, the computing system 3000 includes storage 3040, one or more input devices 3050, one or more output devices 3060, and one or more communication connections 3070. An interconnection mechanism (not shown) such as a bus, controller, or network interconnects the components of the computing system 3000. Typically, operating system software (not shown) provides an operating environment for other software executing in the computing system 3000, and coordinates activities of the components of the computing system 3000.

The tangible storage 3040 may be removable or non-removable, and includes magnetic disks, magnetic tapes or cassettes, CD-ROMs, DVDs, or any other medium which can be used to store information in a non-transitory way and which can be accessed within the computing system 3000. The storage 3040 stores instructions for the software 3080 implementing one or more innovations described herein.

The input device(s) 3050 may be a touch input device such as a keyboard, mouse, pen, or trackball, a voice input device, a scanning device, or another device that provides input to the computing system 3000. The output device(s) 3060 may be a display, printer, speaker, CD-writer, or another device that provides output from the computing system 3000.

The communication connection(s) 3070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 21—Cloud Computing Environment

Figure 31:
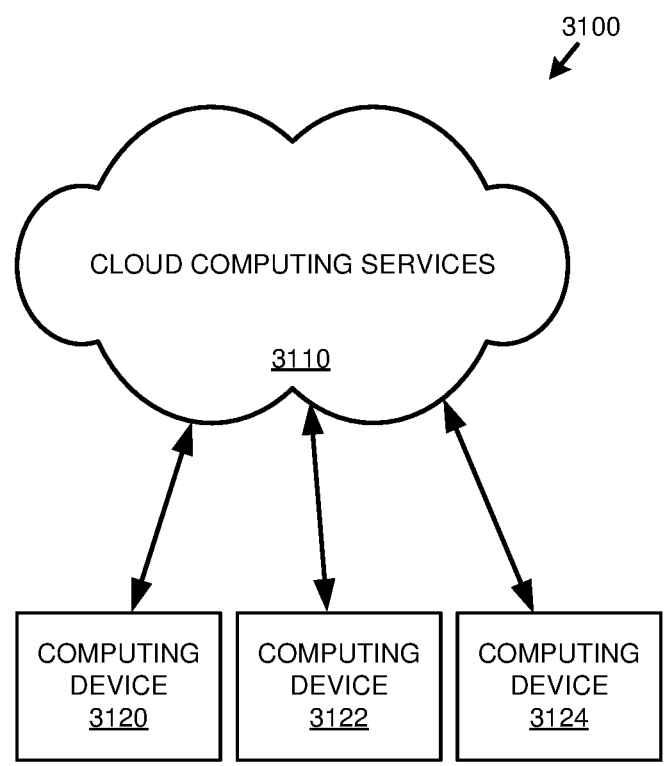
FIG. 31 is an example cloud computing environment that can be used in conjunction with the technologies described herein.

FIG. 31 depicts an example cloud computing environment 3100 in which the described technologies can be implemented. The cloud computing environment 3100 comprises cloud computing services 3110. The cloud computing services 3110 can comprise various types of cloud computing resources, such as computer servers, data storage repositories, networking resources, etc. The cloud computing services 3110 can be centrally located (e.g., provided by a data center of a business or organization) or distributed (e.g., provided by various computing resources located at different locations, such as different data centers and/or located in different cities or countries).

The cloud computing services 3110 are utilized by various types of computing devices (e.g., client computing devices), such as computing devices 3120, 3122, and 3124. For example, the computing devices (e.g., 3120, 3122, and 3124) can be computers (e.g., desktop or laptop computers), mobile devices (e.g., tablet computers or smart phones), or other types of computing devices. For example, the computing devices (e.g., 3120, 3122, and 3124) can utilize the cloud computing services 3110 to perform computing operators (e.g., data processing, data storage, and the like).

Example 22—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 30, computer-readable storage media include memory 3020 and 3025, and storage 3040. The term computer-readable storage media does not include signals and carrier waves. In addition, the term computer-readable storage media does not include communication connections (e.g., 3070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one hardware processor;
at least one memory coupled to the at least one hardware processor; and
one or more computer readable storage media storing computer-executable instructions that, when executed, cause the computing system to perform operations comprising:
receiving a request from a target system for at least a portion of metadata in a metadata repository, the request comprising information sufficient to identify one or more database artefacts, wherein respective database artefacts of the one or more database artefacts comprise a respective base definition formed from respective metadata of the metadata repository, the metadata of the metadata repository thus being organized at least in part according to the respective base definitions, and wherein a respective base definition of a respective database artefact comprises a first set of one or more metadata elements that define fields for the respective database artefact, where values are associable with the fields in an instance of the respective database artefact created at least in part according to the base definition of the database artefact;
identifying one or more software objects comprising metadata extensions for the one or more database artefacts as defined by the respective base definitions of the one or more database artefacts, the metadata extensions comprising a second set of one or more metadata elements that add, change, or remove data or metadata of a corresponding database artefact of the one or more database artefacts without modifying the one or more metadata elements of the first set of one or more metadata elements of the base definition of the corresponding database artefact; and
returning at least a portion of metadata elements of the metadata extensions to the target system in response to the request, wherein, when a given database artefact of the one of more database artefacts is instantiated at the target system, the instantiation uses a database artefact definition obtained by merging the metadata elements in the base definition of the given database artefact with the one or more metadata elements of its respective metadata extensions.

2. The computing system of claim 1, wherein identifying one or more software objects is constrained by a scoping function.

3. The computing system of claim 1, the operations further comprising:
integrating metadata elements of the metadata extensions with base metadata associated with respective base definitions of the one or more database artefacts; and
returning at least a portion of the base metadata to the target system in response to the request.

4. The computing system of claim 1, wherein the request is an update request and the operations further comprise:
determining if a metadata element has been added, deleted, or modified for a database artefact of the one or more database artefacts compared with metadata elements for the data database artefact previously sent to the target system.

5. The computing system of claim 4, wherein metadata elements that have been modified or added are returned.

6. The computing system of claim 1, the operations further comprising:
integrating multiple sources of metadata elements for a given database artefact.

7. The computing system of claim 6, wherein the integrating comprises applying one or more precedence rules.

8. The computing system of claim 7, wherein a precedence rule specifies that a later version of a metadata element is used in place of an earlier version of a metadata element.

9. The computing system of claim 6, wherein a precedence rule specifies that a later set of one or more values for a metadata element is added to an earlier set of one or more values for the metadata element.

10. The computing system of claim 1, the operations further comprising:
determining a plurality of APIs for accessing metadata of the one or more database artefacts;
converting the plurality of APIs to a standardized exchange format and saving the plurality of APIs in the standardized exchange format in a directory.

11. The computing system of claim 10, wherein the plurality of APIs in the standardized exchange format are used to provide information about database artefacts associated with the plurality of APIs, but data or metadata for the database artefacts are retrieved using an API of the plurality of APIs associated with a corresponding API in the standardized exchange format.

12. The computing system of claim 10, further comprising exposing the plurality of APIs in the standardized exchange format to another computing system.

13. The computing system of claim 10, wherein an API in the standardized exchange format comprises a reference to a corresponding API used to create the API in the standardized exchange format and a reference to metadata associated with a corresponding database artefact.

14. The computing system of claim 1, wherein determining a set of one or more database artefacts comprises analyzing foreign key relationships or associations.

15. The computing system of claim 1, the operations further comprising:
converting the at least a portion of the metadata elements of the first set or at least a portion of the metadata elements of the second set from a first format to a standardized format, wherein returning at least a portion of metadata elements of the metadata extensions to the target system comprises returning the at least a portion of the metadata elements in the standardized format.

16. One or more computer-readable storage media comprising:
computer-executable instructions that, when executed by a computing system comprising at least one hardware processor and at least one memory coupled to the at least one hardware processor, cause the computing system to receive a request from a target system for at least a portion of metadata in a metadata repository, the request comprising information sufficient to identify one or more database artefacts, wherein respective database artefacts of the one or more database artefacts comprise a respective base definition formed from respective metadata of the metadata repository, the metadata of the metadata repository thus being organized at least in part according to the respective base definitions, and wherein a respective base definition of a respective database artefact comprises a first set of one or more metadata elements that define fields for the respective database artefact, where values are associable with the fields in an instance of the respective database artefact created at least in part according to the base definition of the database artefact;

computer-executable instructions that, when executed by the computing system, cause the computing system to identify one or more software objects comprising metadata extensions for the one or more database artefacts as defined by the respective base definitions of the one or more database artefacts, the metadata extensions comprising a second set of one or more metadata elements that add, change, or remove data or metadata of a corresponding database artefact of the one or more database artefacts without modifying the one or more metadata elements of the first set of one or more metadata elements of the base definition of the corresponding database artefact;

computer-executable instructions that, when executed by the computing system, cause the computing system to return at least a portion of metadata elements of the metadata extensions to the target system in response to the request, wherein, when a given database artefact of the one of more database artefacts is instantiated at the target system, the instantiation uses a database artefact definition obtained by merging the metadata elements in the base definition of the given database artefact with the one or more metadata elements of its respective metadata extensions.

17. A method, implemented by a first computing system comprising at least one hardware processor and at least one memory coupled to the at least one hardware processor, the method comprising:

storing a base definition of a database artefact, the base definition of the database artefact comprising a first set of one or more metadata elements that define fields for the respective database artefact, where values are associable with the fields in an instance of the respective database artefact created at least in part according to the base definition of the database artefact:

sending a request to a second computing system for a second set of one or more metadata elements of one or more metadata extensions defined for the database artefact, wherein metadata elements of the second set of one or more metadata elements add, change, or remove data or metadata of the database artefact without modifying the one or more metadata elements of the base definition of the database artefact;

receiving the second set of one or more metadata elements from the second computing system; and instantiating the database artefact according to the first set of one or more metadata elements and the second set of one or more metadata elements or updating existing instances of the database artefact according to the second set of one or more metadata elements.

18. The method of claim 17, further comprising:
sending request to the second computing system for the base definition of the database artefact.

19. The method of claim 17, where receiving the second set of one or more metadata elements from the second computing system comprises receiving a definition of the database artefact created by merging the base definition with a metadata extension of the one or more metadata extensions.

20. The method of claim 17, wherein instantiating the database artefact or updating existing instance of the database artefact comprises merging metadata elements of the first set with metadata elements of the second set.

* * * * *